United States Patent [19]
Takada et al.

[11] Patent Number: 5,666,294
[45] Date of Patent: Sep. 9, 1997

[54] REPORT PROCESSING DEVICE

[75] Inventors: Kyoichi Takada, Kawasaki; Kazuo Takeshima, Yokohama, both of Japan

[73] Assignee: Fujitsu Limited, Kawasaki, Japan

[21] Appl. No.: 346,283

[22] Filed: Nov. 22, 1994

[30] Foreign Application Priority Data

Jan. 31, 1994 [JP] Japan ................ 6-009632

[51] Int. Cl.⁶ ................ G06F 11/30; G06F 11/34
[52] U.S. Cl. ................ 364/551.01
[58] Field of Search ........... 364/514 B, 551.01, 364/185; 395/185.01, 185.1, 183.22; 379/67, 94

[56] References Cited

U.S. PATENT DOCUMENTS

| | | | |
|---|---|---|---|
| 5,062,147 | 10/1991 | Pickett et al. | 364/921.9 |
| 5,155,842 | 10/1992 | Rubin | 395/185.1 |
| 5,237,677 | 8/1993 | Hirosawa et al. | 395/183.22 |
| 5,317,627 | 5/1994 | Richardson, Jr. et al. | 379/67 |

*Primary Examiner*—Ellis B. Ramirez
*Attorney, Agent, or Firm*—Armstrong, Westerman, Hattori, McLeland & Naughton

[57] ABSTRACT

A report processing device includes a system status monitor for monitoring the status of a system; a report-event detector for detecting an occurrence of an event to be reported, according to the monitor information from the system status monitor; a reporting unit for performing reporting a predetermined report-destination according to the information detected by the report-event detector; and a report-destination setting unit for selecting the predetermined report-destination in accordance with time to set it to the reporting unit. The report processing device monitors the status of a system and reports a predetermined report-destination selected according to time when the occurrence of an event to be reported is detected based on the monitor information.

57 Claims, 40 Drawing Sheets

FIG. 8

| TIME INFORMATION | INDEX NUMBER | REPORT-DESTINATION INFORMATION | |
|---|---|---|---|
| MONDAY TO FRIDAY / 08:40~17:30 | #1 | 3-4373 | → STATION |
| MONDAY TO FRIDAY / 17:30~18:30 | #2 | 045-474-9602 | → PAGER TERMINAL |
| MONDAY TO FRIDAY / 18:30~24:00 | #3 | 044-777-1111 | → MANAGER'S RESIDENCE |
| MONDAY TO FRIDAY / 00:00~07:30 | #4 | 044-777-1111 | → MANAGER'S RESIDENCE |
| MONDAY TO FRIDAY / 07:30~08:40 | #5 | 045-474-9602 | → PAGER TERMINAL |
| SATURDAY AND SUNDAY / 00:00~24:00 | #6 | 045-474-9611 | → REPORT-DESTINATIONS ON HOLIDAYS |

| ABNORMAL CONTENT | INDEX NUMBER | REPORT-DESTINATION INFORMATION | |
|---|---|---|---|
| SYSTEM DOWN | #1 | 044-777-1111 | ← MANAGER'S STATION |
| PARTS REPLACEMENT | #2 | 2-4373 | ← MAINTENANCE CREW'S STATION |

(52) (51)

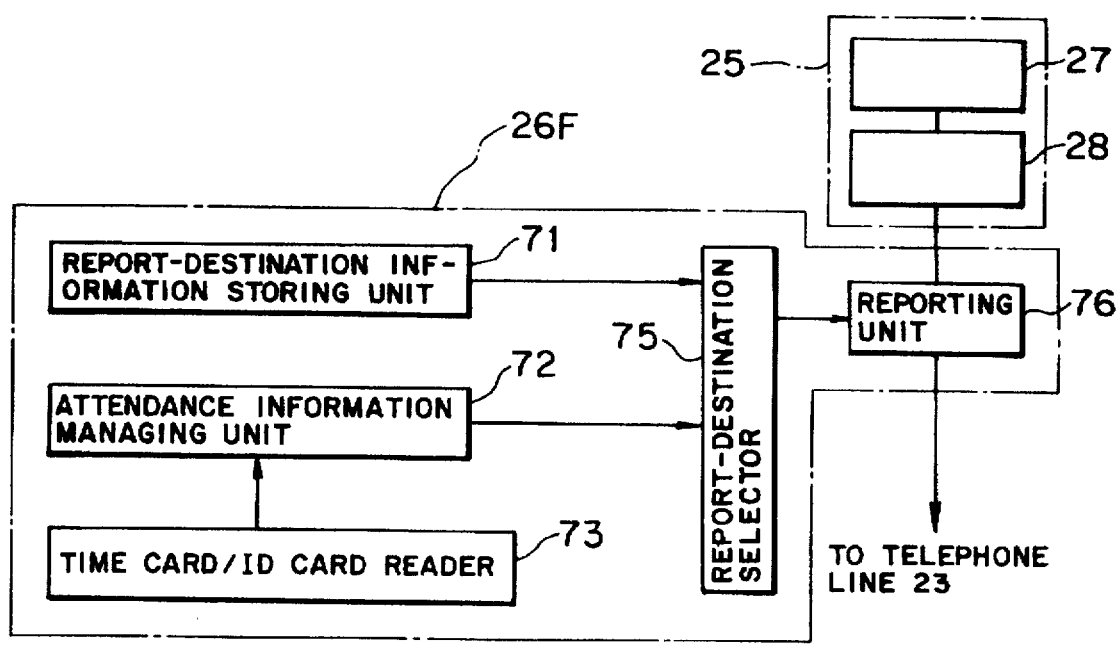

| STATION STATUS | REPORT-DESTINATION TELEPHONE NUMBER | |
|---|---|---|
| ATTENDED | 2 - 4373 | ← MANAGER'S STATION |
| UNATTENDED | 044 - 777 - 1111 | ← REPORT-DESTINATION AT A MANAGER'S ABSENCE |

| LOCATION | REPORT-DESTINATION TELEPHONE NUMBER |
|---|---|
| MANAGER'S OR MAINTENANCE CREW'S STATION | 2 - 4373 |
| FIELD LOCATION (KAWASAKI WORKS) | 044 - 777 - 1111 |
| OTHERS (POCKET BELL) | 045 - 474 - 9602 |

| SELECTION NUMBER | INDEX NUMBER | REPORT-DESTINATION TELEPHONE NUMBER | |
|---|---|---|---|
| 1 | #1 | 2-4373 | ← MANAGER'S OR MAINTENANCE CREW'S STATION |
| 2 | #2 | 044-777-1111 | ← REPORT-DESTINATION AT A STATION EMPTY TIME |

FIG.43

| SELECTION NUMBER | INDEX NUMBER | REPORT-DESTINATION TELEPHONE NUMBER | |
|---|---|---|---|
| 1 | *1 | 2 - 4373 | ← MANAGER'S OR MAINTENANCE CREW'S STATION |
| 2 | *2 | 044-777-1111 | ← REPORT-DESTINATION AT A STATION EMPTY TIME |
| 3 | *3 |  | ← NEW REPORT-DESTINATION TO BE REPORTED |

| TIME INFORMATION | INDEX NUMBER | REPORT-DESTINATION INFORMATION |
|---|---|---|
| MONDAY TO FRIDAY / 08:40 ~ 17:30 | #1 | SPEECH REPORTING UNIT |
| MONDAY TO FRIDAY / 17:30 ~ 18:30 | #2 | SPEECH REPORTING UNIT |
| MONDAY TO FRIDAY / 18:30 ~ 24:00 | #3 | CONTACT REPORTING UNIT |
| MONDAY TO FRIDAY / 00:00 ~ 07:30 | #4 | TELEPHONE REPORTING UNIT |
| MONDAY TO FRIDAY / 07:30 ~ 08:40 | #5 | TELEPHONE REPORTING UNIT |
| SATURDAY AND SUNDAY / 00:00 ~ 24:00 | #6 | TELEPHONE REPORTING UNIT & CONTACT REPORTING UNIT |

131

REPORT PROCESSING DEVICE

BACKGROUND OF THE INVENTION

1. Field of the Invention

The present invention relates to a report processing device suitable for maintaining and managing systems controlled under, for example, a computer.

2. Description of the Related Art

Generally, various kinds of information regarding the status of computer systems or factory facilities are reported, if necessary, to managers or maintenance crews. During working hours, various kinds of information are reported to the station where managers or maintenance crews are staying.

However, they may not reside always in the station at midnight, on holidays, or during time periods except their working hours. For example, an abnormal state in the system may not be quickly reported to a manager or maintenance crew at other place.

The report may include information regarding a trouble in a system which can be treated only by a particular manager or maintenance man. For that reason, if a trouble occurs in a system, it may be necessary to change the report-destination to a place other than the station, in consideration of circumstances.

To deal with the case described above, the telephone numbers of managers or maintenance crews are previously registered. If a malfunction should occur in a system, a telephone call is tried to all the registered destinations. Otherwise, a telephone call is tried sequentially to the following report-destination only when a target report-destination cannot be linked. In order to keep a manager or maintenance crew in a comfortable sleep, a telephone call is tried during a limited period of time.

Therefore, there has been a disadvantage in that a reporting procedure is delayed because a member who cannot deal with the report content is informed of information regarding a trouble in a system, or a trouble of the report-destination or the absence of a maintenance member at the report-destination disturbs the reporting process, whereby the recovery of the system may be delayed.

SUMMARY OF THE INVENTION

The present invention is made to overcome the problems mentioned above. An object of the present invention is to provide a report processing device that can report immediately and certainly various pieces of information regarding a system.

In order to achieve the above objects, according to the present invention, the report processing device is characterized by a system status monitoring means for monitoring a status of a system; a report-event detecting means for detecting an occurrence of an event to be reported, according to the monitor information from the system status monitoring means; a reporting means for performing reporting to a predetermined report-destination according to the detection information from the report-event detecting means; and a report-destination setting means for selecting the predetermined report-destination in accordance with time and then for setting it to the reporting means.

According to the present invention, the report processing device is characterized by a system status monitoring means for monitoring a status of a system; a report-event detecting means for detecting an occurrence of an event to be reported, according to the monitor information from the system status monitoring means; a reporting means for performing reporting a predetermined report-destination according to the information detected by the report-event detecting means; and a report-destination setting means for selecting the predetermined report-destination according to an event to be detected which are detected by the report-event detecting means and then for setting it to the reporting means.

According to the present invention, the report processing device is characterized by a system status monitoring means for monitoring a status of a system; a report-event detecting means for detecting an occurrence of an event to be reported, according to the monitor information from the system status monitoring means; a reporting means for performing reporting a predetermined report-destination according to the information detected by the report-event detecting means; and a report-destination setting means for selecting the predetermined report-destination according to a time and an event to be reported which is detected by the report-event detecting means and then for setting it to the reporting means.

According to the present invention, the report processing device is characterized by a system status monitoring means for monitoring a status of a system; a report-event detecting means for detecting an occurrence of an event to be reported, according to the monitor information from the system status monitoring means; a reporting means for performing reporting a predetermined report-destination according to the information detected by the reporting event detecting means; and a report-destination setting means for selecting the predetermined report-destination according to a member's location to be reported and then for setting it to the reporting means.

According to the present invention, the report processing device is characterized by system status monitoring means for monitoring a status of a system; report-event detecting means for detecting an occurrence of an event to be reported in accordance with the monitor information from the system status monitoring means; reporting means for performing reporting a predetermined report-destination in accordance with the information detected by the report-event detecting means; a report-destination table in which plural pieces of report-destination information regarding the predetermined report-destination is previously set and registered; and external report-destination setting means for selecting the predetermined report-destination from the report-destination table under an external remote control to set it to the reporting means.

According to the present invention, the report processing device can locate a member who can deal most effectively with the abnormal state in accordance with an abnormal occurrence time of a system, thus certainly reporting the location. Hence, there is an advantage in that a slow reporting can be removed due to an inadequate reporting to a member who cannot deal with an abnormal state, a trouble of the report-destination, and an absence of a maintenance man at the report-destination, whereby the reporting capability can be improved largely.

Moreover, according to the present invention, the report processing device can locate a member who can deal most effectively with the abnormal state in accordance with an abnormal content of a system, thus certainly reporting the location. Hence, there is an advantage in that a slow reporting can be removed due to an inadequate reporting to a personnel who cannot deal with an abnormal state, a trouble at the report-destination, and an absence of a maintenance man at the report-destination, whereby the reporting capability can be improved largely.

According to the present invention, the report processing device can locate comprehensively a member who can deal most effectively with the abnormal state in accordance with an abnormal content and an abnormal occurrence time of a system, thus certainly reporting the location. Hence, there is an advantage in that a slow reporting can be removed due to an inadequate reporting to a member who cannot deal with an abnormal state, a trouble at the reporting destination, and an absence of a maintenance man at the report-destination, whereby the reporting capability can be improved largely.

BRIEF DESCRIPTION OF THE DRAWINGS

FIG. 8 is a table showing information stored into the report-destination information storing unit and information stored into the time information storing unit according to the first embodiment of the present invention;

FIG. 25 is a block diagram showing the report processing device according to the fifth embodiment of the present invention;

FIG. 26 is a table showing report-destination information stored in the report-destination information storing unit according to the fifth embodiment of the present invention;

FIG. 43 is a table showing report-destination information stored in the report-destination information storing unit being a modification of the sixth embodiment of the present invention;

FIG. 49 is a table showing report-destination information stored in the report-destination information storing unit according to the eighth embodiment of the present invention.

DESCRIPTION OF THE PREFERRED EMBODIMENTS (a) The aspect of the invention:

Explanation will be made below as for the aspect of the present invention with reference to attached drawings.

Figure 1:
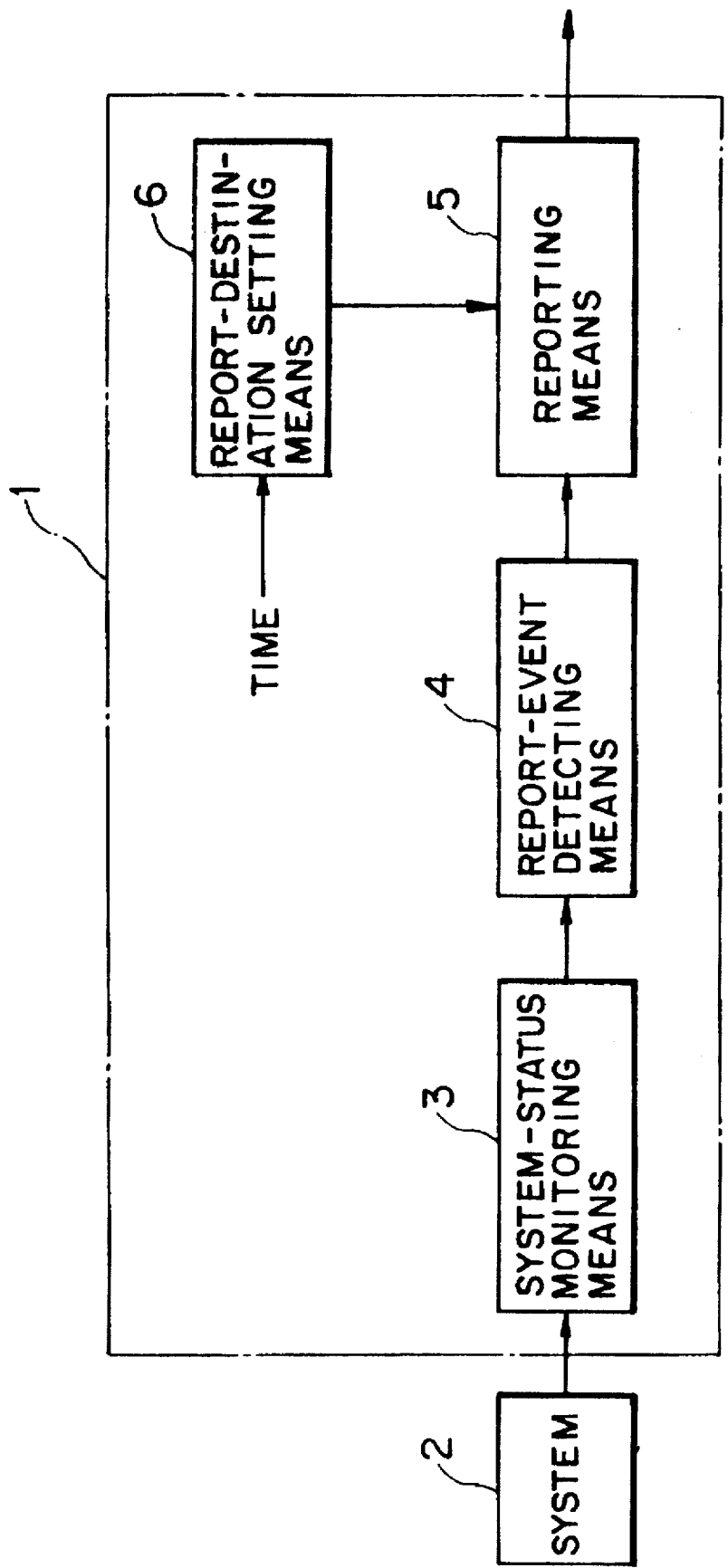
FIG. 1 is a block diagram for explaining an aspect of the present invention.

FIG. 1 is a block diagram showing an aspect of the present invention. Referring to FIG. 1, a report processing device 1 includes a system status monitoring means 3, a report-event detecting means 4, a reporting means, and a report-destination setting means 6.

The system status monitoring means 3 monitors the status of the system 2. The report-event detecting means 4 detects an occurrence of an event to be reported in accordance with the monitor information from the system status monitoring means 3. The reporting means 5 performs reporting to a predetermined report-destination in accordance with the detection information from the report-event detecting means 4. The report-destination setting means 6 selects the predetermined report-destination with time to set the same to the reporting means 5.

In the report-destination set by the report-destination setting means 6, the report processing device 1 includes a time-to-report-destination table in which report-destination information corresponding to time information is previously set and registered, and a clock for detecting a current time. The report-destination setting means 6 selects the report-destination information corresponding to a current time detected by the clock from the time-to-report-destination table to set previously it as a predetermined report-destination to the reporting means. In another manner, the report processing device 1 includes a time-to-report-destination table and a clock for detecting the event occurrence time when an event to be reported by the report-event detecting means 4 has occurred in a system. Thus, the report-destination setting means 6 selects the report-destination information corresponding to the event occurrence time detected by the clock from the time-to-report-destination table and sets as a predetermined report-destination to the reporting means 5.

Figure 2:
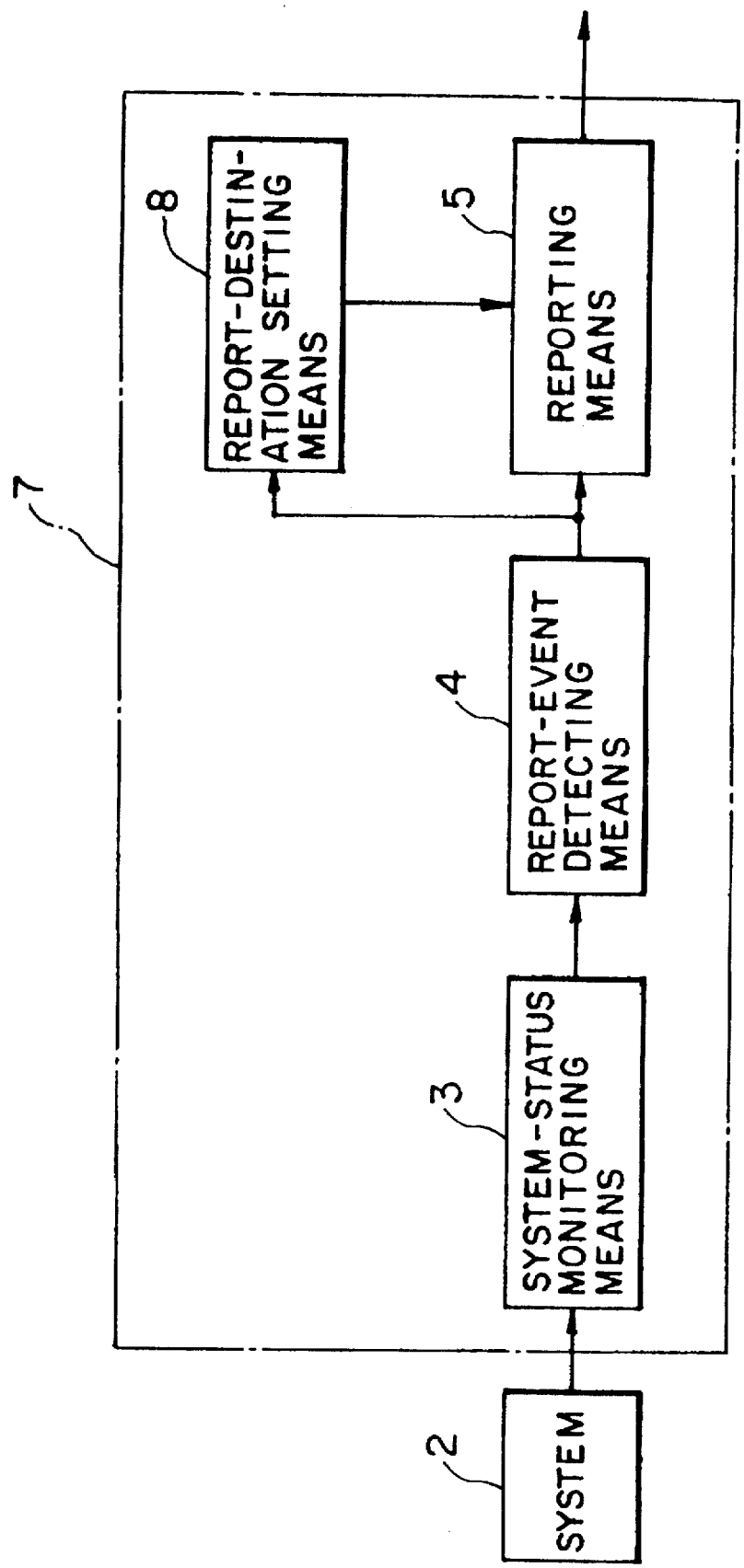
FIG. 2 is a block diagram for explaining an aspect of the present invention.

FIG. 2 is a block diagram showing an aspect of the present invention. Referring FIG. 2, like the embodiment shown in FIG. 1, the report processing device 7 includes the system status monitoring means 3, the report-event detecting means 4, and the reporting means 5.

The report-destination setting means 8 selects a predetermined report-destination to be reported by the reporting means 5 in accordance with an event to be reported which is detected by the report-event detecting means 4 to set it to the reporting means 5. In the report-destination set by the report destination setting means 8, the report processing device 7 includes an event-to-report-destination table in which the report-destination information corresponding to an event to be reported is previously set and registered. Hence, the report destination setting means 8 selects report-destination information corresponding to an event to be reported which has been detected by the report-event detecting means 4 from the event-to-report-destination table to set it as a predetermined report-destination to the reporting means 5.

Figure 3:
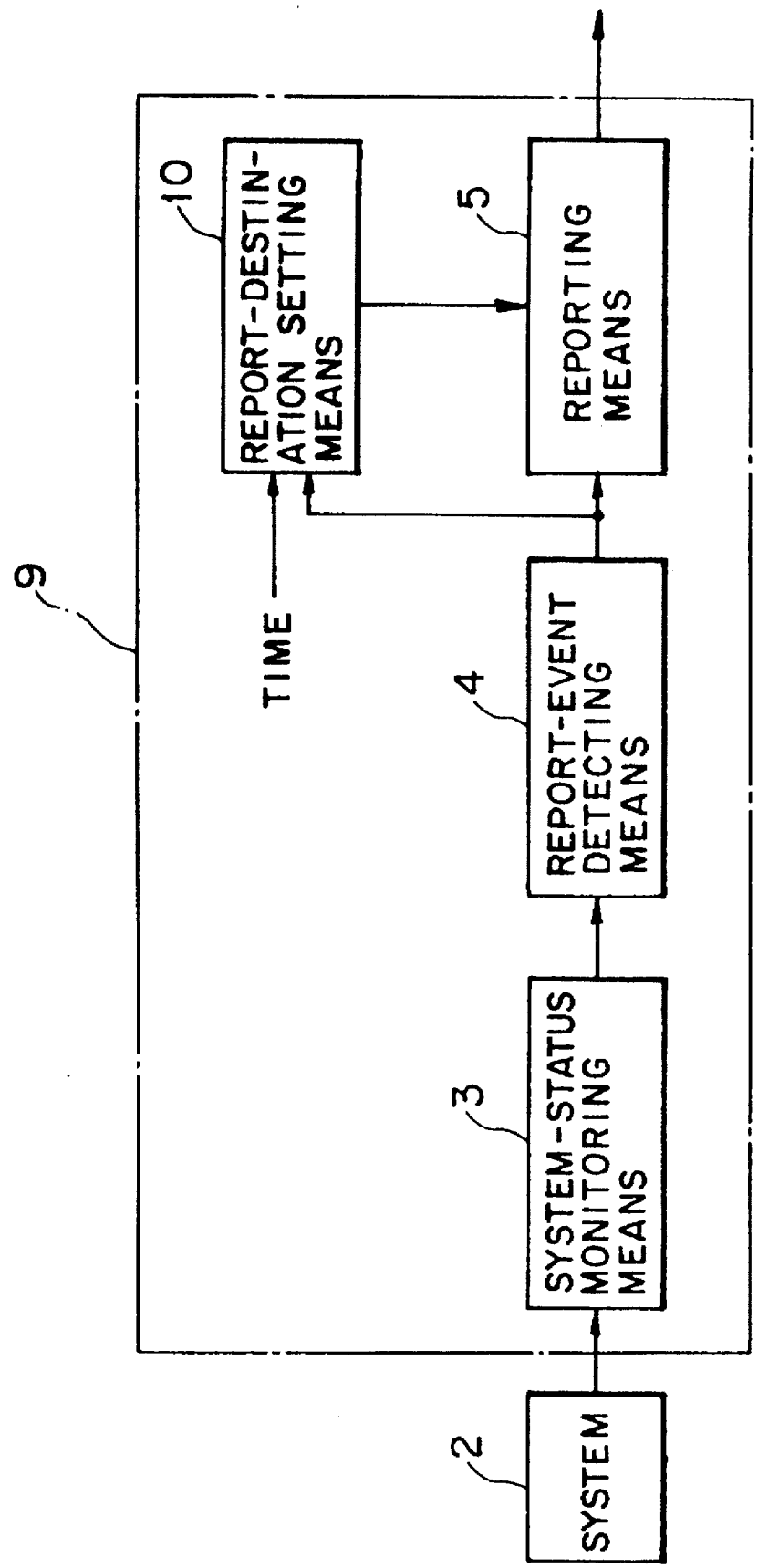
FIG. 3 is a block diagram for explaining an aspect of the present invention.

FIG. 3 is a block diagram showing an aspect of the present invention. Referring to FIG. 3, like the embodiment shown in FIG. 1, the report processing device 9 includes the system status monitoring means 3, the report-event detecting means 4, and the reporting means 5.

The report-destination setting means 10 selects a predetermined report-destination to be reported by the reporting means 5 in accordance with time and an event to be reported which has been detected by the report-event detecting means 4, to set it to the reporting means 5. In the report-destination set to the report-destination setting means 10, the report processing device 9 includes a time/event-to-report-destination table in which time information and report-destination information corresponding to an event to be reported are set previously and registered, and a clock which detects the event occurrence time when the report-event detecting means detects that an event to be reported has occurred in a system. At the event occurrence time, the report-destination setting means 10 selects report-destination information each corresponding to an event occurrence time detected by the clock and an event to be reported which has been detected by the report-event detecting means from a time/event-to-report-destination table, and sets it as a predetermined report-destination to the reporting means 5.

Figure 4:
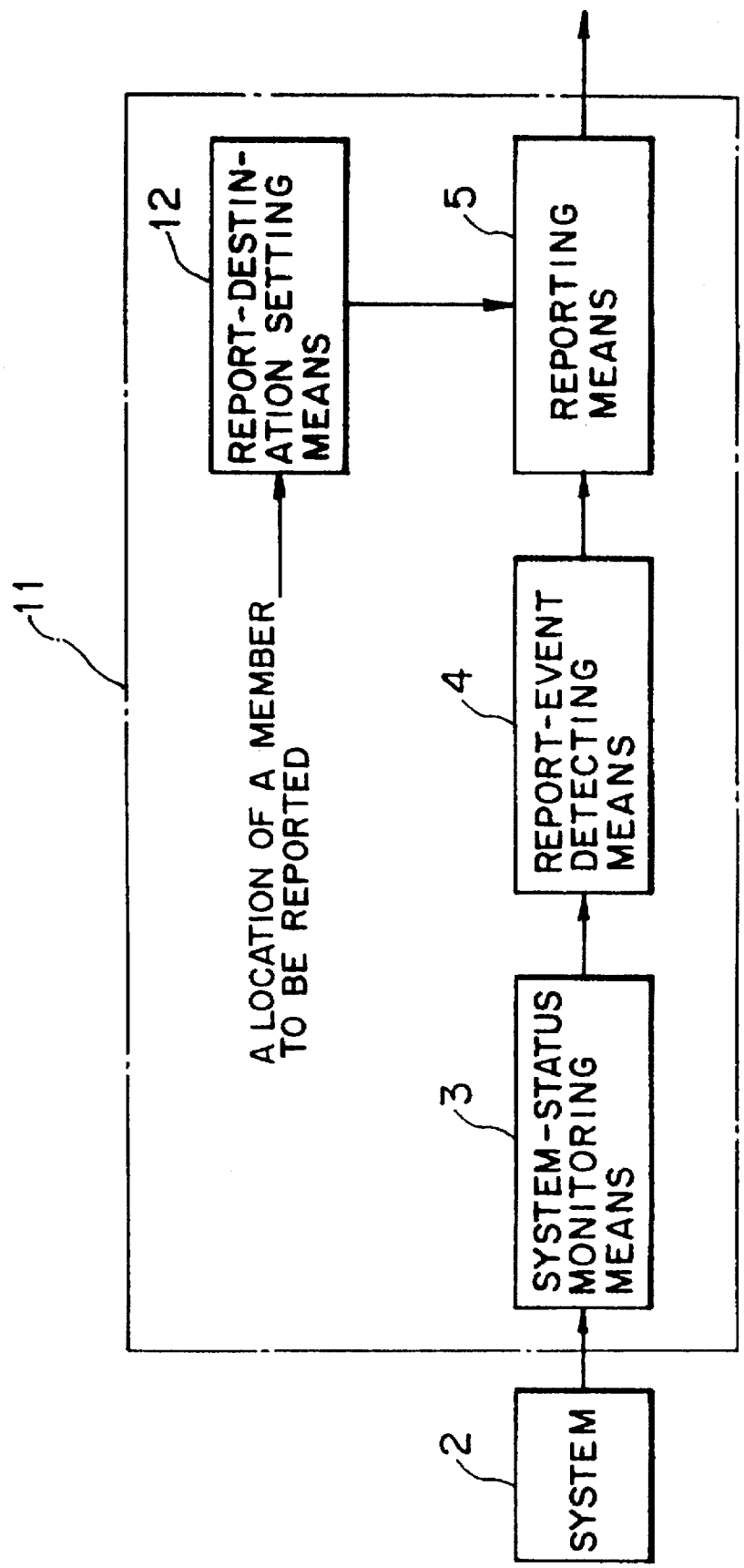
FIG. 4 is a block diagram for explaining an aspect of the present invention.

FIG. 4 is a block diagram showing an aspect of the present invention. Referring to FIG. 4, like the embodiment shown in FIG. 1, the report processing device 11 includes the system status monitoring means 3, the report-event detecting means 4, and the reporting means 5.

The report-destination setting means 12 selects a predetermined report-destination to be reported by the reporting means 5 in accordance with a personnel or member's residence or location to be reported and sets it to the reporting means.

Each of the report processing devices 1, 7, 9 and 11, shown in FIGS. 1 to 4, includes a location-to-report-destination table in which report-destination information corresponding to a member's location to be reported is previously set and registered and a member locating means which locates a member to be reported to inform the report-destination setting means 6, 8, 10 or 12 of the detected location. Hence, Each of the report-destination setting means 6, 8, 10 and 12 can select the report-destination information corresponding to information detected by the member locating means from the location-to-report-destination table and set it as a predetermined report-destination to the reporting means 5.

The member locating means may consist of an attendance detecting means that detects the information regarding an attendance or unattendance of a member to be detected. The member locating means may consist of a device status detecting means that can detect the use of various devices used by a member to be detected. The member locating means may consist of a member's presence detecting means that can detect whether a member to be reported is staying in a station, or not. The member locating means may consist of a location detector that detects a member's location to be reported and a transmitter that generates the result detected by the location detector. The member locating means may consist of a location transmitter carried on a member to be reported, and a receiver for receiving the result detected by the location detector and transmitted from the location detector to locate a member to be reported. The member locating means may consist of a transmitter for transmitting a predetermined signal and carried on a member to be reported, a receiver for receiving the predetermined signal transmitted from the transmitter, and a location detector for locating a member to be reported, based on the predetermined signal received by the receiver.

Figure 5:
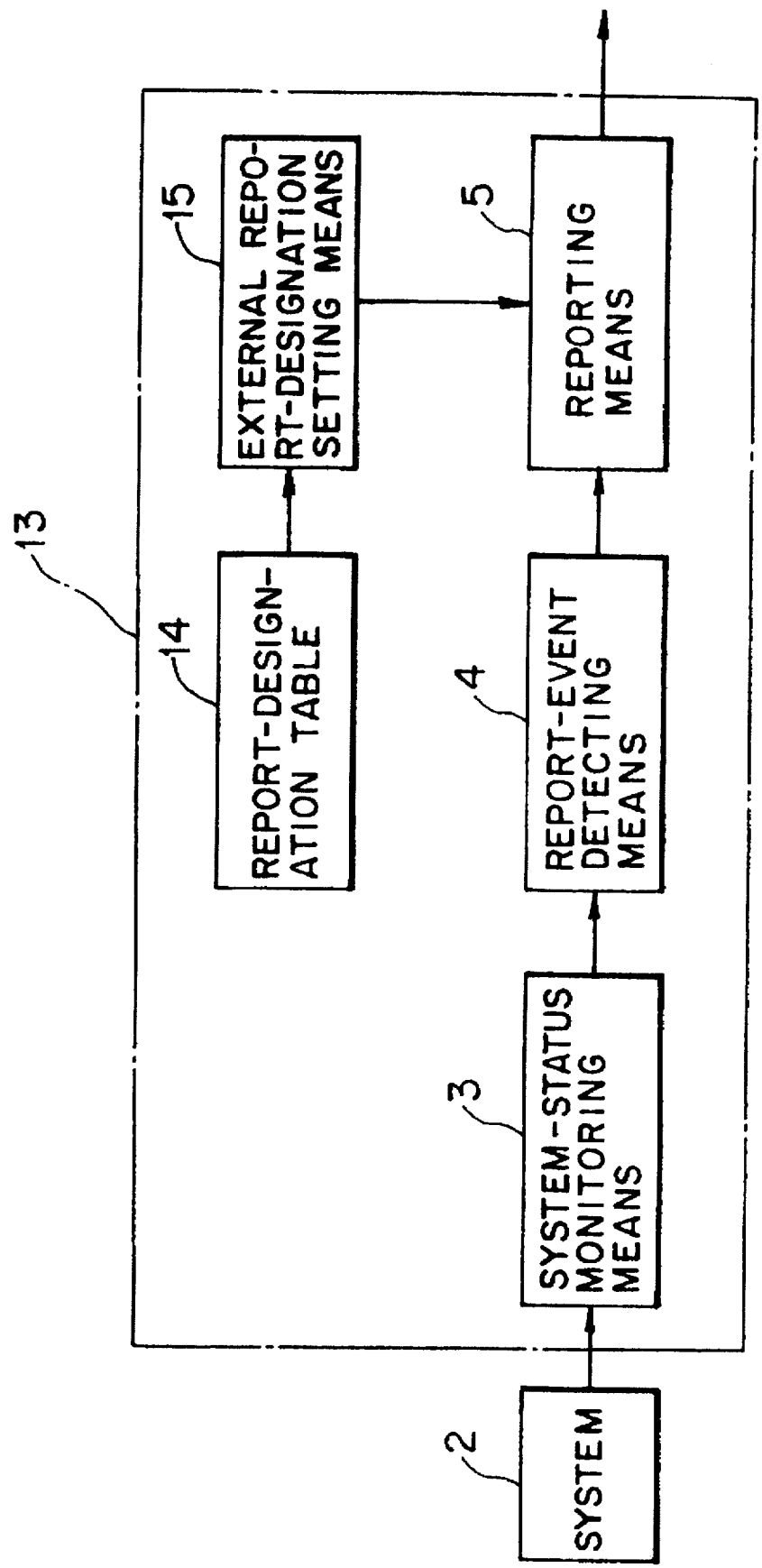
FIG. 5 is a block diagram for explaining an aspect of the present invention.

FIG. 5 is a block diagram showing an aspect of the present invention. Referring to FIG. 5, like the embodiment shown in FIG. 1, the report processing device 13 includes the system status monitoring means 3, the report-event detecting means 4 and the reporting means 5.

The report destination table 14 sets and registers previously plural pieces of report-destination information regarding predetermined report-destinations.

The external report-destination setting means 15 sets selectively a predetermined report-destination from the report-destination table 14 to the reporting means 5 under external remote control.

Each of the report processing devices 1, 7, 9 and 11, shown in FIGS. 1 to 4, includes a report-destination table in which plural pieces of report-destination information regarding a predetermined report-destination is set and registered previously and a external report-destination setting means that can set selectively the predetermined report-destination from the report-destination table to the reporting means 5 under external remote control.

The report-destination table may includes an external report-destination registering means that can set and register new report-destination information in accordance with an external remote control from the external report-destination setting means. The external remote control may be performed from an external telephone set via a public telephone line.

In the report processing devices shown in FIGS. 1 to 5, the reporting means 5 may send a report to a predetermined report-destination via a telephone line. An event to be reported which is detected by the report-event detecting means 4 may is concerned with an abnormal status in a system.

In the report processing device shown in FIG. 1, the system status monitoring means 3 monitors the status of the system 2, and the report-event detecting means 4 detects an event occurrence to be reported, based on the monitor information.

The reporting means 5 sends a report to a predetermined report-destination in accordance with the detection information from the report-event detecting means 4. The reporting means 5 sets selectively the report to the predetermined report-destination in accordance with time.

In the report processing device shown in FIG. 2, the system status monitoring means 3 monitors the status of the system 2 and then the report-event detecting means 4 detects an event occurrence to be reported, based on the monitoring status.

The reporting means 5 executes reporting to a predetermined report-destination according to the detection information from the report-event detecting means 4. The predetermined report-destination is selectively set to the reporting means 5 in accordance with the report-event detected by the report-event detecting means 4.

Moreover, in the report processing device shown in FIG. 3, the system status monitoring means 3 monitors the status of the system 2 and the report-event detecting means 4 detects an event occurrence to be reported, based on the monitor information.

The reporting means 5 sends a report to a predetermined report destination, based on the detection information from the report-event detecting means 4. The predetermined destination is selectively set to the reporting means 5 in accordance with time and a report-event detected by the report-event detecting means 4.

In the report processing device shown in FIG. 4, the system status monitoring means 3 monitors the status of the system 2 and the report-event detecting means 4 detects an event occurrence to be reported, based on the monitor information.

The reporting means 5 executes reporting to a predetermined report destination based on the detection information from the report-event detecting means 4. The predetermined report destination is set selectively to the reporting means 5 in accordance with a member's location to be reported.

In the report processing device shown in FIG. 5, the system status monitoring means 3 monitors the status of the system 2 and the report-event detecting means 4 detects an occurrence of an event to be reported, based on the monitor information.

The reporting means 5 executes reporting to a predetermined report destination, based on the detection information from the report-event detecting means 4. The predetermined report destination is set selectively to the reporting means 5 under an external remote control.

Therefore, according to the present invention, the report processing device can locate a member who can deal most effectively with the trouble in a system, in accordance with the abnormal occurrence time, thus allowing a reliable reporting. This feature can eliminate a delayed report due to reporting to an inadequate troubleshooter, a trouble of the report destination, or no member at the report destination, thus improving largely the reporting capability.

Moreover, according to the present invention, the report processing device can locate a member who can deal most effectively with the trouble, in accordance with the abnormal content in a system, thus allowing a reliable reporting. This feature can eliminate a delayed report due to reporting to an inadequate troubleshooter, a trouble of the report destination, or no member at the report destination, thus improving largely the reporting capability.

According to the present invention, the report processing device can locate comprehensively a member who can deal most effectively with the system trouble, in accordance with an abnormal content and the abnormal occurrence time in a system, thus allowing a reliable reporting. This feature can eliminate a delayed report due to reporting to an inadequate troubleshooter, a trouble of the report destination, or no member at the report destination, thus improving largely the reporting capability.

Moreover, according to the present invention, when an abnormal state occurs in a system, a member who can deal most effectively with the system trouble can be located in accordance with his working state to send certainly a report to him. This feature can eliminate a delayed report due to reporting to an inadequate troubleshooter, a trouble of the report destination, or no personnel at the report destination, thus improving largely the reporting capability.

According to the present invention, the system manager or maintenance crew can set the report destination by an external remote control. Hence, when an abnormal state occurs in a computer system, a maintenance man who can deal most effectively with the system trouble can be immediately located to perform a reliable reporting to him. This feature can eliminate a delayed reporting procedure due to reporting to an inadequate troubleshooter, a trouble of the report destination, or no member stationed at the report destination, thus improving remarkably the reporting capability.

Moreover, according to the present invention, a member who can deal most effectively with the system trouble can be immediately located in accordance with time, without using the telephone line, to perform a reliable reporting to him. This feature can eliminate a delayed reporting process due to reporting to an inadequate troubleshooter, a trouble of the report destination, or no member stationed at the report destination, thus improving remarkably the reporting performance.

According to the present invention, a maintenance member who can deal most effectively with the system trouble can be immediately located in accordance with time to send certainly a report to him using a telephone line, a lamp lighting, or voice. This feature can eliminate a delayed reporting procedure due to reporting to an inadequate troubleshooter, a trouble of the report destination, or no member stationed at the report destination, thus improving largely the reporting capability and reporting in accordance with the environment of the member's location.

Figure 6:
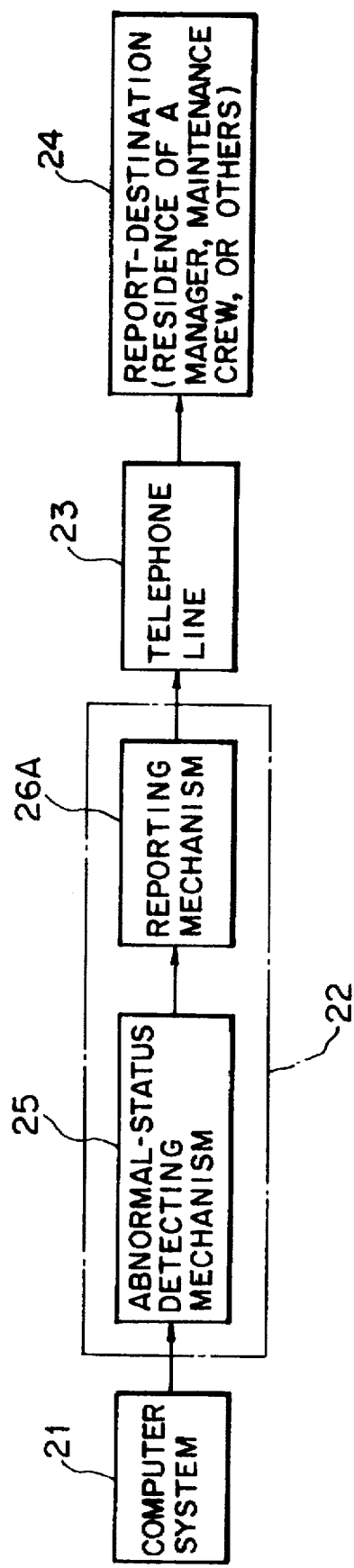
FIG. 6 is a block diagram showing a system configuration employing each embodiment according to the present invention.

(b) Explanation of First Embodiment:

FIG. 6 is a block diagram showing the system configuration embodying the first to sixth embodiments according to the present invention. Referring to FIG. 6, numeral 21 represents a computer system to be monitored.

The report processing device 22 monitors the computer system 21, and detects and reports the abnormal state. The report processing device 22 according to the present embodiment includes a abnormal status detecting mechanism 25 for detecting the computer system 21 and a reporting mechanism 26A having an automatic reporting function to report an abnormal status to a predetermined telephone number.

Numeral 23 represents a telephone line 23 numeral 24 represents a report destination being, for example, a station for a managers or maintenance member in charge of the computer system 21, his home, or his Pocket Bell.

When the abnormal status detecting mechanism 25 detects an abnormal status of the computer system 21, the reporting mechanism 26A forwards it to the report destination 24 via the telephone line 23.

Figure 7:
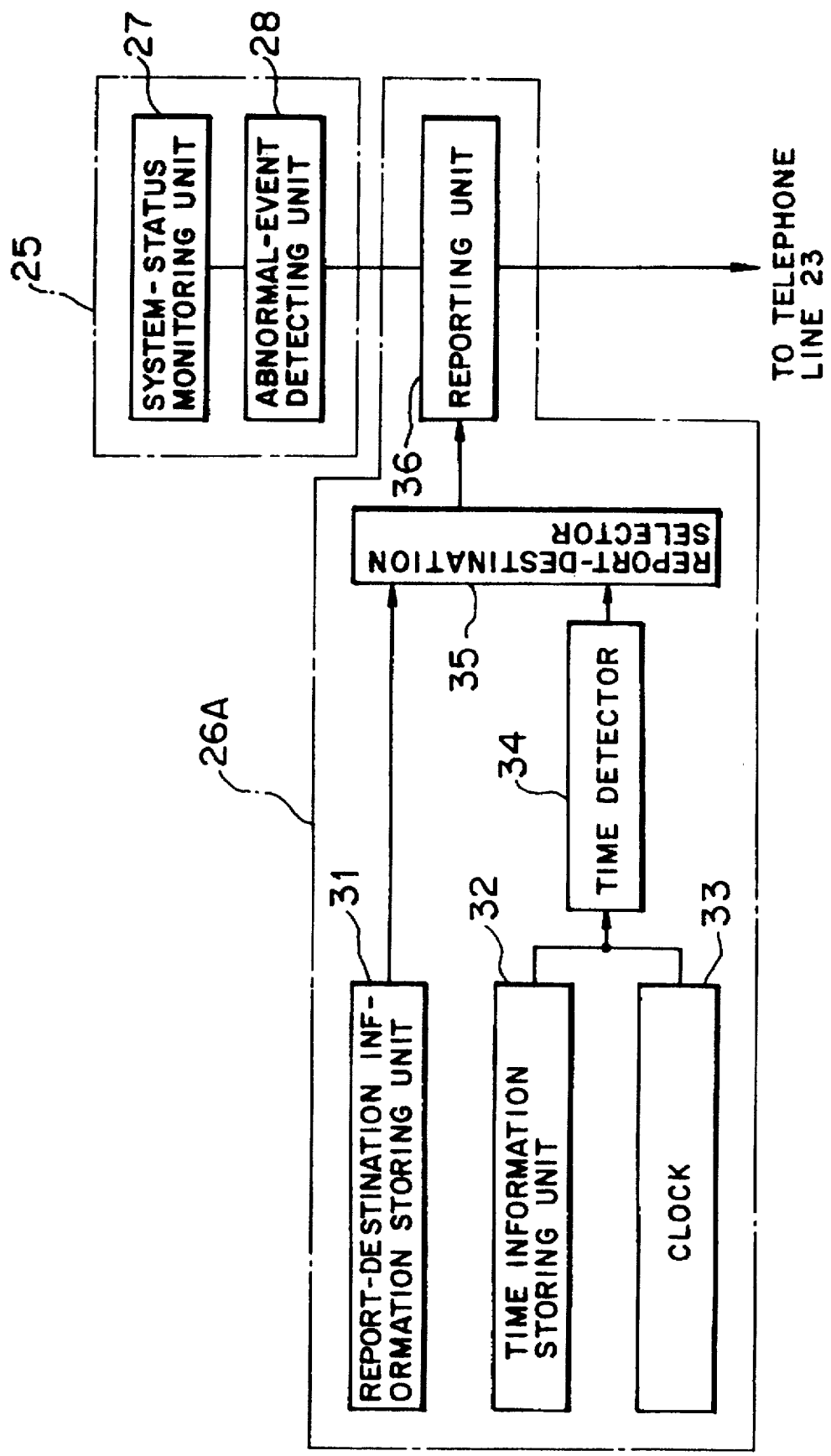
FIG. 7 is a block diagram showing a report processing device according to the first embodiment of the present invention.

FIG. 7 is a diagram showing the report processing device according to the first embodiment of the present invention. FIG. 7 shows in detail the report processing device 22. Referring to FIG. 7, the abnormal status detecting mechanism 25 includes a system status monitoring unit 27 and an abnormal event detecting unit 28. The reporting mechanism 26A includes a report-destination information storing unit 31, a time information storing unit 32, a clock 33, a time detector 34, a report-destination selector 35, and a reporting unit 36.

The system status monitoring unit 27 monitors the status of the computer system 21. The abnormal event detector 28 detects the abnormal status of the computer system 21 as a report event, based on the monitor information from the computer status monitoring unit 27.

The report-destination information storing unit (time-to-report-destination table) 31 stores report-destination information such as telephone numbers of report destinations set and registered. As shown in FIG. 8, index numbers (#1 to #6) are attached to the report destinations in accordance with a reporting time, respectively.

The time information storing unit 32, as shown in FIG. 8, sets days of the week and time periods on which reporting to report-destination's telephone numbers stored in the report-destination information storing unit 31 are allowed. During each time period, an index number is attached to the report-destination information stored into the report-destination information storing unit 31.

The telephone number is set as follows: Information is reported to the station because maintenance crews stay in it between 8:40 to 17:30 on Monday to Friday. Information is reported to a maintenance crew's pager terminal (radio calling terminal) such as Pocket Bell because maintenance crew are on the move between 17:30 to 18:30 on Monday to Friday. Information is reported to the manager's home between 18:30 to 24:00 on Monday to Friday. Information is reported to the manager's home between 00:00 to 7:30 on Monday to Friday. Information is reported to a maintenance crew's pager terminal between 7:30 to 8:40 on Monday to Friday. A telephone number is reported to the destinations between 00:00 to 24:00 on Saturday and Sunday.

The clock 33 with a calendar function outputs a current time. The time detector 34 compares a day of a week and time period stored in the time information storing unit 32 with a current time from the clock 33. If the current day of week and the current time are in the time information storing unit 32, the information (the index numbers corresponding to day of a week and time, in the present embodiment) is outputted.

The report destination selector (report destination setting means) 35 selects a telephone number from the report-destination information storing unit 31, the telephone number corresponding to information (index number) regarding day of a week and time from time detector 34, to set to the reporting unit 36.

The reporting unit (reporting means) 36 reports a message to a report-destination selected by the report-destination selector 35 via the telephone line 23, the message corresponding to an abnormal content from the abnormal event detector 28.

The operation of the report processing device according to the first embodiment of the present invention will be explained below with reference to the flowcharts shown in FIGS. 9 to 11.

Figure 9:
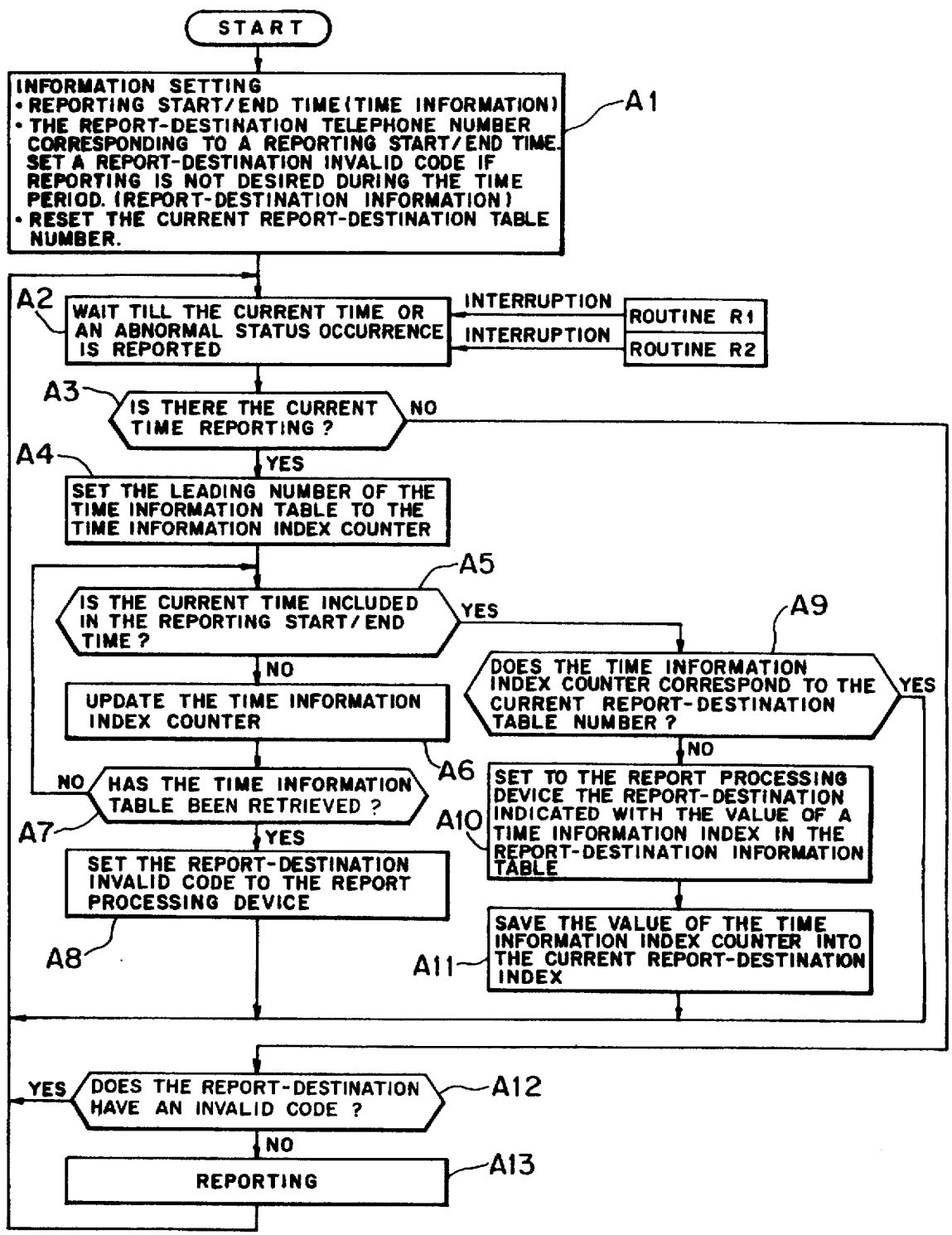
FIG. 9 is a flowchart used for explaining the operation of the first embodiment of the present invention.
Figure 10:
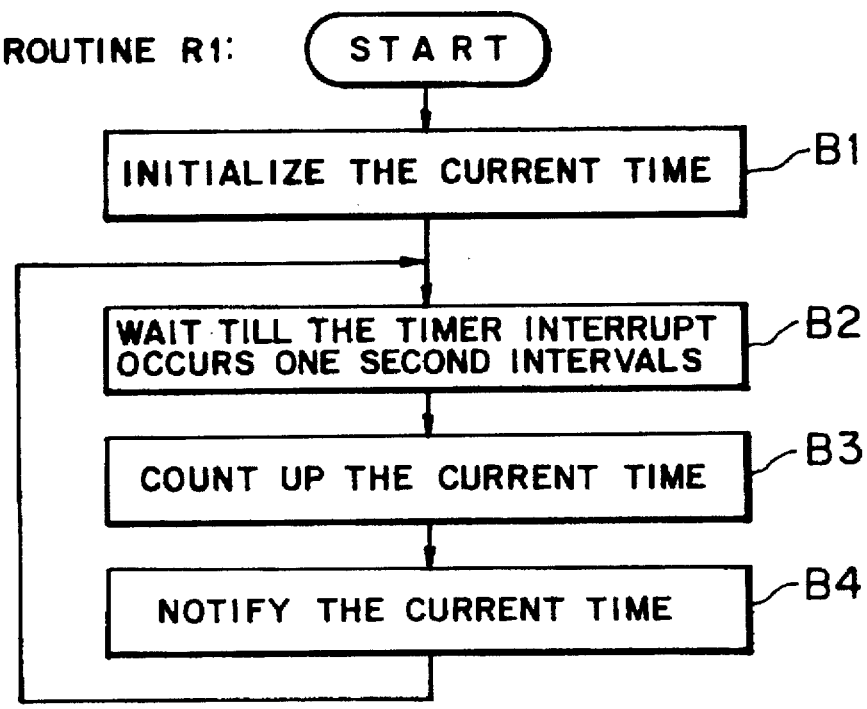
FIG. 10 is a flowchart used for explaining the operation of the first embodiment of the present invention.

That is, in the step A1 of the flowchart shown in FIG. 9, as shown in FIG. 8, a day of week and a job starting/quitting time each that can be reported to a report-destination's telephone number is initially set with an index number into the time information storing unit 32. Moreover, the report destination's telephone number corresponding to the day of week and the time each with an index number is set into the report-destination information storing unit 31. When the reporting is not intended at the time set into the time information storing unit 32, the report-destination invalid code is set into the report-destination information storing unit 31. The current report-destination table number (index number) selected by the report-destination selector 35 is reset (step A1).

Next, the flow is in a waiting state till the clock 3 reports a current time to the time detector 34 or the abnormal event detector 28 reports an abnormal status occurrence to the reporting unit 36 (step A2). However, an interrupt process (routines R1 and R2) shown with the flowcharts in FIGS. 10 and 11 is performed in order to report the current time from the time 33 and an abnormal status occurrence from the abnormal event detecting unit 28.

That is, with a current time initialized (in the step B1 in FIG. 10), the clock 33 waits for its current time reporting operation till the timer interrupting occurs at one second intervals (step B2). When the interrupt occurs, the current time is counted up (step B3). Then, the count-up time data is reported as a current time to the time detector 34 (step B4).

Figure 11:
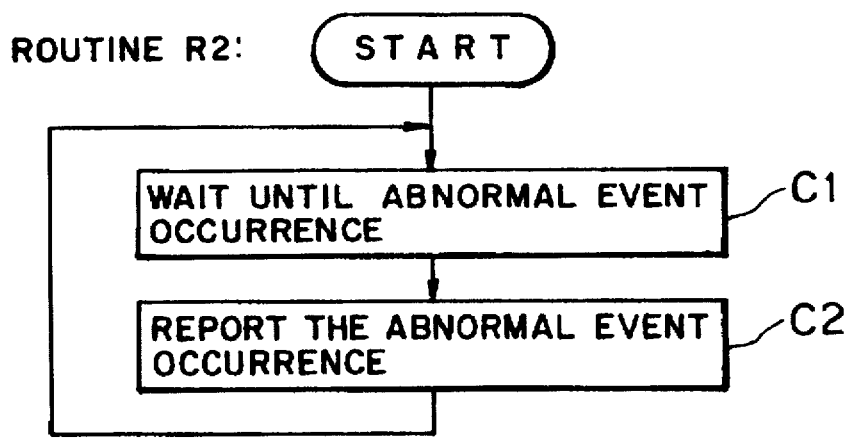
FIG. 11 is a flowchart used for explaining the operation of the first embodiment of the present invention.

The abnormal event detecting unit 28 waits for an abnormal status occurrence reporting till it detects a system abnormal occurrence based on the system status monitoring information from the system status monitoring unit 27 (step C1 in FIG. 11). When an abnormal status occurrence is detected, the abnormal event detecting unit 28 performs an interrupt report to the reporting unit 36 (step C2).

In the step A3 in FIG. 9, between the current time and the abnormal event occurrence, when a current time report interrupting process occurs, the leading number (#1) of the time information table is set to the time information index counter (not shown) in the time detector 34 (step A4).

The time detector 34 receives time information corresponding to the index number (#1) from the time information storing unit 32 and decides whether the current time from the clock 33 is included during a period of the reporting start/end time (step A5).

In the step A5, if the current time from the clock 33 is not included during the period of the reporting start/end time corresponding to the index time (in this case, #1), the index is changed to #2 by updating (or adding by 1) the time information index counter in the time detector 34 (step A6).

The process in the steps A5 and A6 is continued till the time information each corresponding to the index numbers #1 to #6 or the current time from the clock 33 included during the period of the reporting start/end time is retrieved (step A7).

If the time information each corresponding to the index numbers #1 to #6 does not include the current time, a report-destination invalid code is set to the reporting unit 36 (step A8). In the step A2, the operation is waited till the time information or an abnormal status occurrence is reported.

In the step A5, when a current time from the clock 33 which is included during the reporting start/quit time period corresponding to an index number is retrieved, the value of the time information index counter is compared with the current report-destination table number (or an index number currently selected by the report-destination selector 35) (step A9).

With the reporting unit 36 setting a report destination (telephone number) corresponding to time information, when the index counter value is equal to the current report-destination table number, the flow is again in a waiting state till the time information or abnormal occurrence report is received in the step A2.

When the index counter value is different from the current report-destination table number, the report-destination (telephone number) stored in a report-destination information table (report-destination information storing unit 31) and indicated with a value of the time information index counter is set to the reporting unit 36 (step A10). Then, the time information index counter is saved to the value of the current report-destination index (current report-destination table number) (step A11). Then, the flow is again in a waiting state in the step A2 till time information or abnormal occurrence report is received.

Thus, the reporting unit 36 sets a report-destination (telephone number) corresponding to the time information.

Between a current time and an abnormal event occurrence, when it is decided in the step A3 that an interrupt process of an abnormal status report is being served, it is decided whether the value of a time information index counter set to the reporting unit 36 and indicated to the report-destination is a report-destination invalid code (step A12).

When the time information index counter has a value being a report-destination invalid code, the flow is in a waiting state till the time information or abnormal occurrence report is received in the step A2. However, when the time information index counter does not have a report-destination invalid code, the reporting is carried out to the report destination indicated with the value via the telephone line 23 (step A13).

For example, if the current time is 08:40 on Monday, the report-destination selector 35 selects the telephone number (34373) (index number #1) of a station from the report-destination information storing unit 31 and sets it to the reporting unit 36. This situation is maintained till 17:30. During this situation, when the abnormal event detecting unit 28 detects an abnormal status in the computer system 21, the information is inputted to the reporting unit 36 in the reporting mechanism 26A.

The reporting unit 36 carries out an analysis of a signal from the abnormal event detecting unit 28 to report the abnormal message corresponding to the abnormal content to the report destination 24, or a station, via the telephone line 23.

In response to the report, the system manager or maintenance crew can deal with the trouble at the abnormal spot monitored, thus reopening the operation.

Next, at 17:30, the telephone number (index number of the pager terminal is set to the reporting unit 36. In the same manner, according to the time information stored in the time information storing unit 32 and current time from the clock 33, the telephone number of the destination 24 to be reported is set to the reporting unit 26. During the time period, when an abnormal status occurs in a computer system 21, an abnormal message is reported to the telephone number of the report destination set by the reporting unit 36.

As described above, according to the first embodiment of the present invention, when an abnormal status occurs in the computer system 21, a member who can deal most effectively with to the trouble can be located and certainly reported according to the abnormal occurrence time. Hence, there is an advantage in that a delayed reporting can be eliminated, due to a report to an inadequate troubleshooter, a trouble in a report destination and an absence of a maintenance member in a report destination, whereby the reporting capability can be largely improved.

Figure 12:
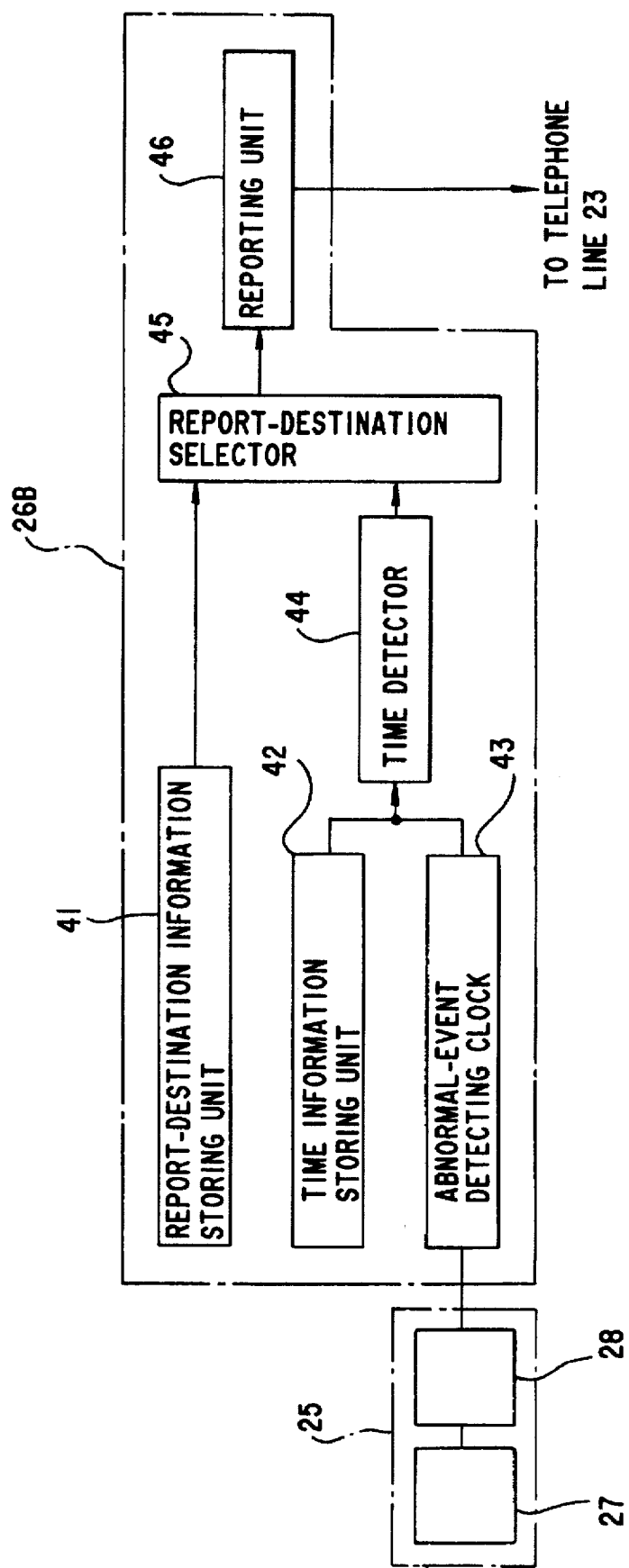
FIG. 12 is a block diagram showing the report processing device according to the second embodiment of the present invention.

(c) Explanation of Second Embodiment:

FIG. 12 is a diagram showing a report processing device according to the second embodiment of the present invention. Referring to FIG. 12, the report processing device corresponds to the report processing device of the first embodiment shown in FIG. 6. However, this report processing device includes an abnormal status detecting clock 43 instead of the clock 33 that outputs a current time.

As shown in FIG. 12, the abnormal status detecting mechanism 25 includes a system status monitoring unit (system status monitoring means) 27 and an abnormal event detecting unit (abnormal event detecting means) 28, each having the same function as that in the first embodiment. Like the first embodiment, the reporting mechanism 26B includes a report destination information storing unit 41, a time information storing unit 42, a report-destination selector 45, a reporting unit 46, an abnormal status detecting clock 43, and a time detector 44.

Hence, each of the report-destination information storing unit 41 and the time information storing unit 42 stores report-destination information and time information each to which an index, for example, shown in FIG. 8 is added.

The abnormal status detecting clock 43 that has a calendar function receives information regarding an abnormal occurrence detection from the abnormal event detecting unit 28 and outputs the time and the day of week.

The time detector 44 compares a day of week and a time period stored in the time information storing unit 42 with abnormal status occurrence time from the abnormal status detecting clock 43. If the day of week and the time at the abnormal status occurrence time are included in the day of week and time period stored in the time information storing unit 42, the time detector 44 outputs the fact.

The report destination selector (report destination setting means) 45 selects a telephone number from the report-destination information storing unit 41 to set it to the reporting unit 46, the telephone number corresponding to information regarding the day of week and time sent from the time detector 44.

The reporting unit (reporting means) 46 reports a message corresponding to an abnormal status content from the abnormal event detector 28 to the report destination selected by the report destination selector 45 via the telephone line 23.

The operation of the report processing device according to the second embodiment of the present invention will be explained below with reference to the flowchart shown in FIGS. 13 to 15.

Figure 13:
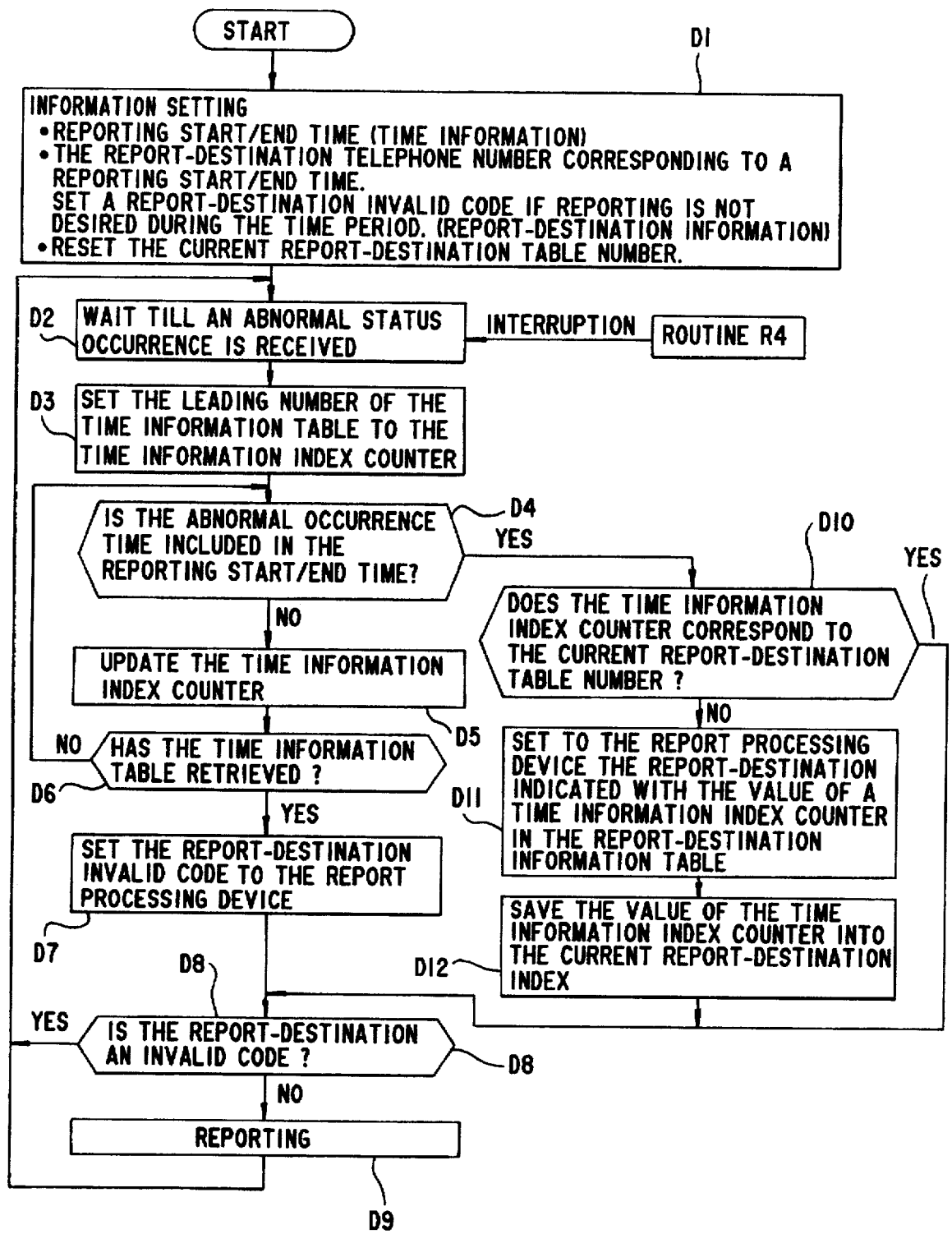
FIG. 13 is a flowchart used for explaining the operation of the second embodiment according to the present invention.

In the step D1 of the flowchart shown in FIG. 13, like the initialization shown in FIG. 8, a day of week and a job starting/quitting time each with an index number which can be reported to the report-destinations telephone number are set to the time information storing unit 42 while the report-destination's telephone number corresponding to the day of week and time with an index is set to the report-destination information storing unit 41. Where reporting is not intended at a time set by the time information storing unit 42, a report destination invalid code is set to the report-destination information storing unit 41. The current report-destination table number (index number) selected by the report destination selector 45 is reset (step D1).

Next, the flow is in a waiting state till the abnormal status detecting clock 43 reports an abnormal status occurrence time to the time detector 44 (step D2). As shown with the flowchart in FIG. 15, the abnormal status detecting clock 43 reports an abnormal status occurrence time by handling an interrupt process (routine R4).

That is, the abnormal status detecting clock 43 waits reporting an abnormal status occurrence time till the abnormal event detector 28 detects an abnormal status occurrence in a system, based on monitor information regarding the system status from the system status monitoring unit 27 (step F1). When an abnormal status occurs, the interrupt process serves to read out the current time preset in the clock to the time detector 44 (step F2) (step F3).

Figure 14:
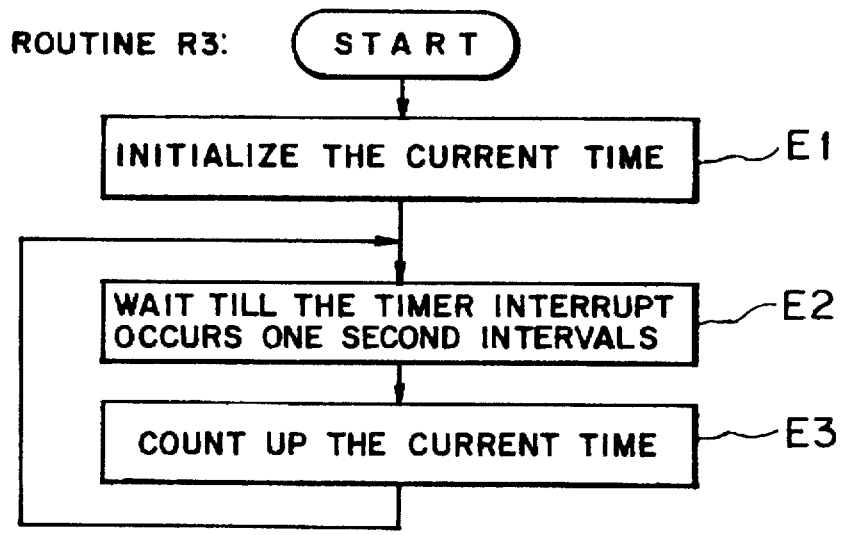
FIG. 14 is a flowchart used for explaining the operation of the second embodiment according to the present invention.
Figure 15:
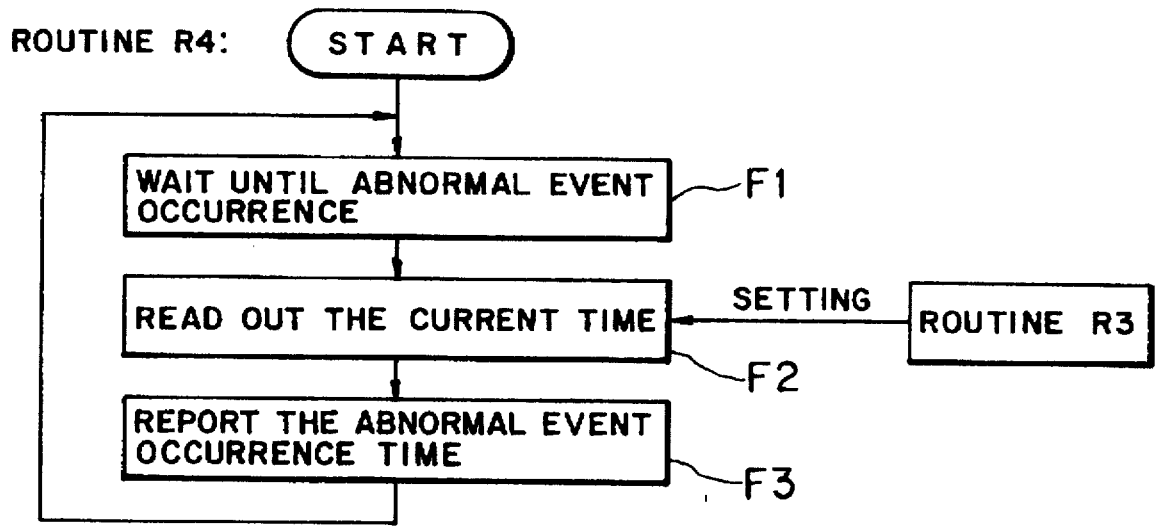
FIG. 15 is a flowchart used for explaining the operation of the second embodiment according to the present invention.

The current time read out in the step F2 is obtained through the interrupt process (routine R3) shown with the flowchart in FIG. 14.

That is, with the status at which the current time is initialized (in the step E1 shown in FIG. 14), the flow is in a waiting state till a timer interruption is served at one second intervals (step E2). Then, when the interruption is served, the current time is counted up (step E3).

In the step D2 shown in FIG. 13, when an abnormal status occurrence time is reported, the leading number #1 of the time information table is set to the time information index counter in the time detector 44 (step D3).

The time detector 44 receives the time information corresponding to the index number #1 from the time information storing unit 42 and decides whether the current time from the abnormal status detecting clock 43 is included during the reporting start/end time (step D4).

In the step D4, if the current time from the abnormal status detecting clock 43 is not included during the reporting start/end time corresponding to the index number (or #1), the index number is changed to #2 by updating (or adding by 1) the time information index counter in the time detector 44 (step D5).

As for of the time information corresponding to the index numbers #1 to #6, the processes in the steps D4 and D5 are repeated till the current time from the abnormal status detecting clock 43 is included during a period between the reporting start time and the reporting end time (step D6).

When the time information corresponding to each of the index numbers #1 to #6 is not included in the current time, a report-destination invalid code is reported to the reporting unit 46 (step D7). Then since it is decided that the time information has a report-destination invalid code in the step D8, the flow goes to the step D2. The process is in a waiting state till the abnormal status detecting clock 43 reports again an abnormal status occurrence time to the time detector 44.

In the step D4, when it is retrieved that the abnormal status detection time from the abnormal status detecting clock 43 is included during the period of the reporting start time and the reporting end time each corresponding to the index number, the value of the time information index counter at that time is compared with current report-destination table number (an index number currently selected by the report-destination selector 45) (step 10).

If the value of the index counter is equal to the current report-destination table number, the index number selected by the report destination selector 45 is received. Since the report destination (telephone number) set by the reporting unit 46 is a report destination (telephone number) corresponding to the abnormal status detection time, if the value of the index counter is not a report-destination invalid code (step D8), a reporting operation is performed to the report destination via the telephone line 23 (step D9).

If the value of the index counter is different from the current report destination table number, the report destination (telephone number) indicated with a value of the time information index counter stored in the report-destination information table is set to the reporting unit 46 (step D11). Then, the value of the time information index counter is saved in the current report-destination index (current report-destination table number) (step 12). When the value of the index counter is not a report-destination invalid code (step D8), reporting is performed to the report destination via the telephone line 23 (step D9).

Thus, the report destination (telephone number) corresponding to the time information is set to the reporting unit 46.

For example, if an abnormal status occurs in a computer system at 09:40 on Monday, the abnormal status detecting mechanism 25 inputs a certain signal to the reporting mechanism 26B. The reporting mechanism 26B selects a report destinations (or station's) telephone number (34373) corresponding to the time at which a signal has been inputted while it selects the abnormal status message corresponding to an abnormal content through a signal analysis, thus reporting the result to the report processing device (or station) 24 via the telephone line 23 and the exchange 23. In response to the reporting, a manager or maintenance crew can deal with the abnormal status at the abnormal status monitoring spot, thus reopening the operation.

Thereafter, every time an abnormal status occurs in the computer system 21, the report processing device 46 selects a report destination's telephone number corresponding to the abnormal occurrence time to produce an abnormal message.

As described above, like the first embodiment, the report processing device of the second embodiment of the present invention has an advantage in that when an abnormal status occurs in the computer system 21, a member who can deal most effectively with the trouble can be located and reported according to the abnormal status occurrence time.

Figures 16, 17:
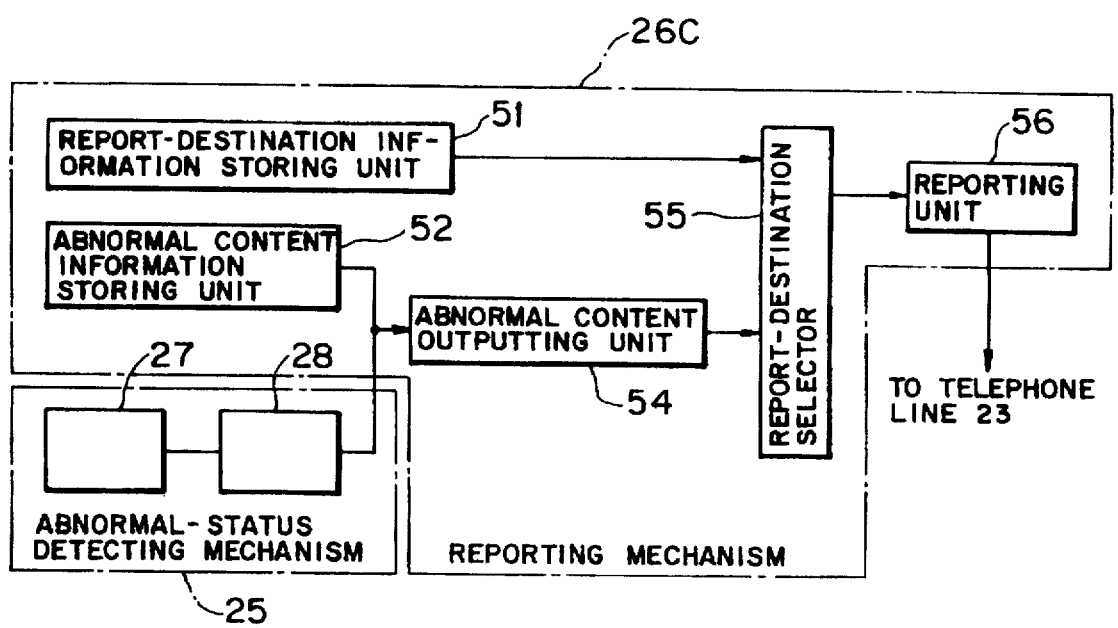
FIG. 16 is a block diagram showing the report processing device according to the third embodiment of the present invention.
FIG. 17 is a table showing information stored into the report-destination information storing unit and information stored into the abnormal content information storing unit according to the third embodiment of the present invention.

(d) Explanation of Third Embodiment:

FIG. 16 is a diagram showing the report processing device according to the third embodiment of the present invention. The report processing device shown in FIG. 16 corresponds to the report processing device 22 shown in FIG. 6. In the third embodiment, the report processing device is different from those in the first and second embodiments in that a report destination is selected according to an abnormal event (content), instead of time.

That is, the report processing device shown in FIG. 16 includes an abnormal status detecting mechanism 25 for detecting an abnormal status of the computer system 21, and a reporting mechanism 26C for performing reporting to a report destination in accordance with an abnormal status message corresponding to a detected abnormal status content.

The abnormal status detecting mechanism 25 includes a system status monitoring unit (system status monitoring means) 27 and an abnormal event detecting unit (report-event detecting means) 28. The reporting mechanism 26C includes a report-destination information storing unit 51, an abnormal content information storing unit 52, an abnormal content outputting unit 54, a report-destination selector 55, and a reporting unit 56.

The abnormal status detecting mechanism 25 has the same function as those of the first and second embodiments. Hence, the system status monitoring unit 27 and the abnormal event detecting unit 28 have the same functions of those of the first and second embodiments, respectively.

The report-destination information storing unit (event-to-report-destination table) 51 stores report-destination information such as report-destination's telephone numbers set and registered. As shown in FIG. 17, for example, report destinations with index numbers (#1 and #2) are set according to a detected event. The abnormal content information storing unit 52, as shown in FIG. 17, sets an abnormal content which can be reported to the report-destination's telephone number stored in the report-destination information storing unit 51. An index number added to a report destination information stored in the report-destination information storing unit 31 is added to each report content.

As for an abnormal event, "system down" (index number #1) is reported to a manager's station while "parts replacement" (index number #2) is reported to a maintenance crew's station.

In this case, abnormal events other than "system down" and "parts replacement" are not reported.

The abnormal content outputting unit 54 compares abnormal content information stored in the abnormal content information storing unit 52 with an abnormal event detected by the abnormal-event detecting unit 28, and produces the fact if there are the same abnormal events.

The report destination selector (report-destination setting means) 55 receives abnormal content information from the abnormal content outputting unit 54 and selects the report-destination corresponding to the abnormal content from report-destination information stored in the report-destination information storing unit 51, thus setting it to the reporting unit 56.

The reporting unit 56 reports a message corresponding to the abnormal content to the report destination set by the report destination selector 55.

The operation of the report processing device according to the third embodiment of the present invention will be explained below with reference to the flowchart in FIGS. 18 and 19.

Figure 18:
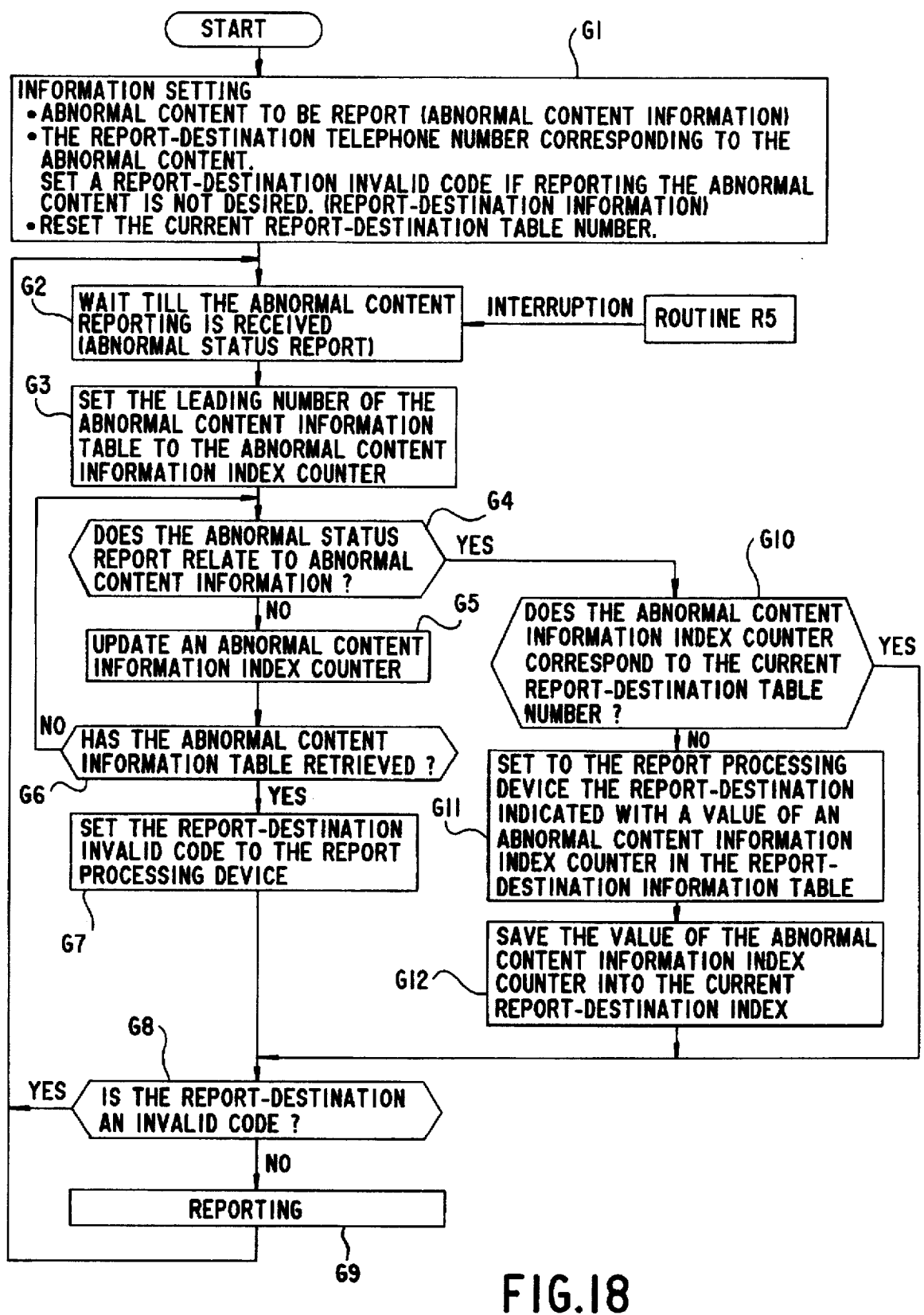
FIG. 18 is a flowchart used for explaining the operation of the third embodiment of the present invention.
Figure 19:
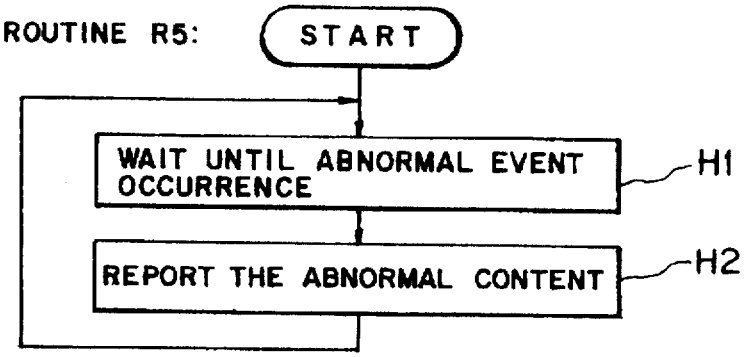
FIG. 19 is a flowchart used for explaining the operation of the third embodiment of the present invention.

In the step G1 of the flowchart in FIG. 18, as shown in FIG. 17, an abnormal content with an index number that can be reported to a report-destination's telephone number is preset into the abnormal content information storing unit 52 while the corresponding report-destination's telephone number is set to the report-destination information storing unit 51. When reporting the content which has been set to the abnormal content information storing unit 52 is not intended, the report-destination invalid code is set to the report-destination information storing unit 51 while the current report-destination table number (index number) selected by the report destination selector 55 is reset (step G1).

Next, the flow is in a waiting status till the abnormal event detecting unit 28 reports an abnormal content to the abnormal content outputting unit 54 (step G2). However, an abnormal content from the abnormal event detecting unit 28 is reported by the interrupt process (routine R5) shown with the flowchart in FIG. 19.

The abnormal event detecting unit 28 receives the monitor information regarding the system information from the system status monitoring unit 27. The flow is in a waiting state till the abnormal event detecting unit 28 detects an abnormal status occurrence in a system (step H-1). An abnormal status occurrence is reported to the abnormal content outputting unit 54 by outputting the content by the interrupt process (step H-2).

In the step G2 shown in FIG. 18, when an abnormal content is reported, the leading number #1 of the abnormal content information table (abnormal content information storing unit 52) is set to the abnormal content index counter in the abnormal content outputting unit 54 (step G3).

The abnormal content outputting unit 54 receives an abnormal content corresponding to an index number #1 from the abnormal content information storing unit 52 and then decides whether there is an abnormal event corresponding to an index number #1 reported by the abnormal event detector 28 (step G4).

In the step G4, if the abnormal event reported by the abnormal event detector 28 does not corresponds to the index number #1, the index number is changed to #2 by updating (or adding by 1) an abnormal content information index counter in the abnormal content outputting unit 54. Then, it is decided whether the abnormal event reported by the abnormal event detector 28 corresponds to the index number #2 (steps G5 and G6).

When the abnormal event reported by the abnormal event detector 28 does not correspond to the index number #2, a report-destination invalid code is set to the reporting unit 56 (step G7). Thus, since it is decided that there is a report-destination invalid code in the step G8, the process goes to the step G2. The flow is in a waiting state till the abnormal event detector 28 reports again the abnormal event to the abnormal content outputting unit 54.

In the step G4, when the abnormal event from the abnormal event detector 28 corresponds to the index number #1 or #2, the value of the abnormal content information index counter is compared with the current report destination table number (an index number currently selected by the report destination selector 55) (step G10).

When the value of the index counter is equal to the current report-destination table number, the report destination (telephone number) of the current report-destination table number corresponds to the abnormal event reported in the step G2. Hence, if the index counter outputs a value with no report-destination invalid code (step G8), the message is sent to the report destination according to the abnormal content, using the telephone line 23 (step G9).

When the value of the index counter is different from the current report-destination table number, the report destination (telephone number) indicated with the value of the abnormal content information index counter in the report-destination information table (or the report-destination information storing unit 51) is set to the reporting unit 56 (step G11) to save the corresponding value to the current report-destination index (current report-destination table number) (step G12). If the value of the index counter is not the report-destination invalid code (step G8), a message is sent to the report destination according to the abnormal content, using the telephone line 23 (step G9).

As described above, the report destination (telephone number) according to the abnormal content information is set to the reporting unit 56.

For example, when the abnormal event detecting unit 28 reports that a parts failure has occurred in the computer system 21 to the abnormal content outputting unit 54, the report-destination selector 55 selects the telephone number (24373 of a maintenance crew, the index number #2) for the parts replacement. At the same time, the report destination selector 55 carries out a signal analysis and reports an abnormal message corresponding to the abnormal content to the report destination 24 via the telephone line 23. The maintenance crew can deal with the trouble at the abnormal monitoring spot and based on the report, thus reopening the operation.

As described above, according to the third embodiment of the present invention, when an abnormal status occurs in the computer system 21, a member who can handle most effectively the trouble can be located and reported certainly. Hence, a delayed reporting because of reporting to an inadequate troubleshooter, a trouble of the report destination and no presence of a member at the report destination can be eliminated, whereby the reporting performance can be largely improved.

Figure 20:
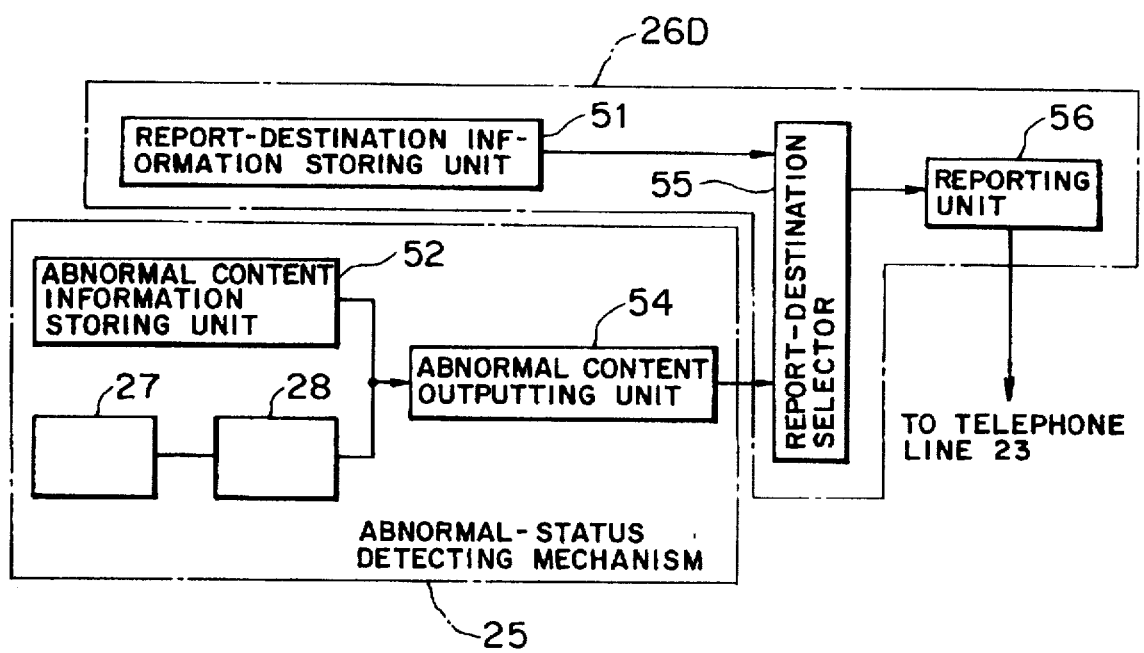
FIG. 20 is a block diagram showing a modification of the third embodiment according to the present invention.

(d1) Explanation of Modification of Third Embodiment:

FIG. 20 is a block diagram showing a modification of the third embodiment according to the present invention. In the report processing device shown in FIG. 20, unlike the third embodiment, the reporting mechanism 26D does not have the abnormal content information storing unit 52 and the abnormal content outputting unit 54. However, the abnormal status detecting mechanism 25 includes the abnormal content information storing unit 52 and the abnormal content outputting unit 54. Like numerals are attached to other elements having substantially same functions as those of the third embodiment, respectively.

The operation of the first modification of the third embodiment according to the present invention will be explained below with reference to the flowchart shown in FIGS. 21 to 23.

Figure 21:
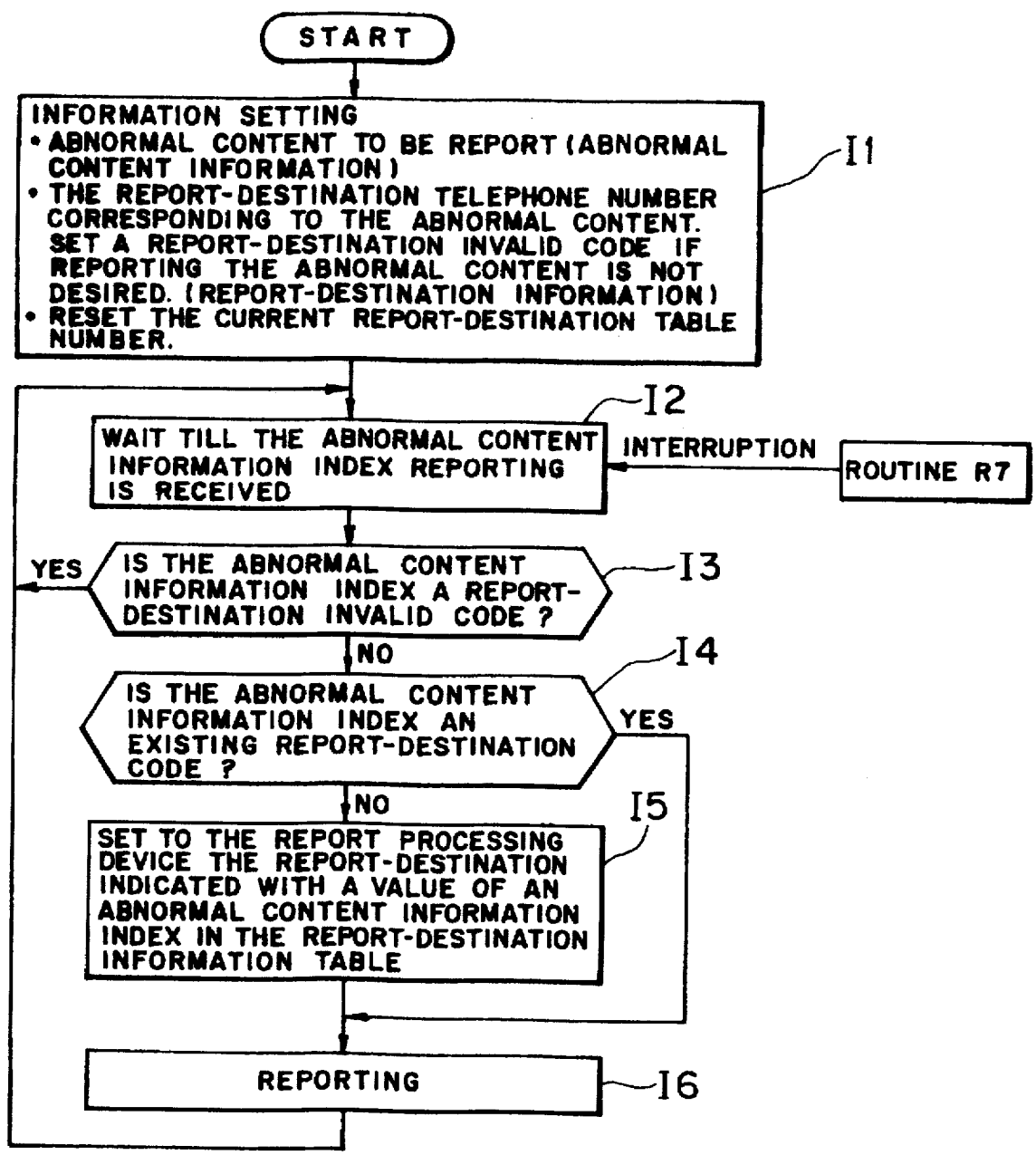
FIG. 21 is a flowchart used for explaining the operation of the modification of the third embodiment according to the present invention.

In the step I1 of the flowchart shown in FIG. 21, like the step shown in FIG. 17, an abnormal content with an index number which can be reported to the report destination's telephone number is initially set to the abnormal content information storing unit 52 and the report destination's telephone number corresponding to the abnormal content with an index number is initially set to the report-destination information storing unit 51. When reporting the content set to the abnormal content information storing unit 52 is not intended, the report-destination invalid code is set to the report-destination storing unit 51. The current report-destination table number (index number) selected by the report-destination selector 55 is reset (step I1).

Next, the flow is in a waiting state till an abnormal content information index reporting, wherein the abnormal content outputting unit 54 outputs the value of the index counter to the report destination selector 55, is performed (step I2). The abnormal content outputting unit 54 reports an abnormal content by handling the interrupt process (routine R7) shown with the flowchart in FIG. 23.

In the step I3, when the value of the index counter from the abnormal content outputting unit 54 being a report invalid code is registered to the report-destination information storing unit 51, the abnormal content information index report is again in a waiting state (step I2). When the value of the index counter is not a report invalid code, it is decided whether the abnormal content information index (a value of the index counter) belongs to the report destination already set to the report destination 56.

When the abnormal content information index belongs to the report destination already set to the report destination 56, a report including a message in response to an abnormal content is sent to the report destination via the telephone line 23 (step I6). When the abnormal content information index does not belong to the report destination already set to the report destination 56, the report destination indicated with an abnormal content information index value in the report-destination information table (the report-destination information storing unit 51) is set to the reporting unit 56.

A report destination (telephone number) according to the abnormal content information is set to the reporting unit 56.

In the step I2, an interrupt process (routine R7) for interrupting an abnormal content report from the abnormal content outputting unit 54 will be explained below.

Figure 23:
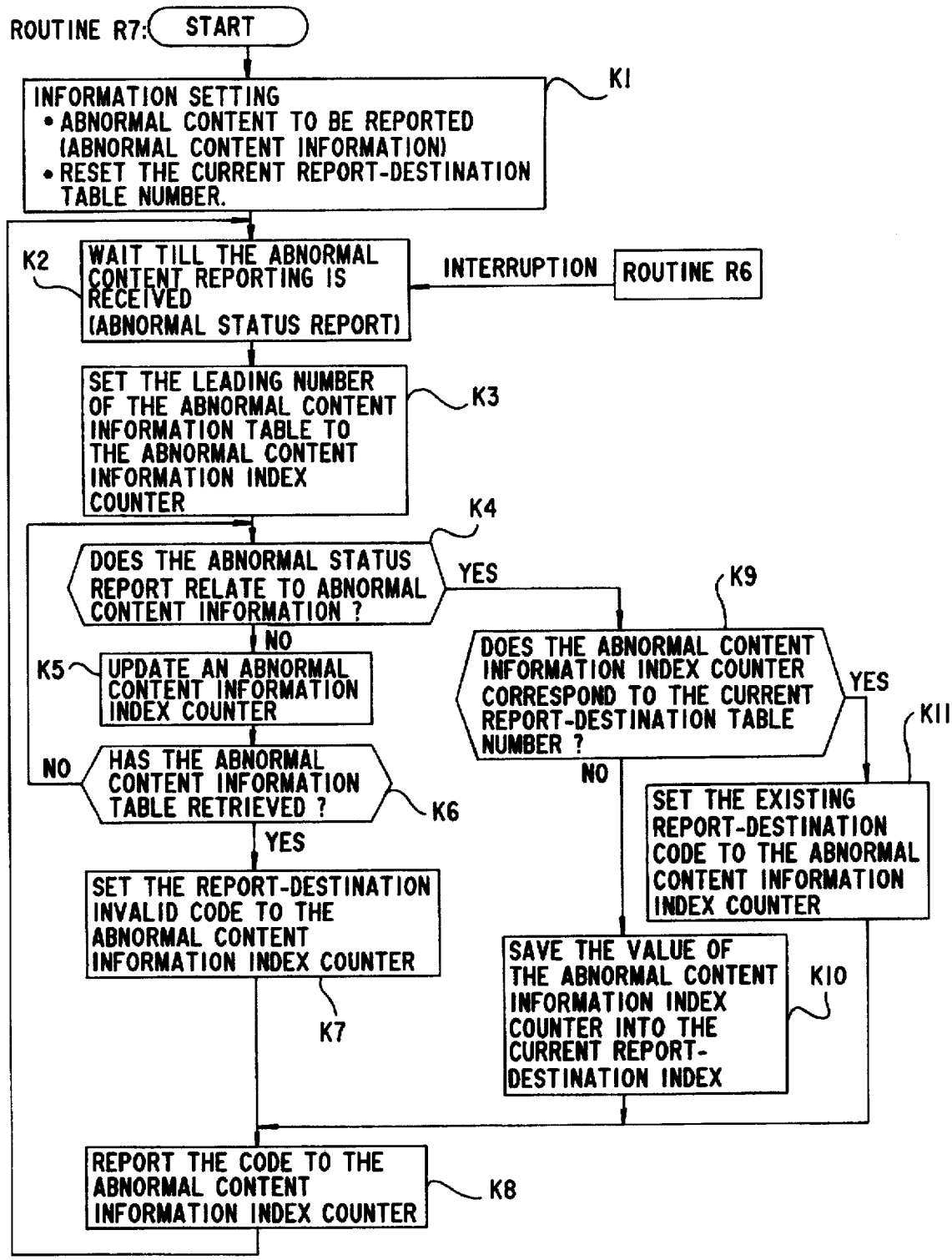
FIG. 23 is a flowchart used for explaining the operation of the modification of the third embodiment according to the present invention.

In the flowchart shown in FIG. 23, an abnormal content to be reported with an index number is initially registered to the abnormal content information storing unit 52, while report-destination table number (index number) currently set to the abnormal content outputting unit 54 is reset (step K1).

The operation is in a waiting state till the abnormal event detecting unit 28 reports an abnormal content to the abnormal content outputting unit 54 (step K2). The abnormal content from the abnormal event detecting unit 28 is reported by handling an interrupt process (routine R6) shown with the flowchart in FIG. 22.

Figure 22:
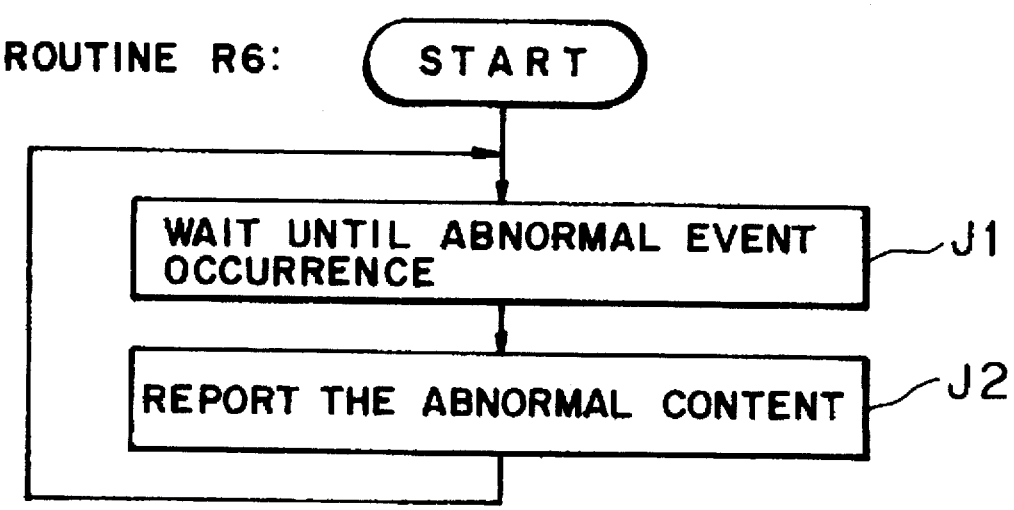
FIG. 22 is a flowchart used for explaining the operation of the modification of the third embodiment according to the present invention.

In the flowchart shown in FIG. 22, the abnormal event detecting unit 28 receives monitor information regarding the system status from the system status monitoring unit 27 and waits till it detects an abnormal status occurrence in a system (step J1). When there is an abnormal status occurrence, an interrupt process serves to report the content to the abnormal content outputting unit 54 (step J2).

Next, in the step K2 of the flowchart shown in FIG. 23, when an abnormal content is reported, the leading number #1 of the abnormal content information table (abnormal content information storing unit 52) is set to the abnormal content index counter in the abnormal content outputting unit 54 (step K3).

The abnormal content outputting unit 54 receives the abnormal content corresponding to the index number #1 from the abnormal content information storing unit 52 and decides whether the abnormal event reported to the abnormal event detecting unit 28 is an abnormal event corresponding to the index number #1 (step K4).

In the step K4, when the abnormal event reported to the abnormal event detecting unit 28 does not correspond to the index number #1, the abnormal content information index counter in the abnormal content outputting unit 54 is updated (or incremented by 1) to #2, thus deciding whether the abnormal event reported to the abnormal event detecting unit 28 corresponds to the index number #2 (steps K5 and K6).

When the abnormal event reported to the abnormal event detecting unit 28 does not corresponds to the index number #2, the value of the abnormal content information index counter is reported as a report destination invalid code (step K8).

Thereafter, the flow goes to the step K2 and is in a waiting state till the abnormal event detecting unit 28 reports an abnormal event to the abnormal content outputting unit 54.

In the step K4, when the abnormal event from the abnormal event detecting unit 28 corresponds to the index number #1 or #2, the abnormal content outputting unit 54 compares the current value of the abnormal content information index counter with the current report-destination table number (the index number currently selected in the report-destination selector 55) (step K9).

When the value of the index counter is different from the current report-destination table number, the value of the abnormal content information index counter is saved to the current report-destination index (current report-destination table number) (step K10). The abnormal content information index reporting is performed by outputting the value of the abnormal content information index counter (step K8).

When the value of the index counter is equal to the current report-destination table number, an existing report destination code is set to the index counter because the report destination has been already set by the reporting unit 56 (step K11). Outputting the value of the abnormal content information index counter allows the abnormal content information index to be reported (step K8).

The abnormal detecting mechanism 25 can report an abnormal content information index to the reporting mechanism 26D.

For example, an abnormal status occurs due to a parts failure in the computer system 21, the abnormal status detecting mechanism 25 produces a certain signal (abnormal content information index) corresponding to the abnormal content (in this case, a parts replacement).

Based on the abnormal content information index inputted to the report destination selector 55, the reporting mechanism 26D outputs selectively the telephone number (24373) of a report destination (a maintenance crew's station). The reporting unit 56 analyzes the signal inputted by the abnormal status detecting mechanism 25 to select an abnormal message corresponding to the abnormal content, thus reporting it to the report destination 24 via the telephone the 23. In response to the report, the maintenance member can deal with the trouble at the abnormal monitoring spot to reopen the operation.

As described above, according to the modification of the third embodiment of the present invention, when a malfunction occurs in the counter system 21, a member who can deal more effectively with the trouble can be located with the abnormal content to perform a certain reporting, whereby the same advantage as that of the third embodiment can be provided.

Figure 24:
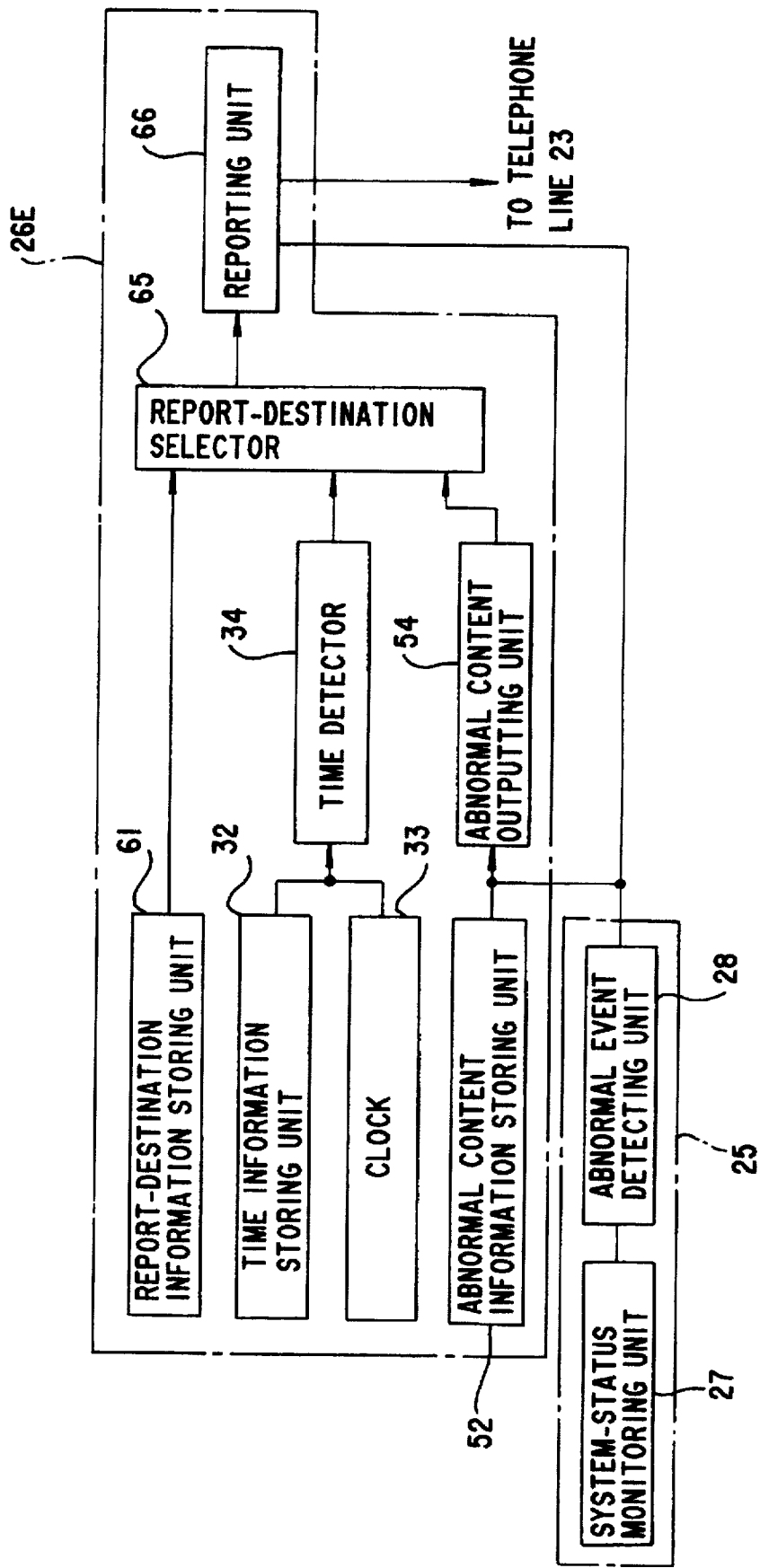
FIG. 24 is a block diagram showing the report processing device according to the fourth embodiment of the present invention.

(e) Explanation of Fourth Embodiment:

FIG. 24 is a block diagram showing the report processing device according to the fourth embodiment of the present invention. The report processing device shown in FIG. 24 corresponds to the report processing device 22 shown in FIG. 6. The report processing device is different from those in the first to third embodiments in that a report destination is selected in accordance with time and an abnormal event (content).

Referring to FIG. 24, the report processing device includes an abnormal status detecting mechanism 25 for detecting an abnormal status of the computer system 21 and a reporting mechanism 26E for reporting an abnormal message corresponding to the detected abnormal content to a report destination.

The abnormal status detecting mechanism 25 includes the system status monitoring unit (system status monitoring means) 27 and the abnormal event detecting unit (report-event detecting means) 28, which have the same functions as those in the first and second embodiments.

Like the first embodiment, the reporting mechanism 26E includes a time information storing unit 32, a clock 33, and a time detector 34. Like the third embodiment, the reporting mechanism 26E includes the abnormal content information storing unit 52 and the abnormal content outputting unit 54.

The report destination information storing unit 61 stores a report destination (telephone number) to be reported with an index number.

The report destination selector 65 receives time detection information from the time detector 34 and abnormal content information from the abnormal content outputting unit 54 and selects the report destination indicated with an index number in the report-destination information storing unit 61 to register to the reporting unit 66, based on the two pieces of information.

The reporting unit 66 reports a message corresponding to an abnormal content from the abnormal event detector 28 to a report-destination selected by the report destination selector 65 via the telephone line 23.

The report processing device according to the fourth embodiment of the present invention operates as follows:

In order to perform an initialization, the telephone number of a report destination is set to the report-destination information storing unit 61, the day of week and a job starting/quitting time to be reported are set to the time information storing unit 32, and an abnormal content to be reported is set to the abnormal content information storing unit 52.

When the abnormal event detector 28 detects an abnormal event, based on monitor information regarding the system 21 from the system status monitoring unit 27, the fact is reported to the reporting mechanism 26E. The report destination selector 65 selects the abnormal event detection time and the report destination corresponding to the content of an abnormal event. The reporting unit 66 reports a message corresponding to the abnormal content from the abnormal event detector 28 to the report destination selected by the report destination selector 65 by means of the telephone line 23.

According to the report processing device of the fourth embodiment of the present invention, when an abnormal status occurs in the computer system 21, a member who can handle more effectively the trouble according to the abnormal content and an abnormal occurrence time can be located comprehensively to execute a reliable reporting. Hence, there is an advantage in that the reporting capability can be largely improved by eliminating a delayed reporting procedure caused by a report to an inadequate troubleshooter, a trouble of the report destination, and no presence of a maintenance crew at the report destination.

The embodiment described above which is constituted by combining the first embodiment with the third embodiment selects a report destination in accordance with an abnormal content and an abnormal status occurrence time. The present invention should not be limited to the embodiment described above. The present embodiment described above may be combined with the report processing device shown in the modification of the third embodiment.

(f) Explanation of Fifth Embodiment:

FIG. 25 is a block diagram showing the report processing device according to fifth embodiment of the present invention. The report processing device shown in FIG. 25 corresponds to the report processing device 22 shown in FIG. 6. However, the report processing device is different from those of the first to fourth embodiments in that the report destination is selected in accordance with the working condition of managers.

The report processing device, as shown in FIG. 25, includes an abnormal status detecting mechanism 25 for detecting an abnormal status of the computer system 21 and a reporting mechanism 26F for reporting an abnormal message corresponding to a detected abnormal content to a report destination.

The abnormal status detecting mechanism 25 includes a system status monitoring unit (system status monitoring means) 27 and an abnormal event detecting unit (report event detecting means) 28, each having the same function as those of the first, second and fourth embodiments.

The reporting mechanism 26F includes a report-destination information storing unit 71, an working information managing unit 72, a time card/ID card reader 73, a report destination selector 75, and a reporting unit 76.

The report-destination information storing unit (location-to-report-destination table) 71 stores the report-destination information regarding the telephone number of a report destination set and registered. As shown in FIG. 26, the report-destination information storing unit 71 stores the telephone numbers to be used at which a manager is at his office (or at a job starting time) and the telephone number to be used at which the manager is out of his office (or a job quitting time).

The time card/ID card reader 73 produces the working information regarding the manager or maintenance crew in charge of the computer system 21. The working information managing unit 72 detects the job starting or quitting time of the manager or maintenance crew, based on the working information from the time card/ID card reader 73.

The report destination selector (report-destination setting means) 75 selects the report destination corresponding to the working information from the working information managing unit 72, with reference to the manager's location corresponding to the report destination information stored in the report-destination information storing unit 71, thus setting it to the reporting unit 76.

When the manager is at his office, the report destination selector 75 sets the telephone number of his station to the reporting unit 76. When the manager is not at his office, the report destination selector 75 reports to the reporting unit 76, for example, the report destination such as a pager terminal to be reported in such a situation.

If the telephone number to be reported is not preset to a working condition, the reporting operation is not performed.

The reporting unit 76 reports a message corresponding to the abnormal content to the report destination preset by the report destination selector 75 via the telephone line 23.

The operation of the fifth embodiment of the present invention will be explained below with reference to the flowchart shown in FIGS. 27 to 30.

Figure 27:
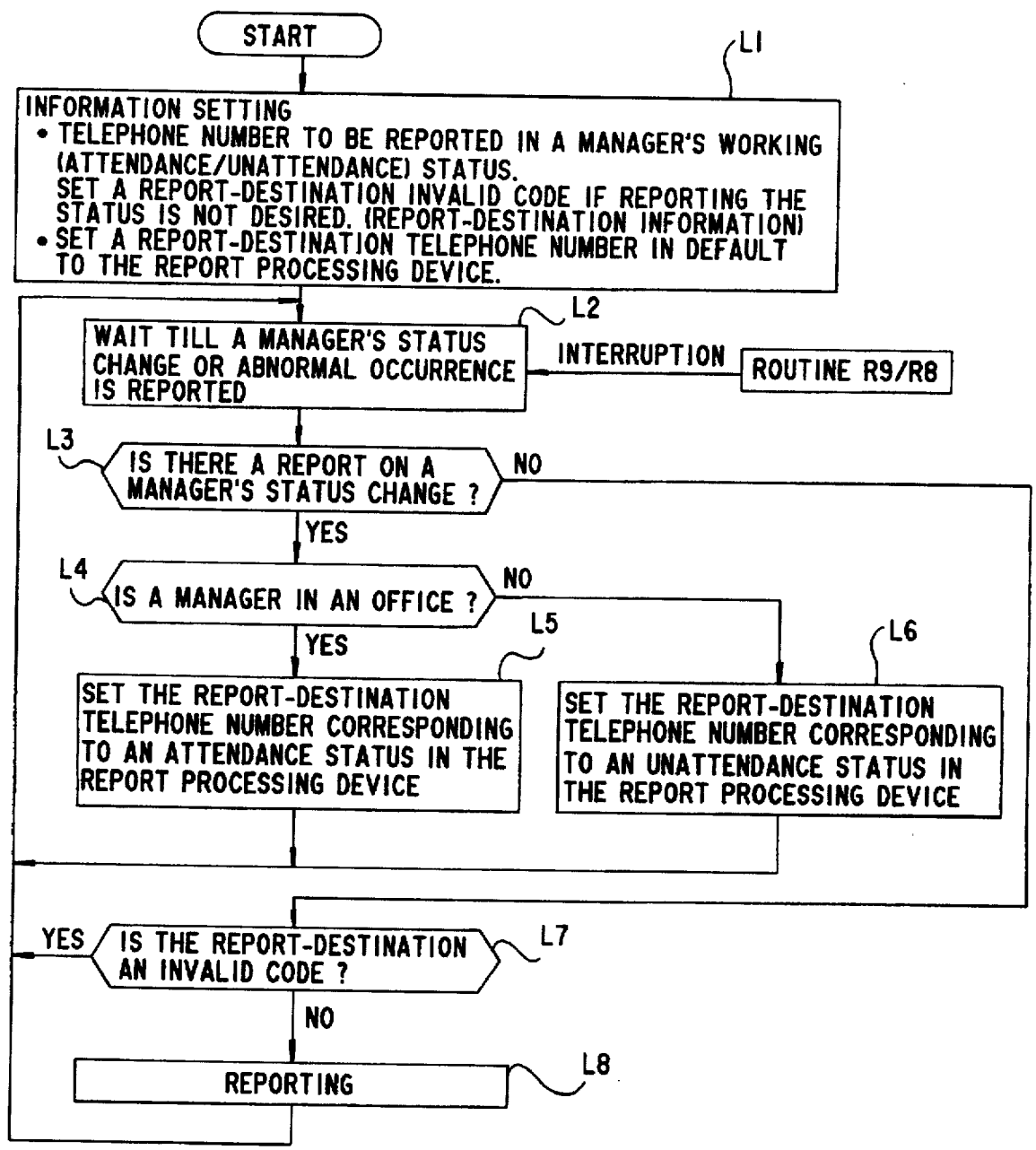
FIG. 27 is a flowchart used for explaining the operation of the fifth embodiment of the present invention.

In the flowchart shown in FIG. 27, as shown in FIG. 26, the telephone number of a report destination corresponding to the manager's working condition (a job starting time/a job quitting time) is set to the report-destination information storing unit 71. If reporting is not intended in some of manager's working conditions, the corresponding report-destination invalid codes are set to the report-destination information storing unit 71. Moreover, the report destination telephone number is set by default (step L1).

Next, the flow is in a waiting state till the working condition managing unit 72 reports a change in a manager's working state to the report destination selector 75 or the abnormal event detector 28 reports an abnormal status occurrence (step L2). Reporting an abnormal event from the abnormal event detector 28 is performed by handling the interrupt process (routine R8) shown with the flowchart in FIG. 28. Reporting a change in a manager's state from the working information managing unit 72 is performed by handling the interrupt process (routine R9) shown with the flowchart in FIG. 29.

Figure 28:
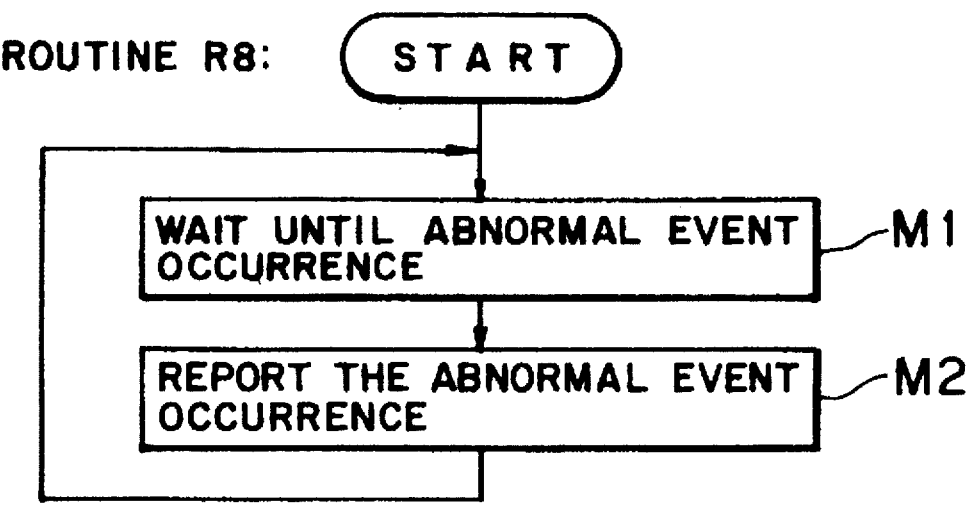
FIG. 28 is a flowchart used for explaining the operation of the fifth embodiment of the present invention.

In the flowchart shown in FIG. 28, the abnormal event detector 28 receives the monitor information regarding the system status from the system status monitoring unit 27. The process is in a waiting state till the abnormal event detector 28 detects an abnormal status occurrence (step M1). When an abnormal status occurs, the content is reported by handling the interrupt operation, whereby an abnormal status occurrence is reported (step M2).

Figure 29:
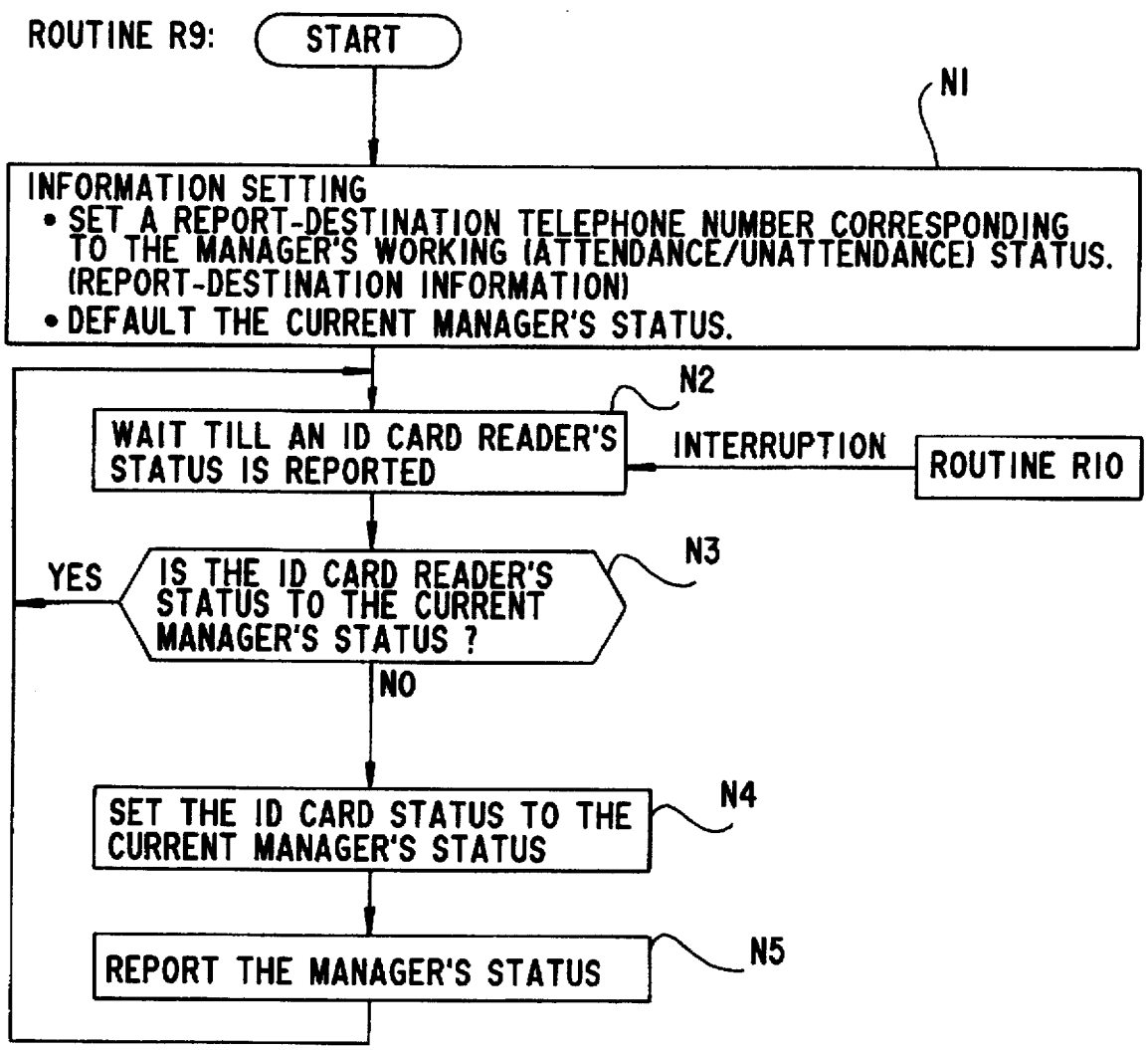
FIG. 29 is a flowchart used for explaining the operation of the fifth embodiment of the present invention.

In the flowchart shown in FIG. 29, the initializing process in the flowchart shown in FIG. 27 is carried out in the step L1. In the step N2, the process is in a waiting state till the working information managing unit 72 receives the ID card reader's condition from the time card/ID card reader 73. The condition of the ID card reader from the time card/ID card reader 73, as shown with the flow chart in FIG. 30, is reported by handling the interrupt process (routine R10).

Figure 30:
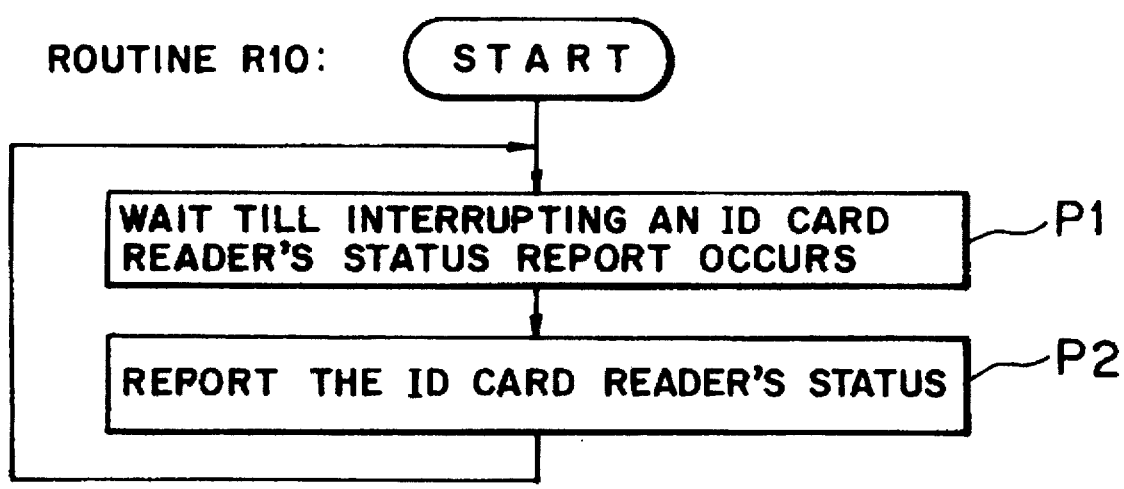
FIG. 30 is a flowchart used for explaining the operation of the fifth embodiment of the present invention.

In the flow chart shown in FIG. 30, the working information managing unit 72 waits till the time card/ID card reader 73 interrupts the condition of the ID card reader (step P1). When the interruption of the status of the ID card reader occurs, the working information managing unit 72 receives as a report the status of the ID card reader (step P2).

In the step N2 of the flowchart shown in FIG. 29, when the status of the received ID card reader is the current manager's status already preset (or there is no change in the status of the received ID card), the process is in a waiting state till the status of the ID card reader is again received in the step N2.

When the received ID card reader is not in the current manager's status already set, the status of the received ID card reader is set to the current manager's status which is set to the working information managing unit 72 (step N4).

The change in a manager's status is reportted by transmitting the current management status set by the working information managing unit 72 to the report destination selector 75 (step N5). When a change in the manager's status or an abnormal occurrence is reported (in the step L2 of the flowchart shown in FIG. 27), it is decided whether the report relates to a change in the manager's status in the step L3.

If the report is a manager's status change, it is decided whether the manger is at his office (step L4). If he is at his office, the telephone number of the report destination corresponding to the attendance status (in this case, the telephone number of a manager's station) is set to the reporting unit 76. When the manager is not at his office, the telephone number of the report destination corresponding to a nonattendant state (in this case, for example, the report destination such as a pager terminal at the absence of the manager) is set to the reporting unit 76.

In the steps L5 and L6, when the telephone number to be set to the reporting unit 76 is updated, the manager's status change report or the abnormal occurrence report becomes a waiting status (step L2).

In the step L3, when the abnormal event detector 28 reports an abnormal occurrence, a message in response to an abnormal content is reported to the report destination set in the reporting unit 76 not being a report-destination invalid code (step L7) via the telephone line 23 (step L8). When the report destination is a report-destination's invalid code, a change in the manager's status or an abnormal status occurrence is again in a waiting state, without reporting (step L2).

For example, when an abnormal status occurs in the computer system 21 at an attendance of the manager, the abnormal event detector 28 inputs a certain signal to the reporting unit 76. The reporting unit 76 carries out an analysis of the signal and then reports an abnormal message corresponding to the abnormal content to the manager's station, or the report destination 24, via the telephone line 23. In response to the report, the manager or maintenance crew can deal with the trouble at the abnormal status monitoring spot, thus reopening the operation. When the manager has been out after the office hours, the message is forwarded to the report destination such as a pager terminal to be reported at his absence time.

According to the report processing device of the fifth embodiment of the present invention, when an abnormal status occurs in the computer system 21, a member who can deal most effectively with the trouble can be located in accordance with his attending status, thus obtaining certainly the report. Hence, a slow reporting caused by a reporting to an inadequate troubleshooter, a trouble of the report destination, or an absence of the personnel at the report-destination can be eliminated, whereby the reporting capability can be improved largely and advantageously.

According to the present embodiment, the report destination is selected based on the managerts attending status. According to the present invention, this embodiment can adopt to information regarding the maintenance crew's attendance, or two pieces of information including the maintenance crew's attendance and the managerts attendance.

According to the present embodiment, the selecting means at a report destination can be applied to the first to fourth embodiments.

Figures 31, 32:
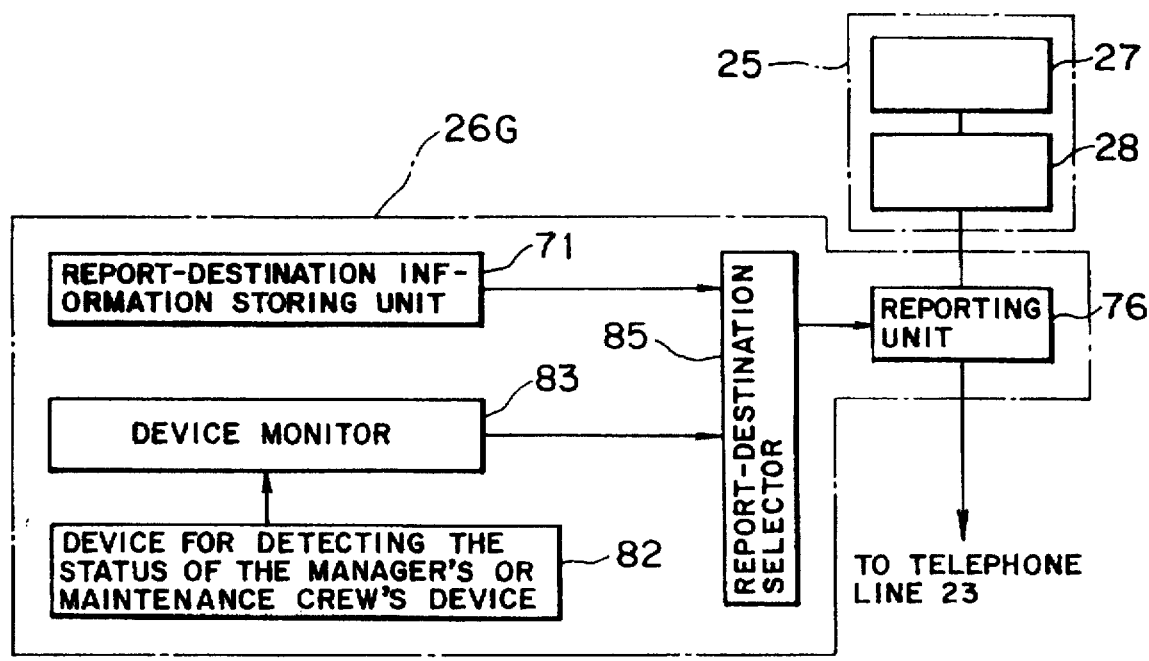
FIG. 31 is a block diagram showing a modification of the fifth embodiment according to the present invention.
FIG. 32 is a table showing report-destination information stored in the report-destination information storing unit being a modification of the fifth embodiment according to the present invention.

(f1) Explanation of First Modification of Fifth Embodiment:

FIG. 31 is a diagram showing the first modification of the fifth embodiment according to the present invention. Instead of the time card/ID card reader 73 and the attendance information managing unit 72 of the fifth embodiment, the report processing device shown in FIG. 31 includes a device status detector 82 for detecting the status of a manager or maintenance crew's device and a device monitoring unit 83. This report processing device is different from the foregoing ones in that a report destination information can be select according to a manager's location by detecting the (on/off) operational status of various devices (such as a personal computer and a word processor) in use by the manager, etc. The report-destination information storing unit 71 and the report destination selector 85, and the reporting unit 76 correspond to those in the fifth embodiment, respectively.

The report destination information storing unit 71 stores report-destination information such as the telephone number of a registered report destination. As shown in FIG. 23, the telephone number corresponding to the case where the various devices in charge of the manager are in operation or not is stored.

The device status detecting device 82 decides the status (in on/off operation) of each of various devices in charge of the manger or maintenance crew. The on/off operation is decided, for example, based on the status of power source, time taken from the final key entry, time taken from the final mouse operation, JOB entry status, or a combination of them.

The device monitoring unit 83 for managers and maintenance crew decides whether someone is in the manager's or maintenance crew's station or not, based on the information regarding the device status detection from the device status detecting device 82 for managers and maintenance crew.

Hence, the report-destination selector 85 selects the report-destination reported by the reporting device 76 corresponding to the manager s or maintenance crew's location, based on the decision information from the device monitor 83.

The reporting device 76 has substantially the same function as that of the fifth embodiment.

In the first modification of the fifth embodiment of the present invention, the device status detector 82 for managers and maintenance crew and the device monitor 83 detect the status (in on/off operation) of various devices in charge of the manager. Hence, the report destination selector 85 operates as that of the fifth embodiment, except that the report-destination information corresponding to the manager's location is selected.

According to the first modification of the fifth embodiment, when an abnormal status occurs in the computer system 21, a member who can deal most effectively with the trouble can be located and reported certainly. Hence, the advantage similar to that of the fifth embodiment can be obtained.

Figures 33, 34:
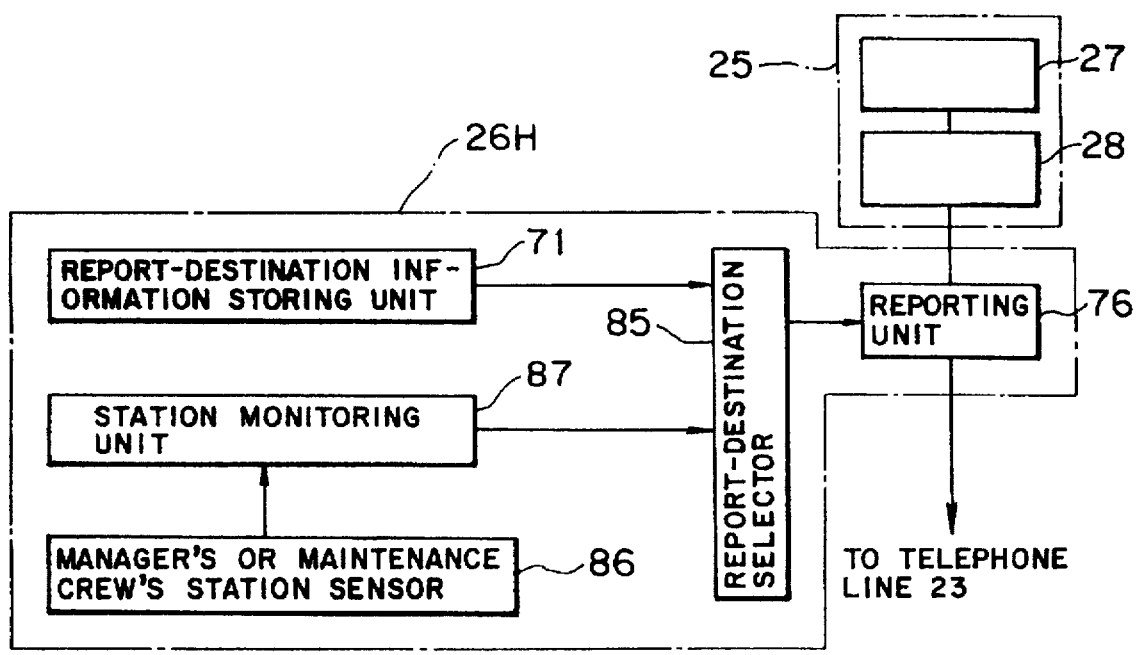
FIG. 33 is a block diagram showing the second modification of the fifth embodiment according to the present invention.
FIG. 34 is a table showing report-destination information stored in the report-destination information storing unit being the second modification of the fifth embodiment according to the present invention.

(f2) Explanation of Second Modification of Fifth Embodiment:

FIG. 33 is a diagram showing the second modification of the fifth embodiment according to the present invention. In the first modification of the fifth embodiment, the report processing device includes a device status detector 82 for managers and maintenance crew for detecting devices in charge of a manager or maintenance crew and a device monitor 83, whereby the report-destination information corresponding to the manager's location is selected by detecting the (on/off) status of various devices in charge of a manager. However, the present report processing device shown in FIG. 33 differs from the first modification in that it includes the manager or maintenance crew's station sensor 86 that selects the report destination information corresponding to the managers location by detecting whether a manager or maintenance crew is at a station to be reported. The reporting destination information storing unit 71, the report destination selector 85, and the reporting unit 76 have the same configuration as those in the fifth embodiment, respectively.

The report destination information storing unit 71 stores report-destination information such as the telephone number of a registered report destination, or, as shown in FIG. 34, the telephone number used in the case where a manager is at a station and the telephone number used in the case where a manager is not at the station.

The manager and maintenance crew's station sensor 86 decides whether a manager or maintenance crew is at a station or not (or in an attended or unattended status). The station monitor 87 produces the signal regarding the attended or unattended status to the report destination selector 85, based on the decision information from the manager and maintenance crew's station sensor 86.

The reporting unit 76 has the same function as that of the fifth embodiment.

In the second modification of the fifth embodiment of the present invention, the manager and maintenance crew's station sensor 86 and the station monitor 87 decide whether the manager or maintenance crew is at a station. Thus, the report destination selector 85 operates as the fifth embodiment, except that the report destination information corresponding to a manager's location is selected.

As described above, in the second modification of the fifth embodiment of the present invention, when an abnormal status occurs in the computer system 21, a maintenance crew who can deal more effectively with the trouble can be located and reported certainly, whereby the same advantage as that of the fifth embodiment can be obtained.

Figures 35, 36:
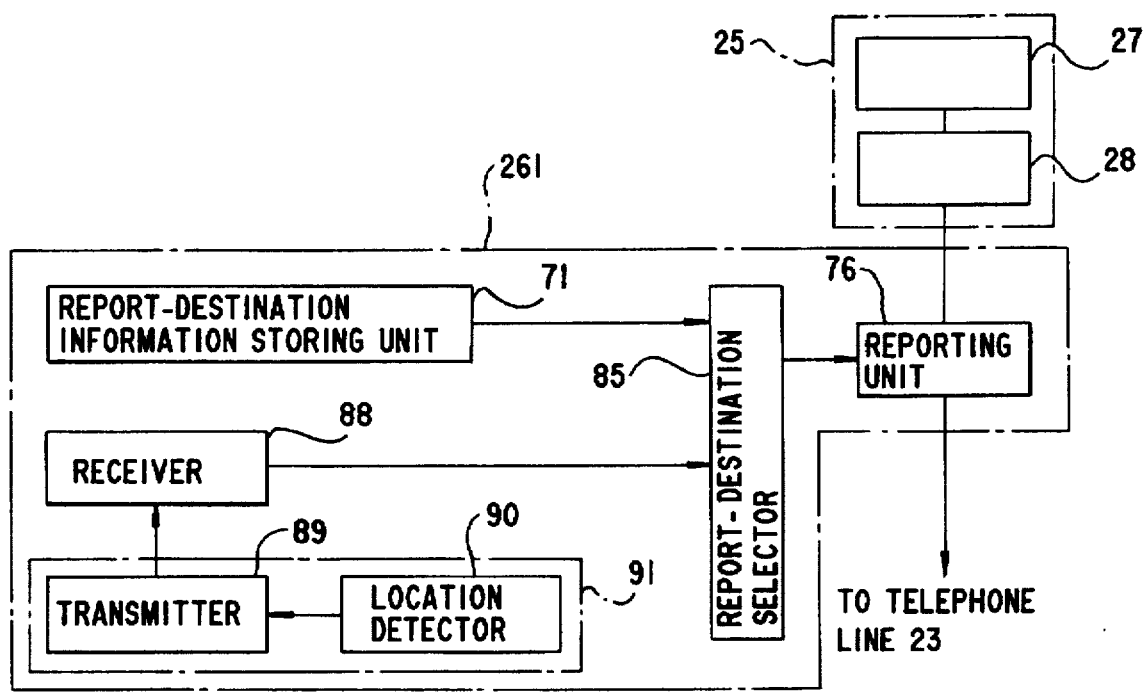
FIG. 35 is a block diagram showing the third modification of the fifth embodiment according to the present invention.
FIG. 36 is a table showing report-destination information stored in the report-destination storing unit in the third modification of the fifth embodiment according to the present invention.

(f3) Explanation of Third Modification of Fifth Embodiment:

FIG. 35 is a diagram showing the third modification of the fifth embodiment of the present invention. The report processing device shown in FIG. 35 includes a time card/ID card reader 73 and an attendance information managing unit 72. In the fifth embodiment, report-destination information corresponding to the manager's location is selected by managing the attendance/unattendance information of a manager or others. However, in the third modification, the report processing device includes the receiver 88, the transmitter 89 and the position detector 90, whereby a manager or maintenance crew to be reported is located to select to the report destination. The report-destination information storing unit 71, the report destination selector 85, and the reporting unit 76 have the same configuration as those of the fifth embodiment, respectively.

The report-destination information storing unit 71 stores report-destination information such as the telephone number of a registered report destination, or as shown in FIG. 36, the telephone number corresponding to a manager's location.

The position detector 90 is carried with a manager or maintenance crew in charge of the computer system 21 to locate him. The transmitter 89 transmits to the receiver 88 the positional information as information signal being the result detected by the position detector 90. The receiver 88 receives a positional information signal from the transmitter 89 to detect the manager's or maintenance crew's location such as a manager or maintenance crew's station, a place in the field, or others.

Hence, both the position detector 90 and the transmitter 89 consist of the position transmitter 91 carried with a manager or maintenance crew to be reported.

In the third modification of the fifth embodiment of the present invention, the transmitter 88 or the position transmitter 91 detects the manager's or maintenance crew's location, a place in the field, or others. The report destination selector 85 operates as that of the fifth embodiment, except that the report destination information corresponding to the manager's location is selected.

In the third modification of the fifth embodiment of the present invention, when an abnormal status occurs in the computer system 21, a member such as a manager who can deal most effectively with the trouble can be located and the information can be reported certainly to him, whereby the same advantage as that in the fifth embodiment can be obtained.

Figure 37:
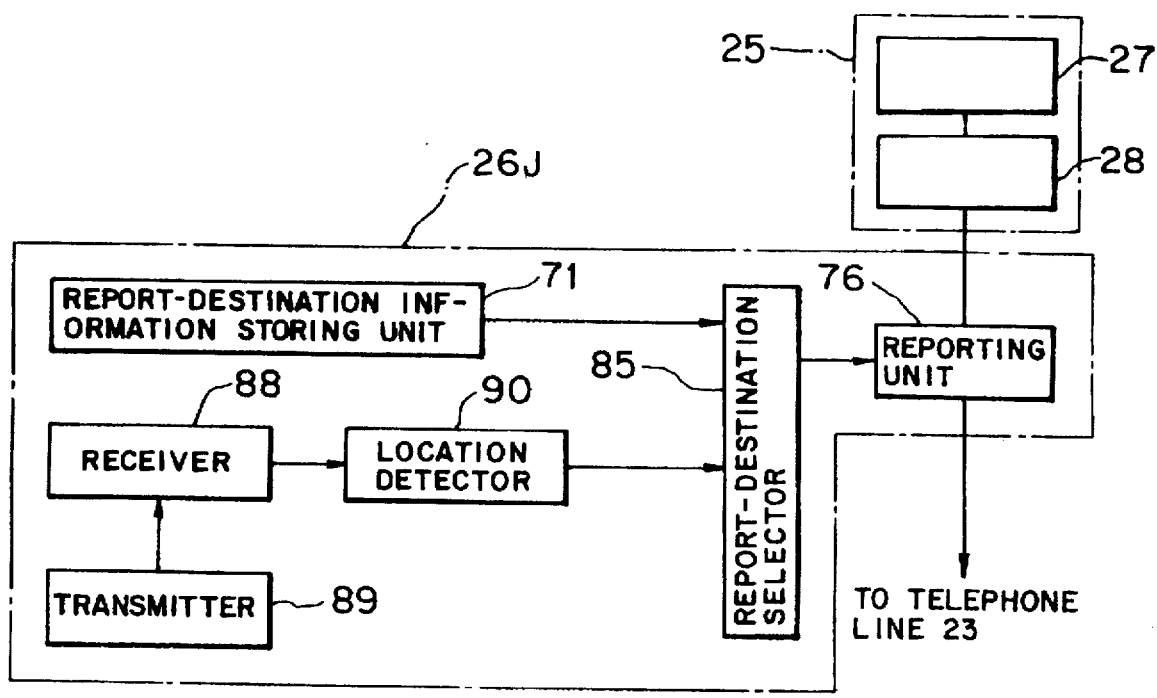
FIG. 37 is a block diagram showing the third modification of the fifth embodiment according to the present invention.

In the modification described above, the position detector 90 as an element for the position transmitter 91 is prepared to the manager or maintenance crew. According to the present invention, the position detector 90 should not be limited to the modification. As shown in FIG. 37, the position detector 90 may be prepared on the receiving side. In this case, the output signal from the receiver 88 may be used to locate the manager or maintenance crew to be reported, whereby the same function and effect as those of the modification can be obtained.

Figures 38, 39:
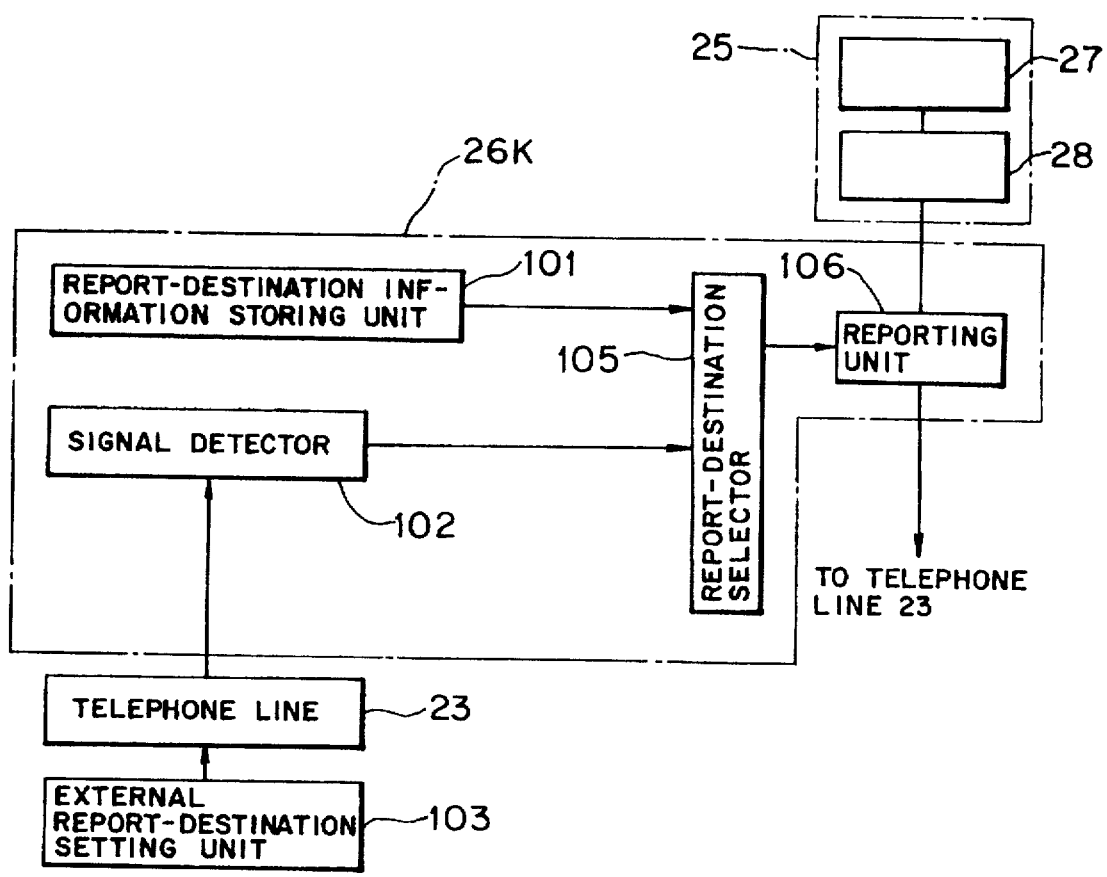
FIG. 38 is a block diagram showing the report processing device according to the sixth embodiment of the present invention.
FIG. 39 is a table showing report-destination information stored in the report-destination information storing unit according to the sixth embodiment of the present invention.

(g) Explanation of Sixth Embodiment:

FIG. 38 is a diagram showing the report processing device of the sixth embodiment of the present invention. The report processing device shown in FIG. 38 is applicable to the reporting device 22 shown in FIG. 6. Comparing with the first to fifth embodiments,. this report processing device has a difference in that a manager or maintenance crew managing the computer system 21 can set the report destination under an external remote control.

The report processing device shown in FIG. 38 includes an abnormal status detecting mechanism 25 for detecting an abnormal status of the computer system 21, and a reporting mechanism 26K for reporting a report destination in response to a message corresponding to the detected abnormal content.

Like the first to fifth embodiments, the abnormal status detecting mechanism 25 includes the system status monitor (system status monitoring means) 27 and the abnormal event detector (abnormal event detecting means) 28.

The reporting mechanism 26K includes a report destination information storing unit 101, a signal detector 102, a reporting selector 105, and a reporting unit 106.

The report-destination information storing unit (report-destination table) 101 stores report destination information corresponding to the telephone number of a report destination set and registered. As shown in FIG. 39, a predetermined report destination is set to report under an external remote control. An index number (#1 or #2) is attached to each report destination.

The report destination with the index number #1 is a manager or maintenance crew's station. The report destination with the index number #2 is a report destination such as a pager terminal to be reported when a manager or maintenance crew is not at the station.

According to the present embodiment, the external report-destination setting unit 103 is connected to the reporting mechanism 26K via the telephone line 23. The external report-destination setting unit 103 sets the report destination to the signal detector via the telephone line 23, thus producing signals created by, for example, push-button operation, dial pulses, speech synthesis, or a combination of them. The signal detector 102 inputs a certain signal from the external report-destination setting unit 103 by utilizing the automatic incoming function and outputs a report-destination selecting signal to the report destination selector 105, based on the input signal.

Hence, when a user such as a manager and a maintenance crew phones from the external report-destination setting unit 103 to the signal detector 102 to input the telephone number of a report destination, for example, through a push-button operation, dial pulses, speech recognition, or a combination of them, a report destination setting can be established.

The report destination selector (report-destination setting means) 105 receives a signal to select the report destination from the signal detector 102 and selects the report destination corresponding to the signal from the report destination information stored in the report-destination information storing unit 101, thus setting the outcome to the report processing device 106.

For example, in the FIG. 39, when the signal detector 102 inputs the selection number "1", the report destination corresponding to the index number #1 is selected. In the case of the index number #2, the report destination corresponding to the index number #2 is selected.

When an index number with which no report destination is set is selected, the reporting is not carried out.

When the reporting unit 106 receives an abnormal status occurrence report from the abnormal event detector 28, it reports a message corresponding to the abnormal content to the report destination set by the report destination selector 105.

The operation of the sixth embodiment according to the present invention will be explained below with reference to the flowchart shown in FIGS. 40 to 42.

Figure 40:
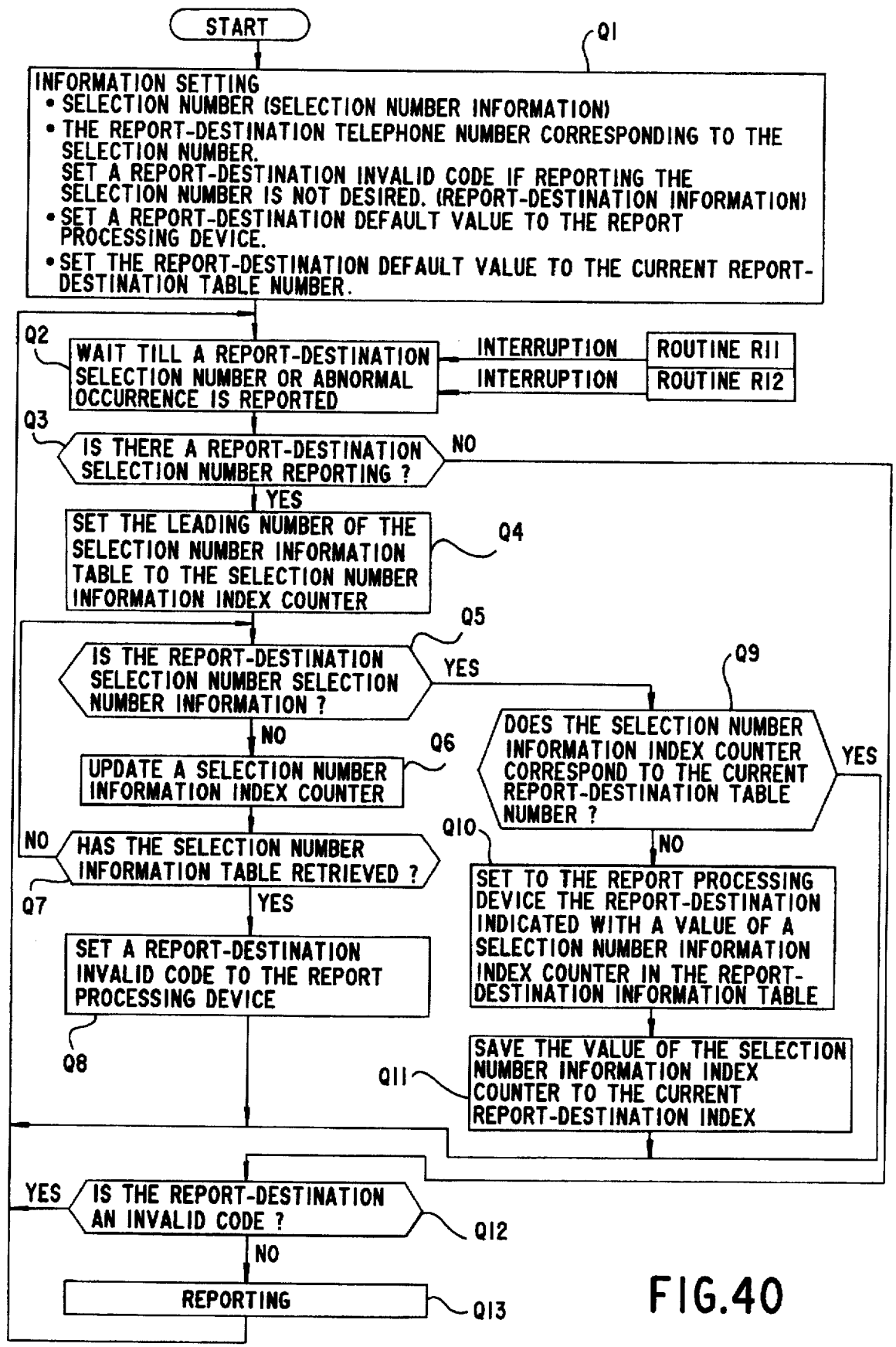
FIG. 40 is a flowchart showing used for explaining the operation of the sixth embodiment of the present invention.

In the step Q1 of the flowchart shown in FIG. 40, an initialization, as shown in FIG. 39, is performed to register a selection number with an index number to report the telephone number of a report destination into the signal detector 102 and to set the telephone number of a report destination corresponding to a selection number with the index number to the report-destination information storing unit 101. When reporting to a report destination set by the signal detector 102 is not intended, a report-destination invalid code is set to the report-destination information storing unit 101. A default report-destination telephone number is set while a default report-destination number is set to the current report destination table number (index number) (step Q1).

Next, the process is in a waiting state till the signal detector 102 reports a report-destination selection number to the report destination selector 105 or the abnormal event detector 28 reports the abnormal occurrence to the reporting unit 106 (step Q2). The report-destination selection number from the signal detector 102 and the abnormal occurrence from the abnormal event detector 28 are reported by handling the interrupt process (routines R11 and R12), as shown with the flowchart in FIGS. 41 and 42.

Figure 41:
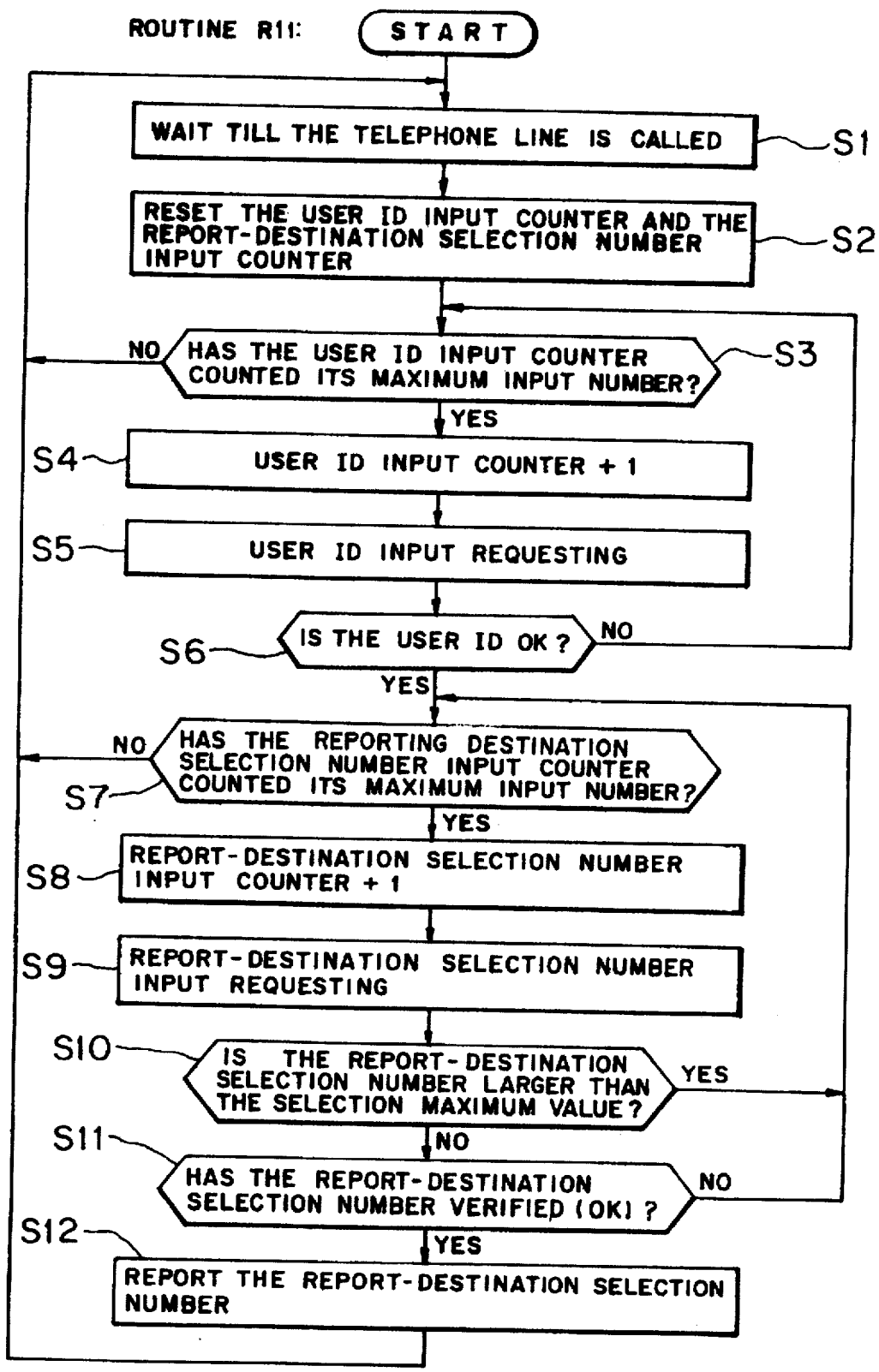
FIG. 41 is a flowchart showing used for explaining the operation of the sixth embodiment of the present invention.

In the flowchart shown in FIG. 41, when the signal detector 102 which is in a destination call waiting status on the telephone line 23 (step S1) receives an incoming call from the external report-destination setting unit 103, the user ID (user identification information) input counter currently set and the report-destination selection number input counter are reset (step S2).

While the user ID input counter (not shown) verifies that the user ID input times is less than a predetermined number of times (maximum input times), the signal detector 102 receives a user ID inputted from the external report-destination setting unit 103 under a user's remote control (steps S3 to S5) to decide whether the input user ID is eligible for a manager or maintenance crew (step S6). The steps S3 to S6 are repeated till a right user ID is inputted.

When the right user ID is inputted, the report-destination selection number input counter (not shown) verifies that the input times of the report-destination selection number is less than a predetermined number of times (maximum input number). At the same time, a report-destination selection number inputted by the user is received (steps S7 to S9) to decide whether it is right (steps S10 and S11).

In the step S11, when it is decided that a right report-destination selection number has been inputted, the report destination selection number is reported to the report destination selector 105 (step S12).

Figure 42:
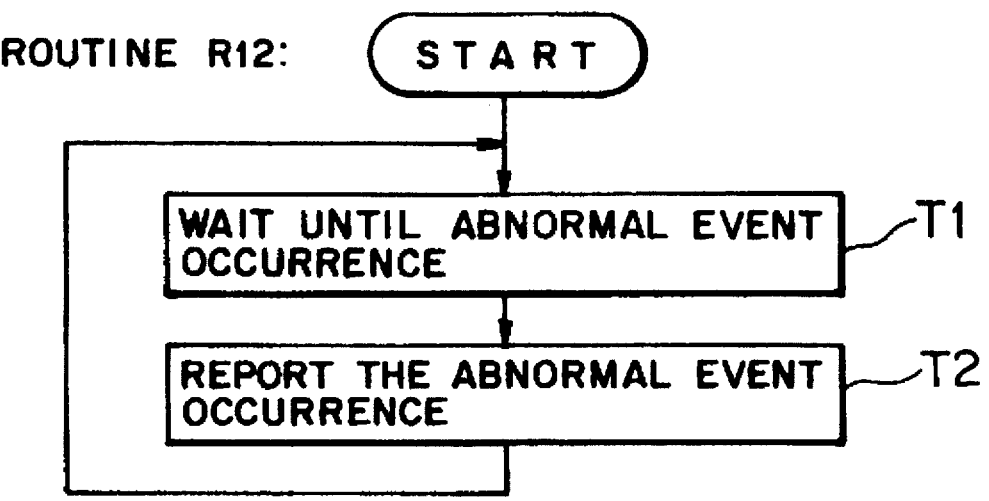
FIG. 42 is a flowchart showing used for explaining the operation of the sixth embodiment of the present invention.

In the flow chart shown in FIG. 42, the abnormal event detector 28 waits, based on the system status monitor information from the system status monitoring unit 27, till an abnormal status in a system detects (step T1). If an abnormal status occurs, the abnormal event detector 28 reports the detection result to the reporting unit 106 (step T2).

In the step Q3 shown in FIG. 40, between the report-destination selection signal and the abnormal signal, when the report-destination selection number is reported, the flow goes to the step Q4. Thus, the leading number #1 of a selection number information table is set to the selection number information index counter in the signal detector 102.

The signal detector 102 compares the value of the selection number information index counter with the report-destination selection number to decide whether the report-destination selection number is equal to the selection number information (step Q5). If not equal, index number #2 is set by updating (or adding by 1) the value of the selection number information index counter (step Q6). Then it is decided again whether the report-destination selection number is equal to the selection number information (steps Q7 and Q5).

After processing the steps Q5 to Q7, if the report destination selection number does not corresponds to the index number #1 or #2, a report-destination invalid code is set to the reporting unit 106 (step Q8). The process is in a waiting state till the report-destination selection number or abnormal occurrence is again reported in the step Q2.

In the step Q5, when the index number #1 or #2 corresponds to the report-destination selection number, the process goes to the step Q9. Thus, the value of the selection number information index counter is compared with the current report-destination table number set in the report destination selector 105.

When the value of the index counter is equal to the current report-destination table number, the process is in a waiting state till the report-destination selection number or abnormal status occurrence is again reported in the step Q2 since a report destination (telephone number) corresponding to the report-destination selecting number has been already set to the reporting unit 106.

When the value of the index counter is different from the current report-destination table number, the report destination (telephone number) indicated with the value of the selection number information index counter in the report-destination information table (report-destination information storing unit 101) is set to the reporting unit 106 (step Q10). The value of the selection number information index counter is saved to the current report-destination index (current report-destination table number) (step Q11). The process is in a waiting state till the selection number information or abnormal status occurrence is again reported in the step Q2.

Thus, the report destination (telephone number) corresponding to the selection number information is set to the reporting unit 106.

In the step Q3, when an abnormal status occurrence reporting is interrupted, it is decided whether the value of the selection number information index counter, which is set to the reporting unit 106 and indicates a report destination, is the report destination invalid code (step Q12).

When the value of the selection number information index counter is a report-destination invalid code, the process is in a waiting state till the selection number information or abnormal status occurrence is reported in the step Q2. However, if the value is not a report-destination invalid code, reporting is performed to the report destination indicated with a value of the selection number information index counter via the telephone line 23 (step Q13).

For example, when an abnormal status occurs in the computer system 21, the abnormal event detector 28 inputs the signal to the reporting unit 106. The reporting unit 106 carries out a signal analysis and sends abnormal message corresponding to the abnormal content to a report destination input from the external report-destination setting unit 103, the report destination being inputted by a user such as a manager and a maintenance crew, via the telephone line 23. In response to the report, the manager or maintenance crew deals with the trouble, thus reopening the operation.

As described above, according to the report processing device of the sixth embodiment of the present invention, the manager or maintenance crew in charge of the computer system 21 can set the report destination under an external remote control. When an abnormal status occurs in the computer system 21, a maintenance crew who can deal most effectively with the trouble can be immediately located, whereby the report can be certainly sent to the crew. Hence, a slow reporting due to a report to an inadequate troubleshooter, a trouble of the report destination, or an absence of a maintenance crew at a report destination can be eliminated, whereby the reporting capability can be largely improved.

(g1) Explanation of Modification of Sixth Embodiment:

The report-destination information storing unit 101, as shown in FIG. 43, ensures a region for registering a new report destination. The new report destination can be registered into the region by receiving the signal from the signal detector 102 under the remote control from the external report-destination setting unit 103.

The operation of the case described above will be explained below with reference to FIGS. 44 and 45.

Figure 44:
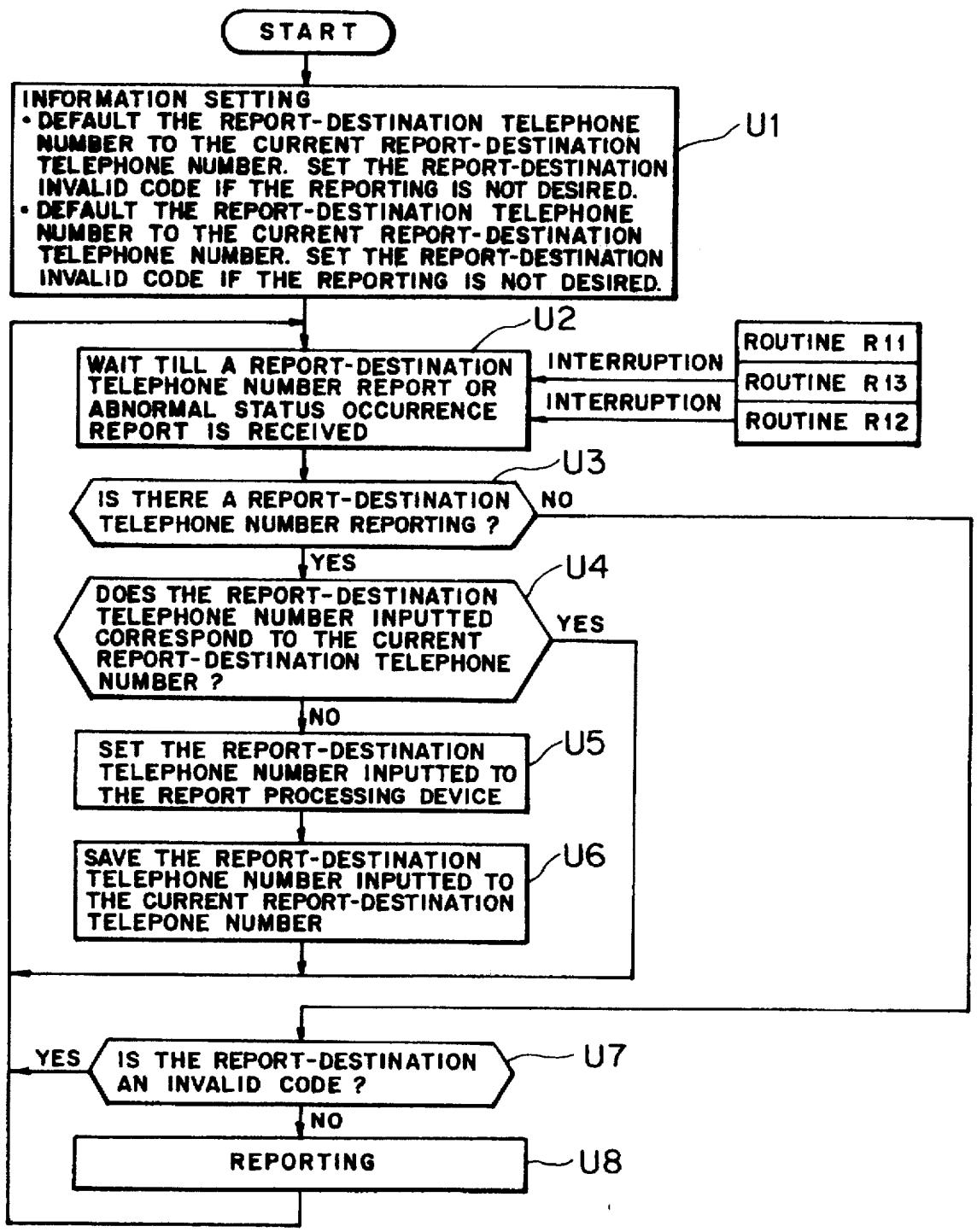
FIG. 44 is a flowchart used for explaining the operation of the modification of the sixth embodiment of the present invention.

In the step U1 of the flowchart shown in FIG. 44, a default report-destination's telephone number (the report-destination of a manager or maintenance crew's station being the report-destination at an absence time) is initialized. As shown, for example, in FIG. 43, when reporting to the report destination set to the signal detector 102 is not intended, the report-destination invalid card is set to the report-destination information storing unit 101. Moreover, when a default number of the report destination is set to the current report-destination table number to inhibit reporting to the current report destination, a report-destination invalid code is set (step U1).

When the report-destination selection number of a registered report-destination has been reported, reporting is carried out by handling the interrupt process (routine R11) shown in FIG. 41 in the sixth embodiment.

Next, the process is in a waiting state till the report-destination telephone number for a new registration or the report-destination selection number of a registered report-destination is reported from the signal detector 102 to the report destination selector 105, or an abnormal occurrence is reported from the abnormal event detector 28 to the reporting unit 106 (step U2). The report-destination telephone number which the signal detector 102 registers is newly reported by handling the interrupt process (routine R13) as shown in FIG. 45.

Figure 45:
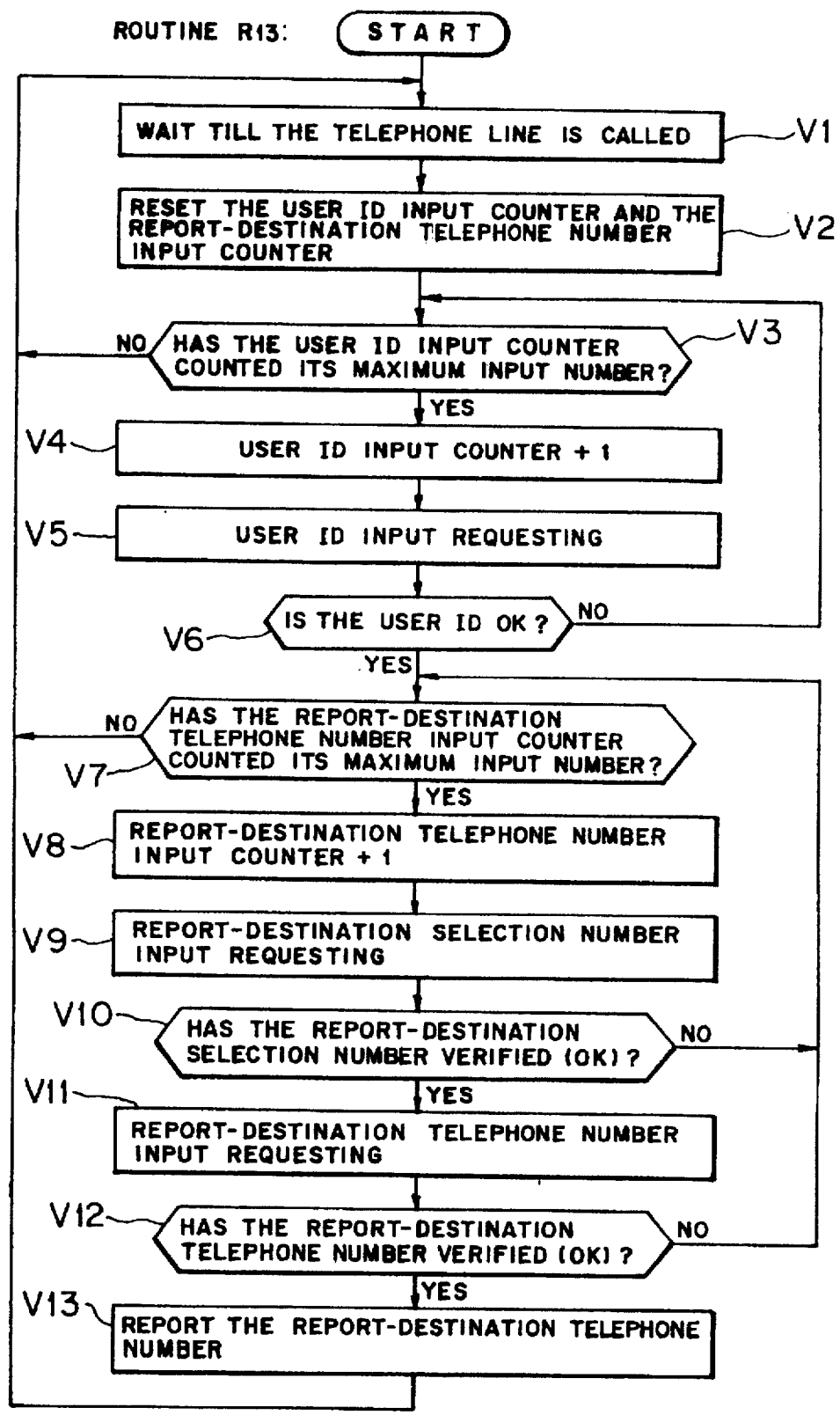
FIG. 45 is a flowchart used for explaining the operation of the modification of the sixth embodiment of the present invention.

In the flowchart shown in FIG. 45, with the signal detector 102 being in a waiting state (step V1) of an incoming call from the telephone line 23, when there is an incoming call from the external report-destination setting unit 103, both the user ID (user identification information) input counter currently set and the report-destination telephone number input counter are reset (step V2).

While the user ID input counter (not shown) in the signal detector 102 checks that the user ID input times is less than a predetermined number of times (the maximum input times), the signal detector 102 receives a user ID inputted from the external report-destination setting unit 103 under a user's remote control (steps V3 to V5). Then, it is decided whether the input user ID is eligible for a manager or maintenance crew (step V6). The steps V3 to V6 are repeated till the right user ID is inputted.

When the right user ID is received, the report-destination telephone number (including the report-destination selection number) from the user is received (steps V7 to V9) and verified (step V10) while it is checked that the input times of the report-destination telephone number is less than a predetermined number of times (the maximum input times) using the report-destination telephone number input counter (not shown).

In the step V10, the report-destination telephone number is verified and then reported to the report destination selector 105 (step V11).

Like the sixth embodiment, the abnormal event detector 28 reports an abnormal occurrence by handling the interrupt process (routine R12), shown with the flowchart in FIG. 42. The detail explanation will be omitted here.

In the step U3 shown in FIG. 44, between the report-destination telephone number and the abnormal event, when the report-destination telephone number is reported, the process goes to the step U4. The report-destination telephone number inputted for the new registration is compared with the current report-destination telephone number registered into the reporting unit 106.

If both the telephone numbers are different from each other, the report-destination telephone number for new registration is newly registered to the reporting unit 106 (step U5). The telephone number registered to the reporting unit 106 is stored into a new registration area in the report-destination information storing unit 101 (step U6). Then, the process is again in a waiting state where the report-destination telephone number or the abnormal status occurrence is reported.

In the step U4, when the report-destination telephone number for new registration is equal to the current report-destination telephone number, updating the report destination registered in the reporting unit 106 is not needed. Thus, the process is again in a waiting state where the report-destination telephone number or the abnormal status occurrence is reported (step U2).

In the step U3, between the report-destination telephone number and the abnormal status occurrence, when an abnormal status occurrence is reported by serving an interrupt process, if the report destination registered in the reporting unit 106 is not an invalid code, reporting is performed to the report destination (step U8). Thus, the report-destination telephone number reporting or the abnormal status occurrence reporting is again in a waiting state.

According to the modification of the sixth embodiment of the present invention, a manager or maintenance crew in charge of the computer system 21 can set a report destination under an external remote control, whereby the same advantage as that of the sixth embodiment can be obtained.

Figure 46:
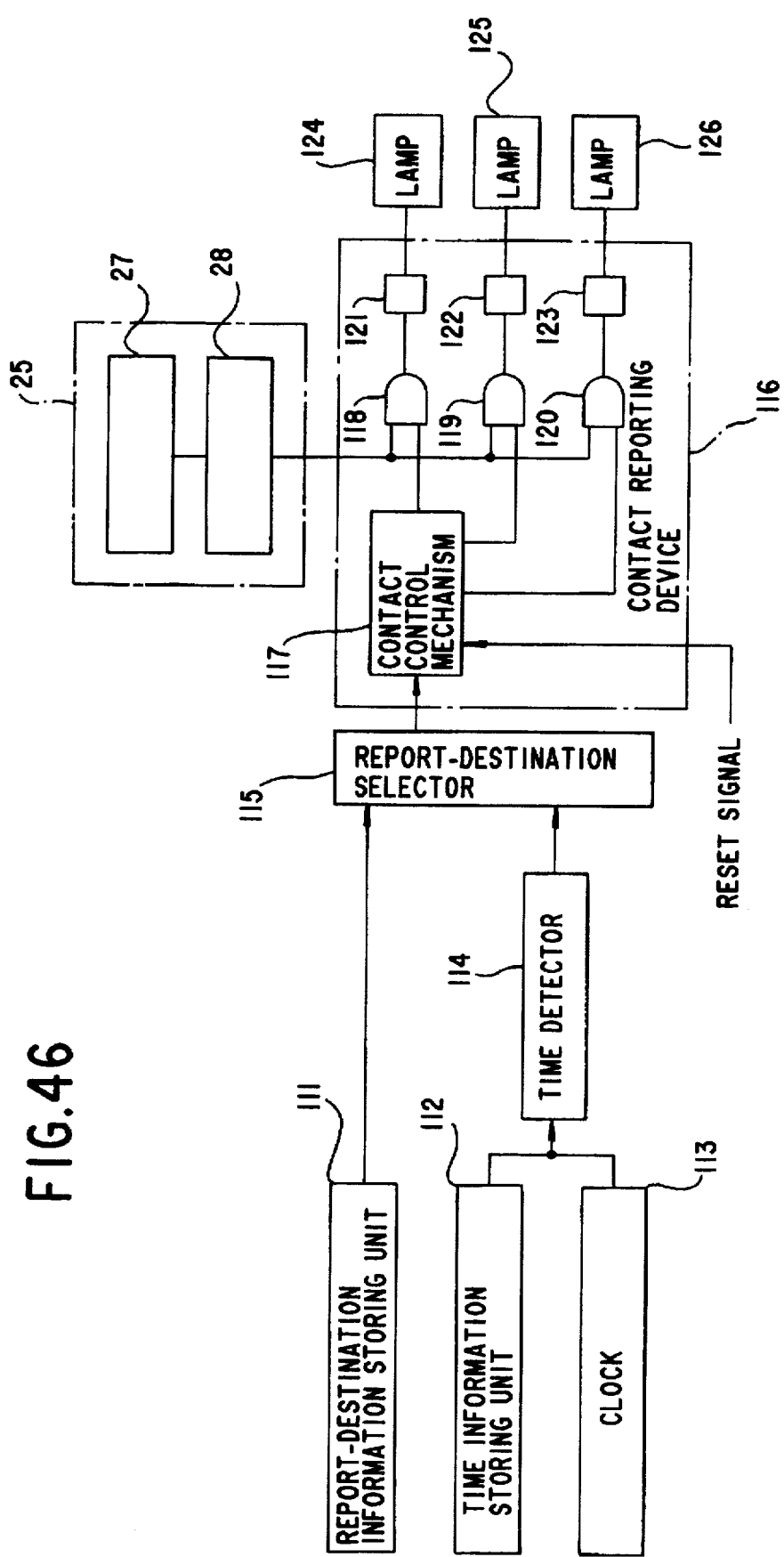
FIG. 46 is a block diagram showing the report processing device according to the seventh embodiment of the present invention.

(h) Explanation of Seventh Embodiment:

FIG. 46 is a diagram showing the report processing device according to the seventh embodiment of the present invention. The report processing device shown in FIG. 46 includes an abnormal status detecting mechanism 25 having the same function as those of the first to sixth embodiments. However, in the present embodiment, reporting is carried out to a predetermined report destination by blinking a lamp or ringing a buzzer, without using any telephone lines. The present embodiment includes a clock 113 having the same function as that of the first embodiment, a time detector 114, and a report destination selector 115.

Figure 47:
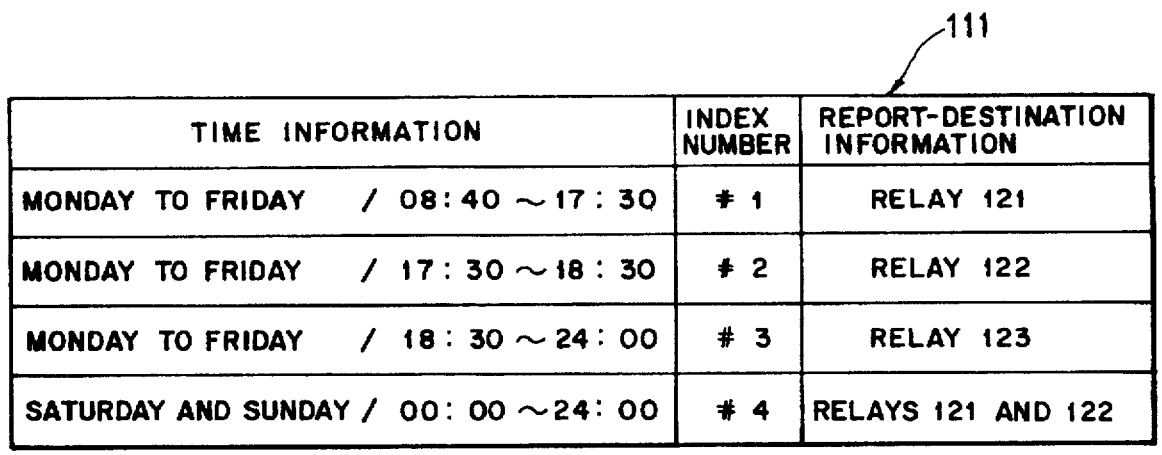
FIG. 47 is a table showing report-destination information stored in the report-destination information storing unit according to the seventh embodiment of the present invention.

Like the first embodiment, the report-destination storing unit (report destination table) 111 registers report destinations with index numbers #1 to #4 to report them to the report destinations. However, as shown in FIG. 47, the report-destination information storing unit 111 stores information (contact information) selectively specifying the relays 121 to 123 to light the lamp 124 or 125 (to be described later) at the report destination or to ring the buzzer 126.

Like the first embodiment, the time information storing unit 112 stores time information with index numbers #1 to #4 to be reported to report destinations, the index number corresponding to the report destination information registered in the report-destination information storing unit 111.

The reporting unit 116 receives selection information regarding the report destinations from the report destination selector 115 and an abnormal status occurrence reporting signal from the abnormal event detector 28, to report by lighting on the lamp 124 or 125, or by ringing the buzzer 126. The reporting unit 116 includes a contact control mechanism, AND circuits 118 to 120, and relays 121 to 123.

The contact control mechanism 117 specifies one of the relay 121 to 123 based on the contact information acting as the report-destination selection information from the report destination selector 115 to produce an ON signal to the corresponding one of the AND circuit 118 to 120. The ON signal to the AND circuits 118 to 120 is reset with an external reset signal or a reset signal outputted after a lapse of a predetermined period from a reset signal circuit within a system (not shown).

Each of the AND circuits 118 to 120 creates a logical product of the report-destination selection information from the contact control mechanism 117 and the abnormal event reporting signal from the abnormal event detecting unit 28.

When the AND circuits input both an ON signal and an abnormal event reporting signal from the contact control mechanism 117, driving a specified one among the relays 121 to 123 allows the top 124 or 125 or the buzzer 126 at the report destination to become an ON state.

The operation of the report processing device according to the seventh embodiment of the present invention operates as follows:

The time detector 114 receives time information with an index number set in the time information storing unit 112 and the current day of week and time information from the clock 113. If the current day of week and time are included among time information set in the time information storing unit 112, the time information is sent with the corresponding index number to the report destination selector 115.

The report destination selector 115 reads contact information acting as selection information corresponding to the index number out of the report-destination information storing unit 111, based on the index number from the time detector 114, and produces it to the reporting unit 116. As a result, the lamp 124 or 125 or the buzzer 126 corresponding to the time information is specified as a report destination.

The contact control mechanism 117 in the reporting unit 116 inputs the contact information from the report destination selector 115 and outputs an ON signal to the corresponding one of the AND circuits 118 to 120.

The AND circuits 118 to 120 receive an abnormal status occurrence reporting signal (abnormal reporting signal) from the abnormal event detector 28. However, each of the AND circuits 118 to 120 outputs a logical product of a certain signal from the contact control mechanism 117 and an abnormal reporting signal.

Each of the AND circuits 118 to 120 inputs an ON signal from the contact control mechanism 117 as well as an abnormal reporting signal from the abnormal event detector 28 and outputs the result. The AND circuits 118 to 120 drive the relays 121 to 123 each connected to a specified report destination. Since the lamp 124 or 125 or the buzzer 126 at the report destination become on, an abnormal status in a system can be reported.

The reporting operation by means of the lamp 124 or 125 or the buzzer 126 is terminated with an external reset signal or a reset signal from a reset circuit within a system (not shown) after a lapse of a predetermined period.

In this case, as shown in FIG. 47, the report-destination information storing unit 11 and the time information storing unit 112 relate to the time-to-report-destination information, respectively. If an abnormal status occurrence is reported between 8:40 and 17:30 on Monday to Friday, the relay 121 is selected, thus lighting the lamp 124. If an abnormal status occurrence is reported between 17:30 and 18:30 on Monday to Friday, the relay 122 is selected, thus lighting the lamp 125. If an abnormal status occurrence is reported between 18:30 and 24:00 on Monday to Friday, the relay 123 is selected, thus ringing the buzzer 126. If an abnormal status occurrence is reported between 00:00 and 24:00 on Saturday to Sunday, the relays 121 and 122 are selected, thus lighting the lamps 124 and 125.

As described above, according to the seventh embodiment of the present invention, a member who can deal most effectively with the trouble can be located immediately with time, without using the telephone lines 23, thus being reported certainly. As a result, a slow reporting caused by a report to inadequate troubleshooter, a trouble in the report destination, or no maintenance member at the report destination can be eliminated, whereby the reporting capability can be largely improved.

In the report processing device according to the present embodiment, like the first and second embodiments, the report destination is decided in accordance with a lapse of time. However, according to the present invention, the third to sixth embodiments are applicable to the report processing device to select a report-destination.

Figure 48:
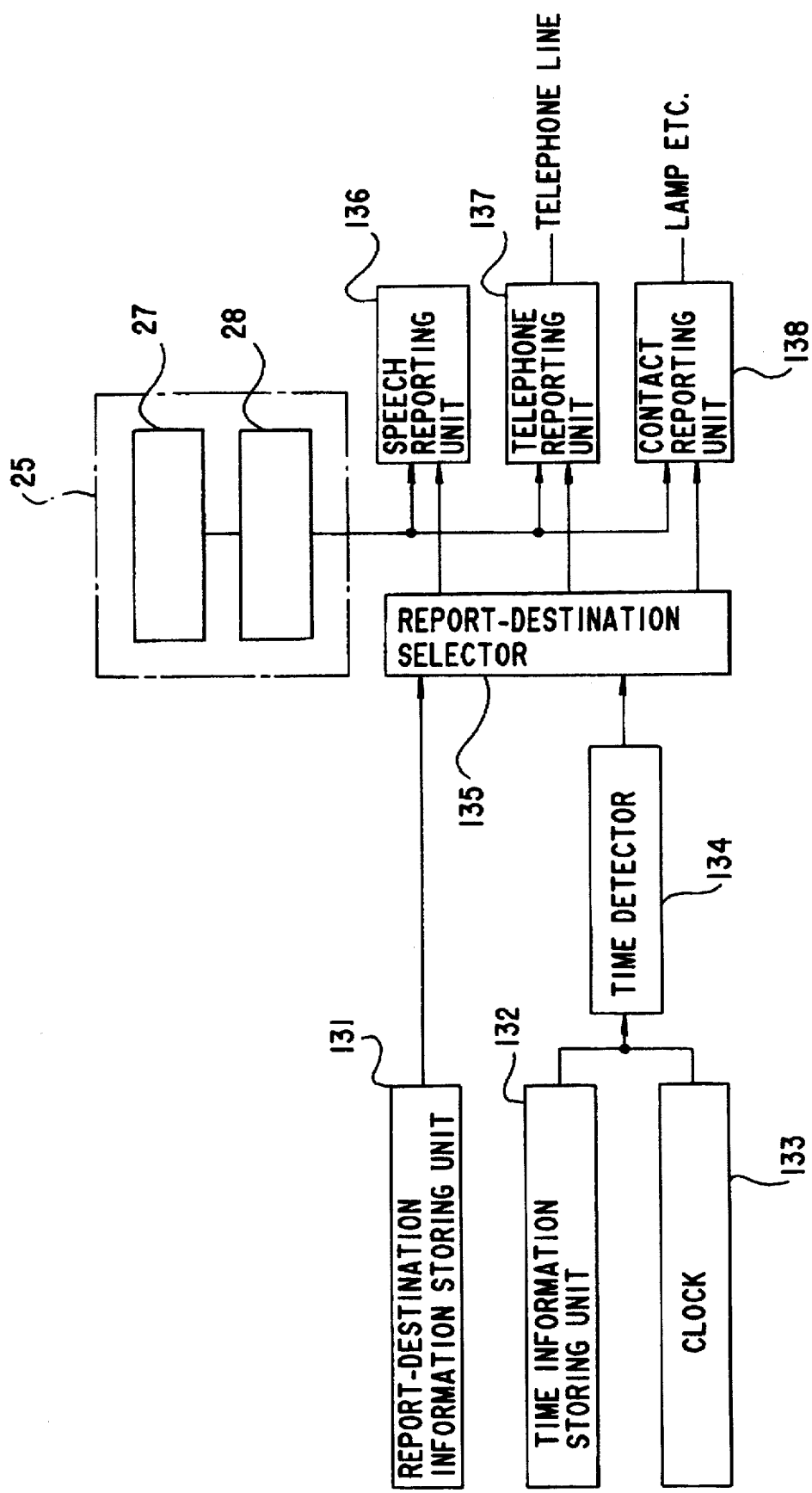
FIG. 48 is a block diagram showing the report processing device according to the eighth embodiment of the present invention.

(i) Explanation of Eighth Embodiment:

FIG. 48 is a diagram showing the report processing device according to the eighth embodiment of the present invention. The report processing device shown in FIG. 48 includes the abnormal status detecting mechanism 25 having the same function as those in the first to seventh embodiments. However, according to the present embodiment, the report processing device can change its reporting aspect by selectively switching as a reporting medium speech, a telephone line and a lamp, in accordance with a lapse of time. Like the first embodiment, the report processing device also includes the clock 133, the time detector 134, and the report destination selector 135.

Like the first embodiment, the report-destination information storing unit (report destination table) 131 registers report destinations with index numbers #1 to #6 to perform reporting to the report destination. However, as shown in FIG. 49 later, the speech reporting unit 136, the telephone reporting unit 137, the contact reporting unit 138, or a combination of the telephone reporting unit 137 and the contact reporting unit 138 is selected as report destination information.

Like the first embodiment, the time information storing unit 132 stores time information with index numbers #1 to #6 to report to the report destination, the index numbers each corresponding to report-destination information registered in the report-destination information storing unit 131.

The report destination selector 135 inputs information regarding the day of week and time from the time detector 134 and selects the corresponding report destination among the report destinations registered in the report-destination information storing unit 131, thus outputting the corresponding signal to a desired report destination.

The speech reporting unit 136 receives selection information regarding the report destination from the report destination selector 135 and an abnormal status occurrence reporting signal from the abnormal event detector 28 to perform a speech reporting. The telephone reporting unit 137 receives selection information regarding the report destination from the report destination selector 135 and an abnormal status occurrence signal from the abnormal event detector 28 to perform a reporting through a telephone line. The contact reporting unit 138 receives selection information regarding the report destination from the report destination selector 135 and an abnormal status occurrence reporting signal from the abnormal event detector 28 to perform a reporting through a lamp blinking.

The operation of the report processing device according to the eighth embodiment of the present invention operates as follows:

The time detector 134 receives time information with an index number set in the time information storing unit 132 and information regarding the day of week and time from the clock 133. If the current day of week and the current time is included within the time period set in the time information storing unit 132, the time information with the corresponding index number is outputted to the report destination selector 135.

The report destination selector 135 reads out selection information corresponding to the index number from the report-destination storing unit 131 and outputs the corresponding signal to the speech reporting unit 136, the telephone reporting unit 137, the contact reporting unit 138, or a combination of the telephone reporting unit 137 and the contact reporting unit 138, based on the index number from the time detector 134.

If an abnormal event occurrence is received during 8:40 to 17:30 and 17:30 to 18:30 on Monday to Friday, the speech reporting unit 136 selected as a report destination by the report destination selector 135 performs a speech reporting. If an abnormal event occurrence is received during 18:30 to 24:00 on Monday to Friday, the contact reporting unit 138 selected as a report destination by the report destination selector 135 performs a reporting operation through a lamp blinking. If an abnormal event occurrence is received during 00:00 to 7:30 and 7:30 to 8:40 on Monday to Friday, the telephone reporting unit 137 selected as a report destination by the report destination selector 135 performs a reporting operation through a telephone line. If an abnormal event occurrence is received during 00:00 to 24:00 on Saturday to Sunday, both the telephone reporting unit 137 and the contact reporting unit 138 selected as a report destination by the report destination selector 135 performs a reporting operation through a telephone line and a lamp blinking, respectively.

As described above, the report processing device of the eighth embodiment according to the present invention can locate immediately a personnel who can deal most effectively with the trouble in accordance with time, thus reporting certainly to him through a telephone line, a lamp blinking, or speech medium. As a result, a slow reporting which is caused by a report to an inadequate troubleshooter, a trouble of the report destination, or an absence of a maintenance member at the report destination can be eliminated, thus improving largely the reporting capability. Moreover, there is an advantage in that reporting can be performed in accordance with the environment of the member's location.

The report processing device of the present embodiment adopts the first and second embodiments each that the report destination is selected in accordance with time. However, according to the present invention, the report processing device may be applied to the third to sixth embodiments to select the report destination.

(j) Others:

In each embodiment described above, reporting is carried out by detecting an abnormal event in a system. However, the present invention should not be limited only to the foregoing embodiments. For example, if necessary, monitor information necessary for a user system operation, which includes a paper shortage in a laser printer, a demand to an operator such as a tape mount for a MT device, and an operation status such as job end/job switching, may be reported.

What is claimed is:

1. A report processing device comprising:
    system status monitoring means for monitoring a status of a system;
    report-event detecting means for detecting an occurrence of an event to be reported, according to the monitor information from said system status monitoring means;
    reporting means for performing reporting to a predetermined report-destination according to the detection information from said report-event detecting means; and
    report-destination setting means for selecting the predetermined report-destination in accordance with time and then for setting it to said reporting means.

2. A report processing device according to claim 1, further comprising:

a time-to-report-destination table in which information regarding an report-destination corresponding to time information is previously set and registered; and a clock for detecting a current time;

whereby said report-destination setting means selects the report-destination information corresponding to the current time detected by said clock from said time-to-report-destination table, to set previously it as said predetermined report-destination into said reporting means.

3. A report processing device according to claim 1, further comprising:

a time-to-report-destination table in which information regarding an report-destination corresponding to time information is previously set and registered; and a clock for detecting an occurrence time of an event to be reported when said report-event detecting means detects that the event to be reported has occurred in said system;

whereby said report-destination setting means selects the information regarding a report-destination from said time-to-report-destination table, said report-destination information corresponding to the occurrence time detected by said clock at a time an event to be reported has occurred, to set it as said predetermined report-destination into said reporting means.

4. A report processing device comprising:

system status monitoring means for monitoring a status of a system;

report-event detecting means for detecting an occurrence of an event to be reported, according to the monitor information from said system status monitoring means;

reporting means for performing reporting a predetermined report-destination according to the information detected by said report-event detecting means; and report-destination setting means for selecting the predetermined report-destination according to an event to be reported which are detected by said report-event detecting means and then for setting it to said reporting means.

5. A report processing device according to claim 4, further comprising:

an event-to-report-destination table in which information regarding a report-destination corresponding to an event to be reported is previously set and registered;

whereby said report-destination setting means selects the information regarding a report-destination from said event-to-report-destination table, said report-destination information corresponding to an event to be reported which is detected by said report-event detecting means, to set it as said predetermined report-destination into said reporting means.

6. A report processing device comprising:

system status monitoring means for monitoring a status of a system;

report-event detecting means for detecting an occurrence of an event to be reported, according to the monitor information from said system status monitoring means;

reporting means for performing reporting a predetermined report-destination according to the information detected by said report-event detecting means; and report-destination setting means for selecting said predetermined report-destination according to a time and an event to be reported which is detected by said report-event detecting means and then for setting it to said reporting means.

7. A report processing device according to claim 6, further comprising:

a time/event-to-report-destination table in which time information and report-destination information corresponding to an event to be reported is previously set and registered; and a clock for detecting an occurrence time of an event to be reported when said report-event detecting means detects that the event to be reported has occurred in said system;

whereby said report-destination setting means selects an occurrence time of an event to be reported which is detected by said clock and report-destination information corresponding to an event to be reported which is detected by said report-event detecting means, from said time/event-to-report-destination table, to set it as said predetermined report-destination into said reporting means.

8. A report processing device comprising:

system status monitoring means for monitoring a status of a system;

report-event detecting means for detecting an occurrence of an event to be reported, according to the monitor information from said system status monitoring means;

reporting means for performing reporting a predetermined report-destination according to the information detected by said reporting event detecting means; and report-destination setting means for selecting said predetermined report-destination according to a member's location to be reported and then for setting it to said reporting means.

9. A report processing device according to claim 1, further comprising:

a location-to-report-destination table in which report-destination information corresponding to a member's location to be reported is previously set and registered; and member locating means for locating a member to be reported and for reporting the location to said report-destination setting means;

whereby said report-destination setting means selects report-destination information corresponding to the information detected by said member locating means, from said location-to-report-destination table, to set it as said predetermined report-destination into said reporting means.

10. A report processing device according to claim 4, further comprising:

a location-to-report-destination table in which report-destination information corresponding to a member's residence to be reported is previously set and registered; and member locating means for locating a member to be reported and for reporting it to said report-destination setting means;

whereby said report-destination setting means selects report-destination information corresponding to information detected by said member locating means, from said location-to-report-destination table, to set it as said predetermined report-destination into said reporting means.

11. A report processing device according to claim 6, further comprising:
- a location-to-report-destination table in which report-destination information corresponding to a member's location to be reported is previously set and registered; and
- member locating means for locating a member to be reported and for reporting it to said report-destination setting means;
- whereby said report-destination setting means selects report-destination information corresponding to information detected by said member detecting means, from said location-to-report-destination table, to set it as said predetermined report-destination into said reporting means.

12. A report processing device according to claim 8, further comprising:
- a location-to-report-destination table in which report-destination information corresponding to a member's location to be reported is previously set and registered; and
- member locating means for locating a member to be reported and for reporting it to said report-destination setting means;
- whereby said report-destination setting means selects report-destination information corresponding to information detected by said member locating means, from said location-to-report-destination table, to set it as said predetermined report-destination into said reporting means.

13. A report processing device according to claim 9, wherein said member locating means comprises working status detecting means for detecting information regarding a job starting time and a job quitting time of a member to be reported.

14. A report processing device according to claim 10, wherein said member detecting means Comprises working status detecting means for detecting information regarding a job starting time and a job quitting time of a member to be reported.

15. A report processing device according to claim 11, wherein said member detecting means comprises working status detecting means for detecting information regarding a job starting time and a job quitting time of a member to be reported.

16. A report processing device according to claim 12, wherein said member detecting means comprises working status detecting means for detecting information regarding a job starting time and a job quitting time of a member to be reported.

17. A report processing device according to claim 9, wherein said member detecting means comprising device status detecting means for detecting the use of various devices used by a personnel to be reported.

18. A report processing device according to claim 10, wherein said member detecting means comprising device status detecting means for detecting the use of various devices used by a member to be reported.

19. A report processing device according to claim 11, wherein said member detecting means comprising device status detecting means for detecting the use of various devices used by a member to be reported.

20. A report processing device according to claim 12, wherein said member detecting means comprising device status detecting means for detecting the use of various devices used by a member to be reported.

21. A report processing device according to claim 9, wherein said member detecting means comprising presence detecting means for detecting the presence or absence of a member to be reported at a station.

22. A report processing device according to claim 10, wherein said member detecting means comprising presence detecting means for detecting the presence or absence of a member to be reported at a station.

23. A report processing device according to claim 11, wherein said member detecting means comprising presence detecting means for detecting the presence or absence of a member to be reported at a station.

24. A report processing device according to claim 12, wherein said personnel detecting means comprising presence detecting means for detecting the presence or absence of a member to be reported at a station.

25. A report processing device according to claim 9, Wherein said member detecting means comprising:
- a location transmitting device including a location detector for locating a member to be reported; and a receiver for transmitting the result detected by said location detector, said location transmitting device being carried with a member to be reported; and
- a locating receiver for receiving the result detected by said location detector in said location transmitting device and for locating the member to be reported.

26. A report processing device according to claim 10, wherein said member detecting means comprising:
- a location transmitting device including a location detector for locating a member to be reported; and a receiver for transmitting the result detected by said location detector, said location transmitting device being carried with a member to be reported; and
- a locating receiver for receiving the result detected by said location detector in said location transmitting device and for locating the member to be reported.

27. A report processing device according to claim 11, wherein said member detecting means comprising:
- a location transmitting device including a location detector for locating a member to be reported; and a receiver for transmitting the result detected by said location detector, said location transmitting device being carried with a member to be reported; and
- a locating receiver for receiving the result detected by said location detector within said location transmitting device and for locating the member to be reported.

28. A report processing device according to claim 12, wherein said member detecting means comprising:
- a location transmitting device including a location detector for locating a member to be reported; and a receiver for transmitting the result detected by said location detector, said location transmitting device being carried with a member to be reported; and
- a locating receiver for receiving the result detected by said location detector in said location transmitting device and for locating the member to be reported.

29. A report processing device according to claim 9, wherein said member detecting means comprising:
- a transmitter for transmitting a predetermined signal, said transmitter being carried with a member to be reported;
- a receiver for receiving said predetermined signal transmitted from said transmitter; and
- a location detector for locating said member to be reported, based on said predetermined signal received by said receiver.

30. A report processing device according to claim 10, wherein said member detecting means comprising:
- a transmitter for transmitting a predetermined signal, said transmitter being carried with a member to be reported;
- a receiver for receiving said predetermined signal transmitted from said transmitter; and
- a location detector for locating said member to be reported, based on said predetermined signal received by said receiver.

31. A report processing device according to claim 11, wherein said member detecting means comprising:
- a transmitter for transmitting a predetermined signal, said transmitter being carried with a member to be reported;
- a receiver for receiving said predetermined signal transmitted from said transmitter; and
- a location detector for locating said member to be reported, based on said predetermined signal received by said receiver.

32. A report processing device according to claim 12, wherein said member detecting means comprising:
- a transmitter for transmitting a predetermined signal, said transmitter being carried with a member to be reported;
- a receiver for receiving said predetermined signal transmitted from said transmitter; and
- a location detector for locating said member to be reported, based on said predetermined signal received by said receiver.

33. A report processing device comprising:
- system status monitoring means for monitoring a status of a system;
- report-event detecting means for detecting an occurrence of an event to be reported in accordance with the monitor information from said system status monitoring means;
- reporting means for performing reporting a predetermined report-destination in accordance with the information detected by said report-event detecting means;
- a report-destination table in which plural pieces of report-destination information regarding said predetermined report-destination is previously set and registered; and
- external report-destination setting means for selecting said predetermined report-destination from said report-destination table under an external remote control to set it to said reporting means.

34. A report processing device according to claim 1, further comprising:
- a report-destination table in which plural pieces of report-destination information regarding said predetermined report-destination is previously set and registered; and
- external report-destination setting means for selecting said predetermined report-destination from said report-destination table in response to an external remote control to set it to said reporting means.

35. A report processing device according to claim 4, further comprising:
- a report-destination table in which plural pieces of report-destination information regarding said predetermined report-destination is previously set and registered; and
- external report-destination setting means for selecting said predetermined report-destination from said report-destination table in response to an external remote control to set it to said reporting means.

36. A report processing device according to claim 6, further comprising:
- a report-destination table in which plural pieces of report-destination information regarding said predetermined report-destination is previously set and registered; and
- external report-destination setting means for selecting said predetermined report-destination from said report-destination table in response to an external remote control to set it to said reporting means.

37. A report processing device according to claim 8, further comprising:
- a report-destination table in which plural pieces of report-destination information regarding said predetermined report-destination is previously set and registered; and
- external report-destination setting means for selecting said predetermined report-destination from said report-destination table in response to an external remote control to set it to said reporting means.

38. A report processing device according to claim 33, further comprising external report-destination registering means for setting and registering new report-destination information into said report-destination table under an external remote control.

39. A report processing device according to claim 34, further comprising external report-destination registering means for setting and registering new report-destination information into said report-destination table under an external remote control.

40. A report processing device according to claim 35, further comprising external report-destination registering means for setting and registering new report-destination information into said report-destination table under an external remote control.

41. A report processing device according to claim 36, further comprising external report-destination registering means for setting and registering new report-destination information into said report-destination table under an external remote control.

42. A report processing device according to claim 37, further comprising external report-destination registering means for setting and registering new report-destination information into said report-destination table under an external remote control.

43. A report processing device according to claim 33, wherein said external remote control is carried out with an external telephone set via a telephone line.

44. A report processing device according to claim 34, wherein said external remote control is carried out with an external telephone set via a telephone line.

45. A report processing device according to claim 35, wherein said external remote control is carded out with an external telephone set via a telephone line.

46. A report processing device according to claim 36, wherein said external remote control is carried out with an external telephone set via a telephone line.

47. A report processing device according to claim 37, wherein said external remote control is carried out with an external telephone set via a telephone line.

48. A report processing device according to claim 1, wherein said reporting means performs reporting said predetermined report-destination via a telephone line.

49. A report processing device according to claim 4, wherein said reporting means performs reporting said predetermined report-destination via a telephone line.

50. A report processing device according to claim 6, wherein said reporting means performs reporting said predetermined report-destination via a telephone line.

51. A report processing device according to claim 8, wherein said reporting means performs reporting said predetermined report-destination via a telephone line.

52. A report processing device according to claim 33, wherein said reporting means performs reporting said predetermined report-destination via a telephone line.

53. A report processing device according to claim 1, wherein said event to be reported which is detected by said report-event detecting means comprises an event regarding an abnormal status in said system.

54. A report processing device according to claim 4, wherein said event to be reported which is detected by said report-event detecting means comprises an event regarding an abnormal status in said system.

55. A report processing device according to claim 6, wherein said event to be reported which is detected by said report-event detecting means comprises an event regarding an abnormal status in said system.

56. A report processing device according to claim 8, wherein said event to be reported which is detected by said report-event detecting means comprises an event regarding an abnormal status in said system.

57. A report processing device according to claim 33, wherein said event to be reported which is detected by said report-event detecting means comprises an event regarding an abnormal status in said system.

* * * * *